(12) United States Patent
Wang et al.

(10) Patent No.: US 12,302,410 B2
(45) Date of Patent: May 13, 2025

(54) TRANSMISSION OVER A RANDOM ACCESS CHANNEL

(71) Applicant: Samsung Electronics Co., Ltd., Suwon-si (KR)

(72) Inventors: Yi Wang, Beijing (CN); Feifei Sun, Beijing (CN); Jingxing Fu, Beijing (CN); Qi Xiong, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 407 days.

(21) Appl. No.: 17/764,964

(22) PCT Filed: Sep. 29, 2020

(86) PCT No.: PCT/KR2020/013422
§ 371 (c)(1),
(2) Date: Mar. 29, 2022

(87) PCT Pub. No.: WO2021/060958
PCT Pub. Date: Apr. 1, 2021

(65) Prior Publication Data
US 2022/0377813 A1 Nov. 24, 2022

(30) Foreign Application Priority Data

Sep. 29, 2019 (CN) .......................... 201910930526.2
Nov. 7, 2019 (CN) .......................... 201911082950.2

(51) Int. Cl.
*H04W 74/0833* (2024.01)
*H04L 1/1812* (2023.01)
(Continued)

(52) U.S. Cl.
CPC ....... *H04W 74/0841* (2013.01); *H04L 1/1812* (2013.01); *H04W 72/0453* (2013.01); *H04W 72/23* (2023.01); *H04W 74/0866* (2013.01)

(58) Field of Classification Search
CPC ......... H04W 74/0841; H04W 72/0453; H04W 72/23; H04W 74/0866
See application file for complete search history.

(56) References Cited

U.S. PATENT DOCUMENTS

2018/0255586 A1* 9/2018 Einhaus ................ H04W 72/02
2019/0215104 A1 7/2019 Salem et al.
2020/0221506 A1* 7/2020 Jeon .................. H04W 74/0833

FOREIGN PATENT DOCUMENTS

EP 3716723 A1 9/2020

OTHER PUBLICATIONS

Examination Report issued Jan. 18, 2024, in connection with Indian Patent Application No. 202217018273, 6 pages.

(Continued)

*Primary Examiner* — Jackie Zuniga Abad

(57) ABSTRACT

The present disclosure relates to a transmission method and apparatus. The method may comprise: receiving at least one piece of downlink control information; determining, based on the downlink control information, a time resource of a to-be-sent hybrid automatic retransmission request-acknowledgement and/or a content of the hybrid automatic retransmission request-acknowledgement; and sending the hybrid automatic retransmission request-acknowledgement based on the determined time resource and/or the determined content.

12 Claims, 44 Drawing Sheets

(51) Int. Cl.
  *H04W 72/0453* (2023.01)
  *H04W 72/23* (2023.01)
  *H04W 74/08* (2009.01)

(56) References Cited

OTHER PUBLICATIONS

European Patent Office, "Communication pursuant to Article 94(3) EPC," dated Apr. 25, 2023, in connection with European Patent Application No. 20869136.0, 8 pages.
Mediatek Inc., "Enhancements to HARQ for NR-U operation", 3GPP TSG RAN WG1 #96bis, Apr. 8-12, 2019, R1-1904484, 12 pages.
Samsung, "HARQ enhancements for NR-U", 3GPP TSG RAN WG1 #98, Aug. 26-30, 2019, R1-1908467, 8 pages.
Ericsson, "Handling uplink LBT failures", 3GPP TSG-RAN WG2 #107, Aug. 26-30, 2019, Tdoc R2-1910779, 4 pages.
Huawei et al, "Coexistence and channel access for NR unlicensed band operations", 3GPP TSG RAN WG1 Meeting #98, Aug. 26-30, 2019, R1-1908109, 20 pages.
International Search Report dated Jan. 8, 2021 in connection with International Patent Application No. PCT/KR2020/013422, 3 pages.
Written Opinion of the International Searching Authority dated Jan. 8, 2021 in connection with International Patent Application No. PCT/KR2020/013422, 7 pages.
European Patent Office, "Supplementary European Search Report," dated Sep. 15, 2022, in connection with European Patent Application No. 20869136.0, 12 pages.
Panasonic: "PRACH resource enhancement for NR-U", 3GPP TSG RAN WG1 #97, R1-1906084, May 13-17, 2019, 5 pages.
3GPP TS 38.331 V15.7.0 (Sep. 2019) Technical Specification; 3rd Generation Partnership Project; Technical Specification Group Radio Access Network; NR; Radio Resource Control (RRC) protocol specification (Release 15); 527 pages.
VIVO: "RACFI Resource Selection for Msg1 in NRU", 3GPP TSG-RAN WG2 Meeting #106, R2-1905620, May 13-17, 2019, 4 pages.
First Office Action issued Jun. 5, 2024, in connection with Chinese Patent Application No. 201911082950.2, 28 pages.
Huawei, "Feature lead summary of HARQ enhancements for NR-U", R1-1909496, 3GPP TSG RAN WG1 Meeting #98, Prague, Czech Republic, Aug. 26-30, 2019, 29 pages.
Hearing Notice issued Mar. 21, 2025, in connection with IN Patent Application No. 202217018273, 3 pages.

* cited by examiner

[Fig. 1]
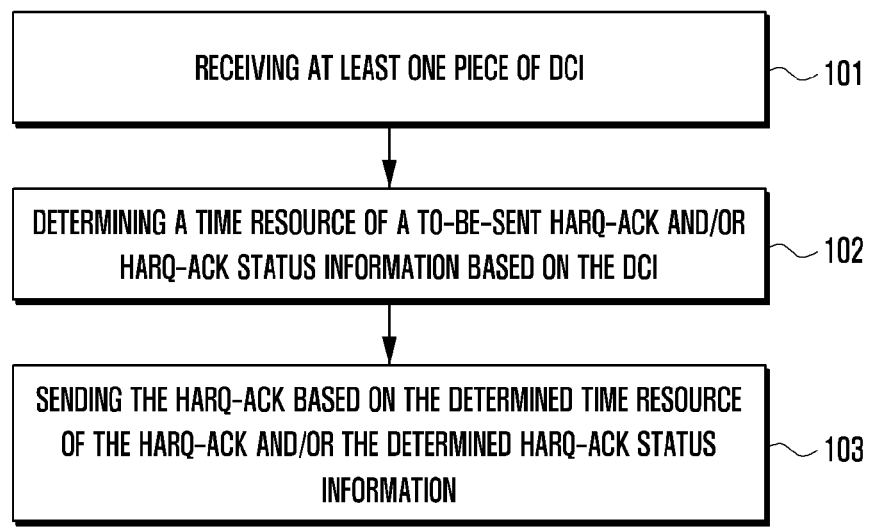

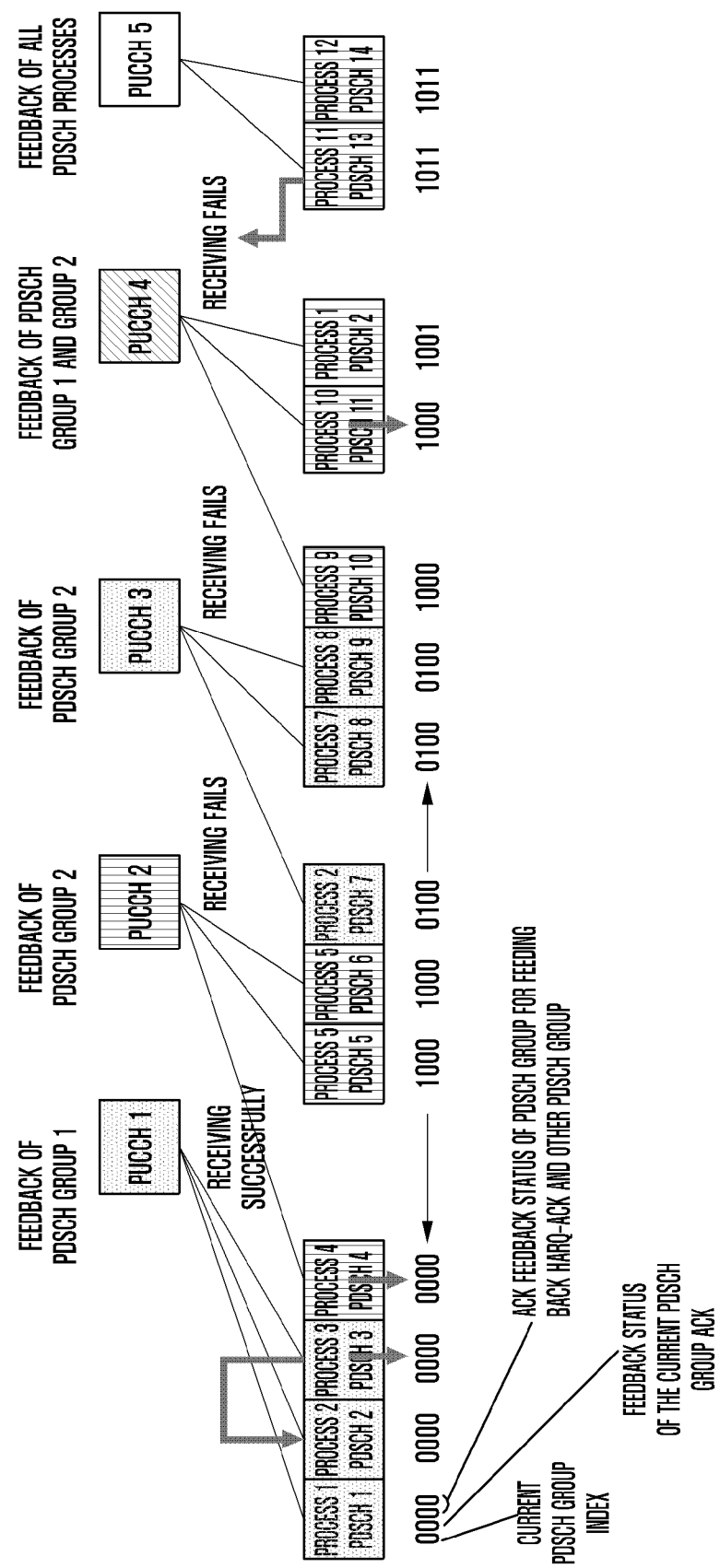
[Fig. 2a]

[Fig. 2b]
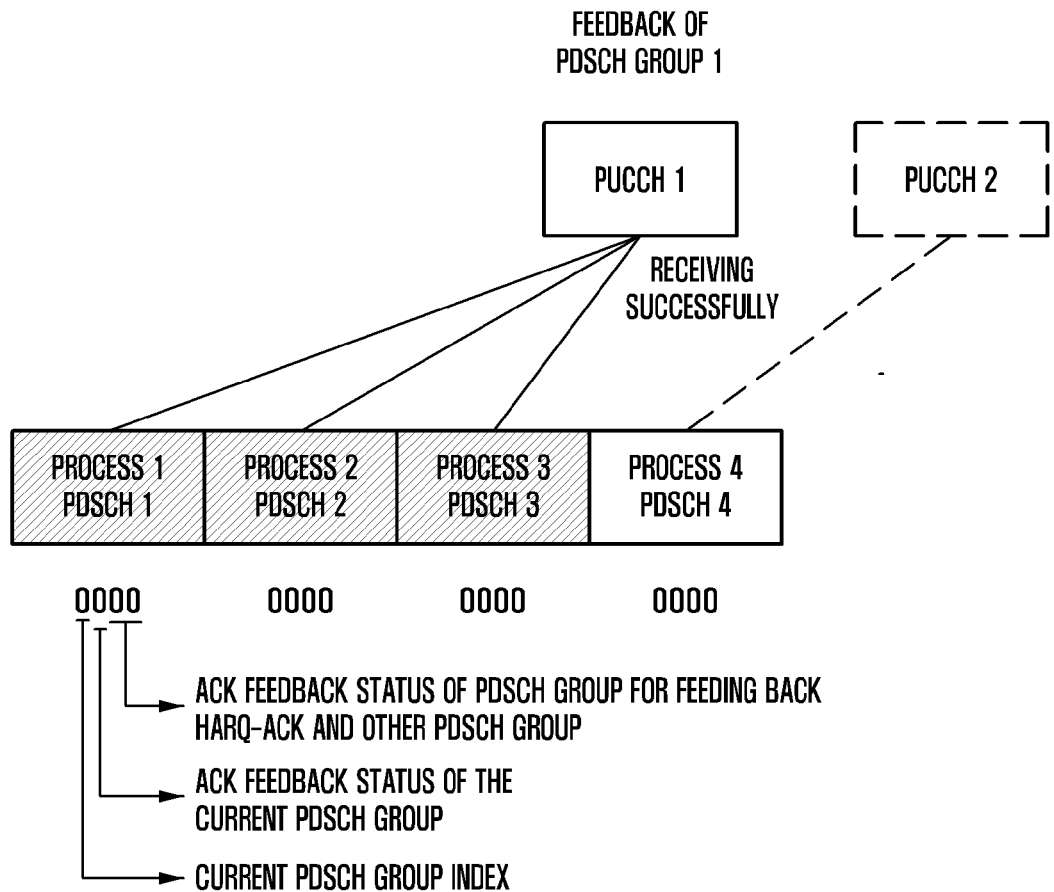
[Fig. 2c]
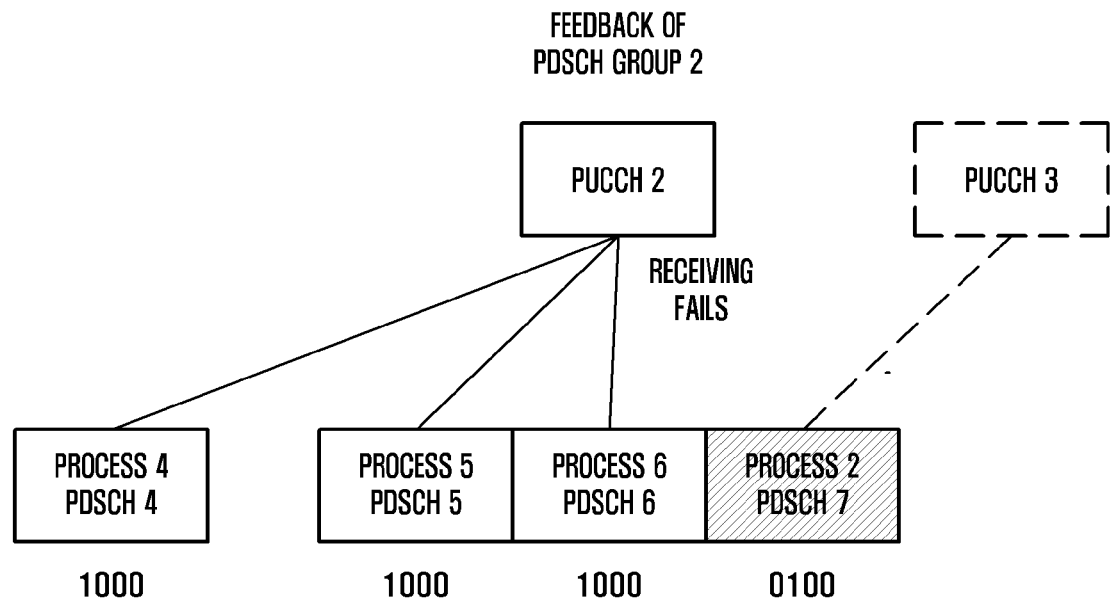

[Fig. 2d]
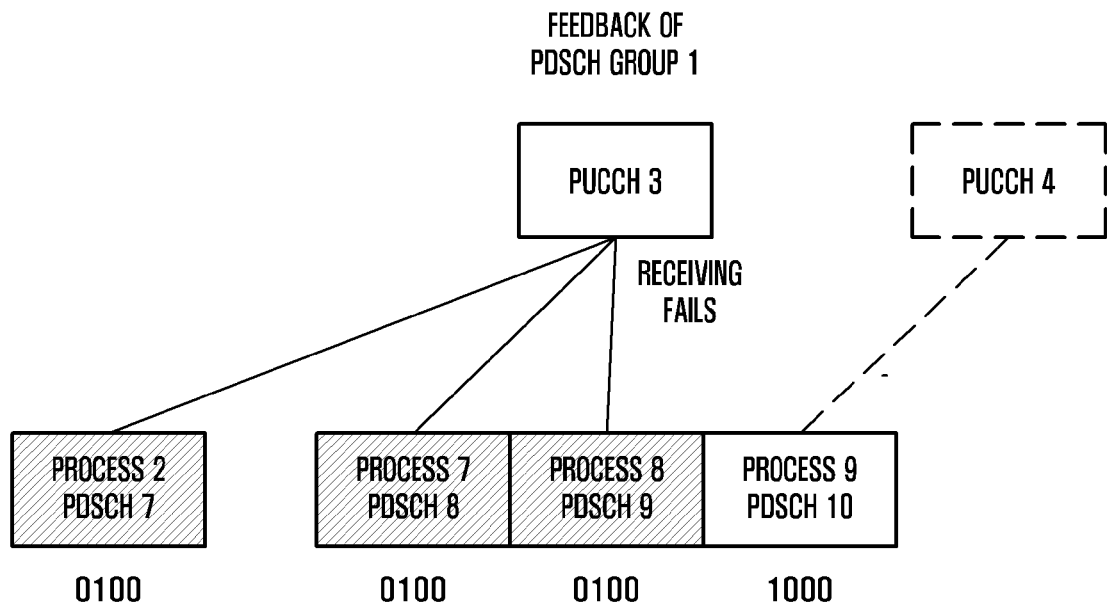
[Fig. 2e]
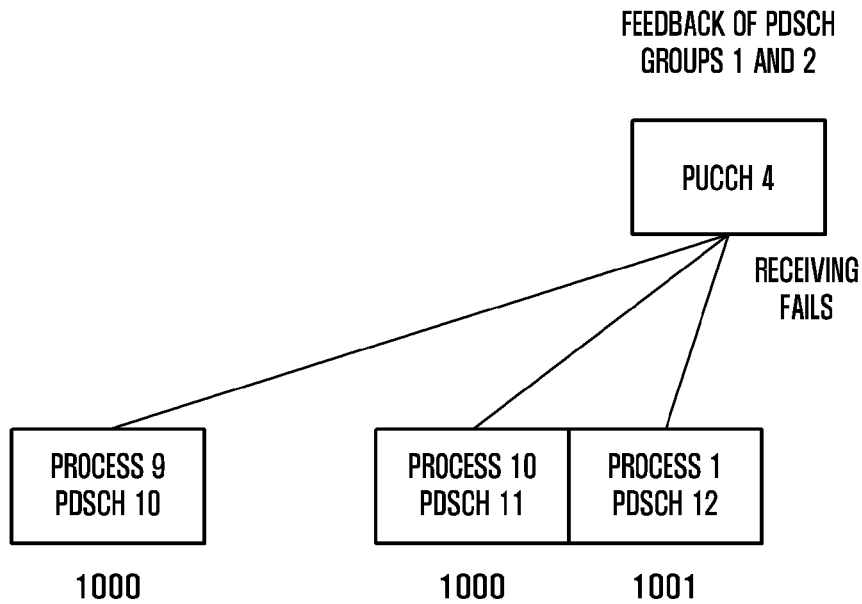

[Fig. 2f]
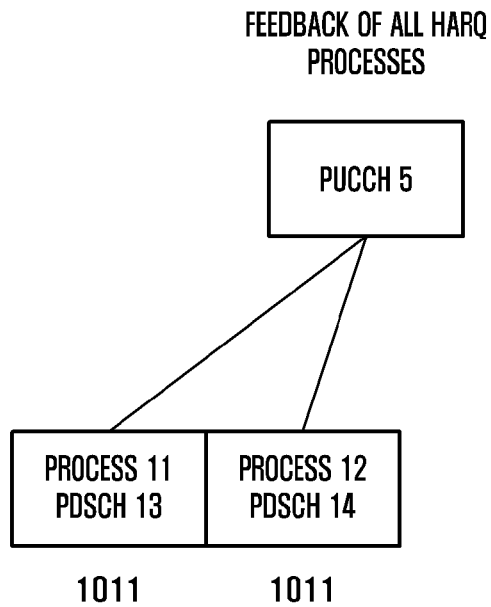
[Fig. 3]
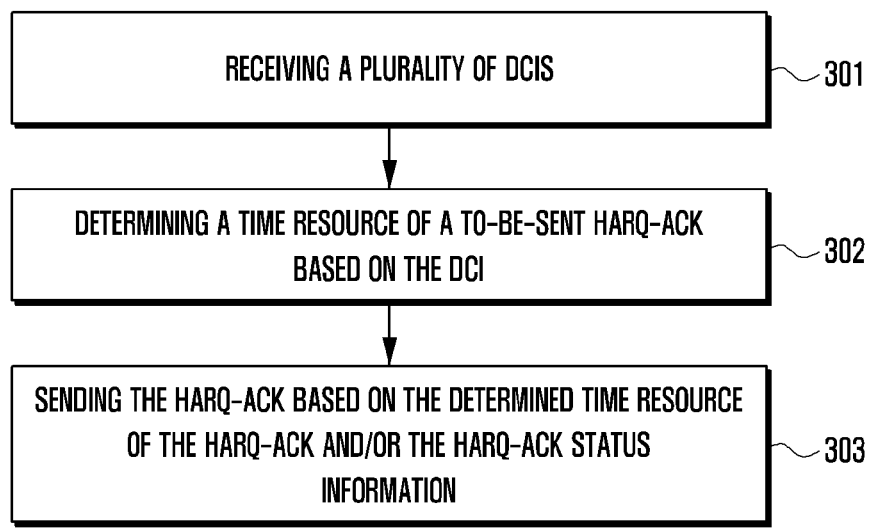

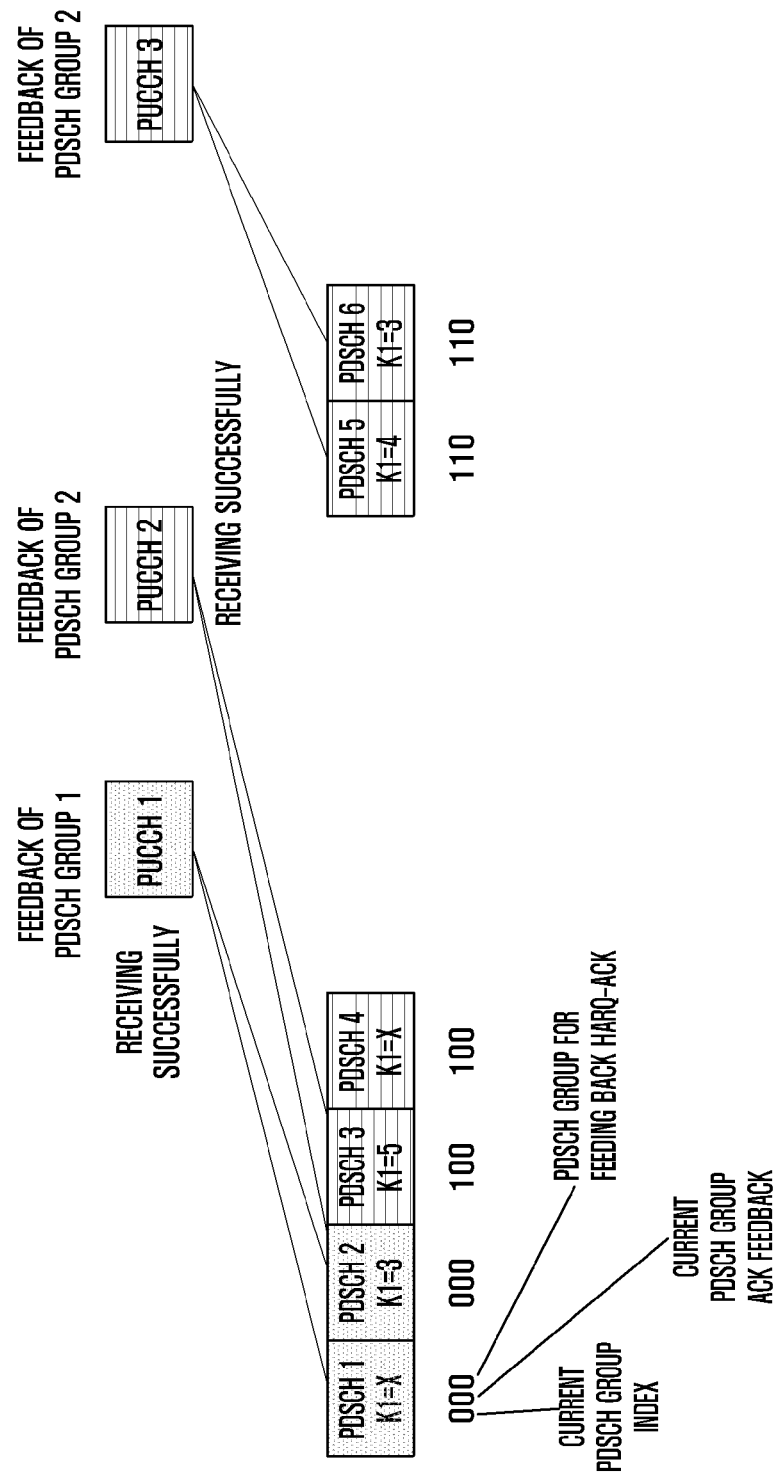
[Fig. 4a]

[Fig. 4b]
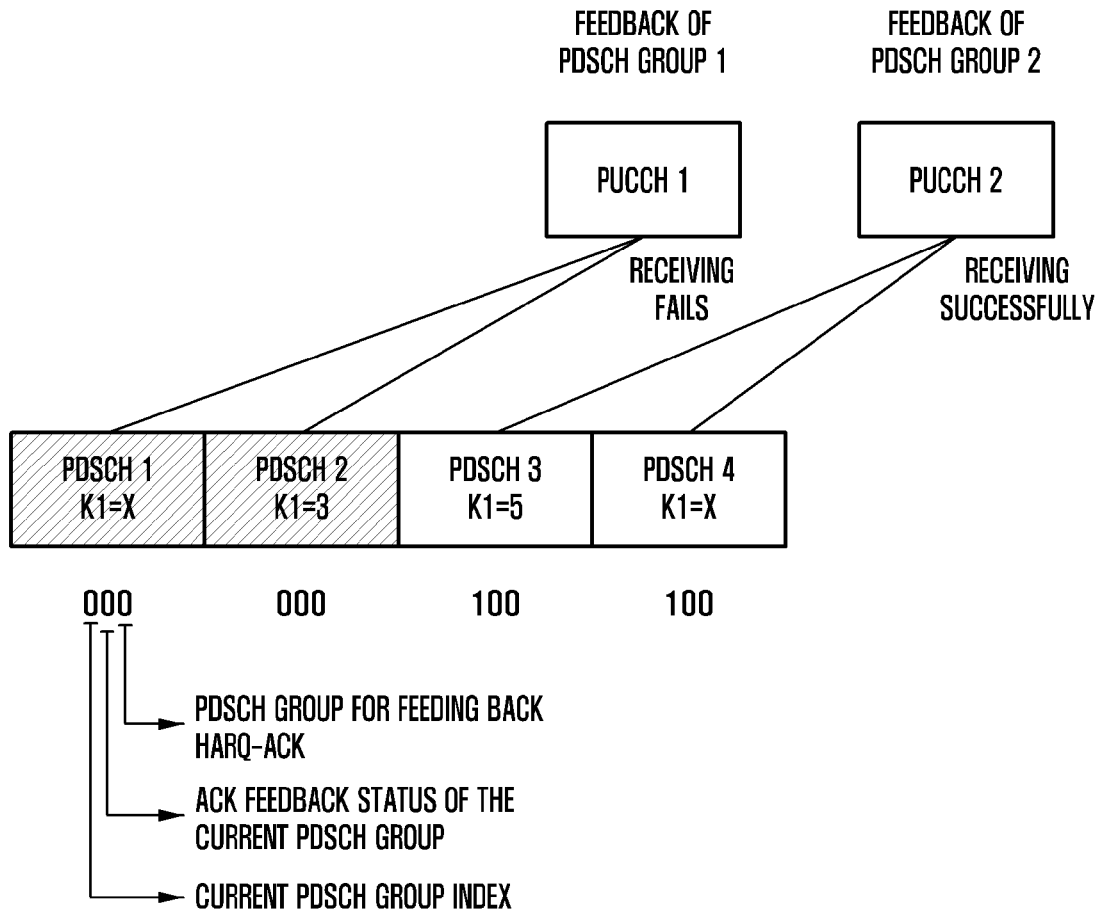
[Fig. 4c]
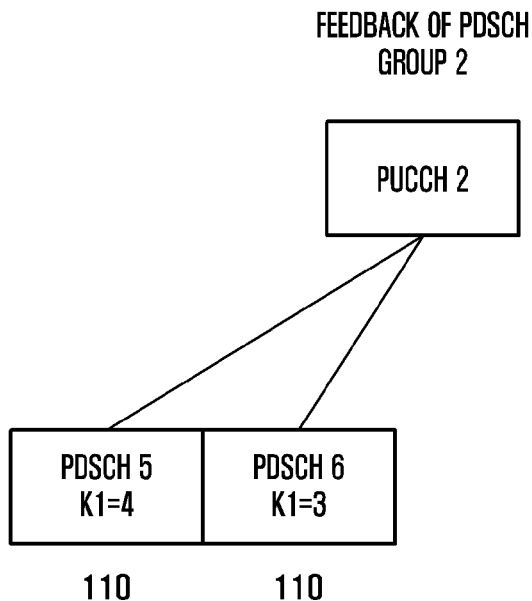

[Fig. 4d]
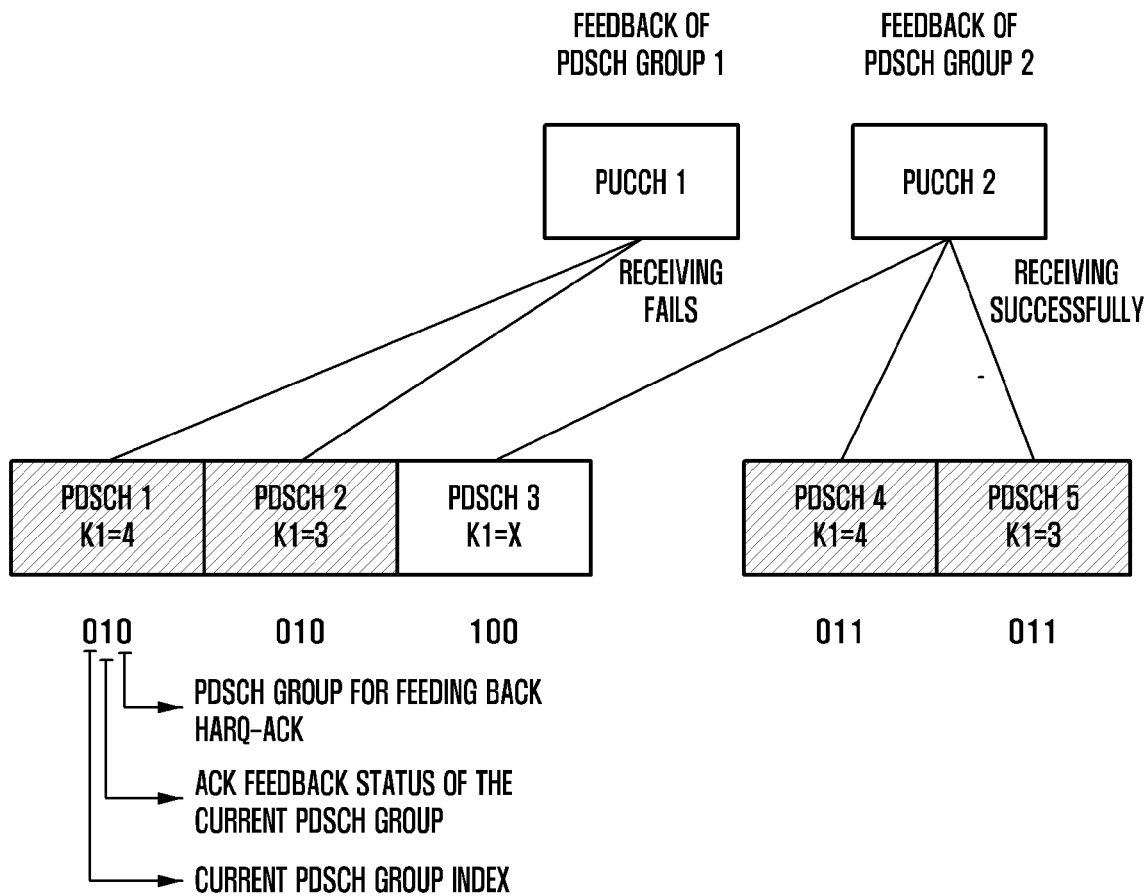
[Fig. 5]
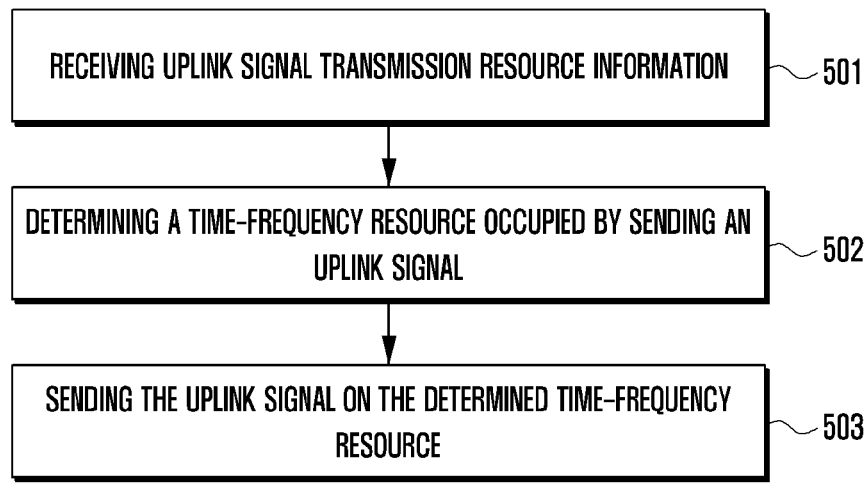

[Fig. 6]

```
COUNTING THE NUMBER OF FAILURES OF A JOINT LBT OR SEPARATE LBT
PERFORMED ON THE FREQUENCY DOMAIN RESOURCE OCCUPIED
FOR SENDING AN UPLINK SIGNAL, WHERE THE FREQUENCY DOMAIN      — 601
RESOURCE OCCUPIED FOR SENDING THE UPLINK SIGNAL COMPRISES
A CARRIER AND/ OR BWP AND/ OR LBT BANDWIDTH
```
↓
```
REPORTING LBT FAILURE INFORMATION, IF THE NUMBER OF LBT FAILURES   — 602
EXCEEDS A PRE-SET THRESHOLD
```

[Fig. 7]

```
SENDING A MSG A INCLUDING A PREAMBLE SEQUENCE AND A PUSCH,   — 701
AFTER TYPE-1 CHANNEL ACCESS IS SUCCESSFUL
```
↓
```
ADJUSTING A CWS BASED ON FEEDBACK INFORMATION                — 702
FOR THE PREAMBLE SEQUENCE AND/ OR THE PUSCH
```

[Fig. 8]

```
SENDING AT LEAST ONE DCI                                      — 801
```
↓
```
RECEIVING A TIME RESOURCE OF THE HARQ-ACK DETERMINED
BASED ON THE DCI AND/ OR HARQ-ACK SENT BY HARQ-ACK           — 802
STATUS INFORMATION
```

[Fig. 9]

```
SENDING A PLURALITY OF DCIS                                   — 901
```
↓
```
RECEIVING A TIME RESOURCE OF THE HARQ-ACK DETERMINED
BASED ON THE DCIS AND/ OR HARQ-ACK SENT BY HARQ-ACK          — 902
STATUS INFORMATION
```

[Fig. 10]
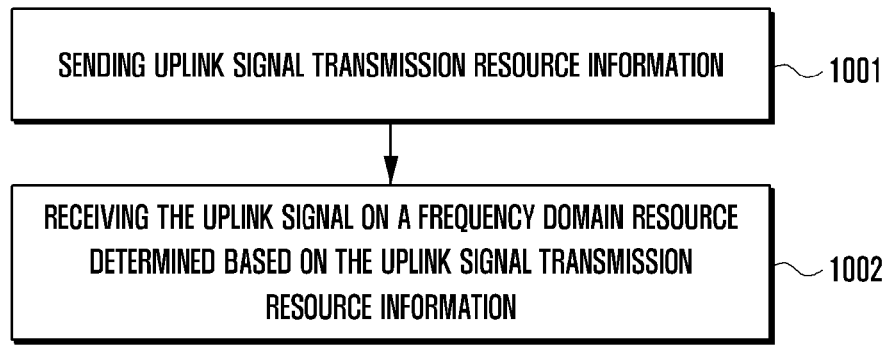
[Fig. 11]
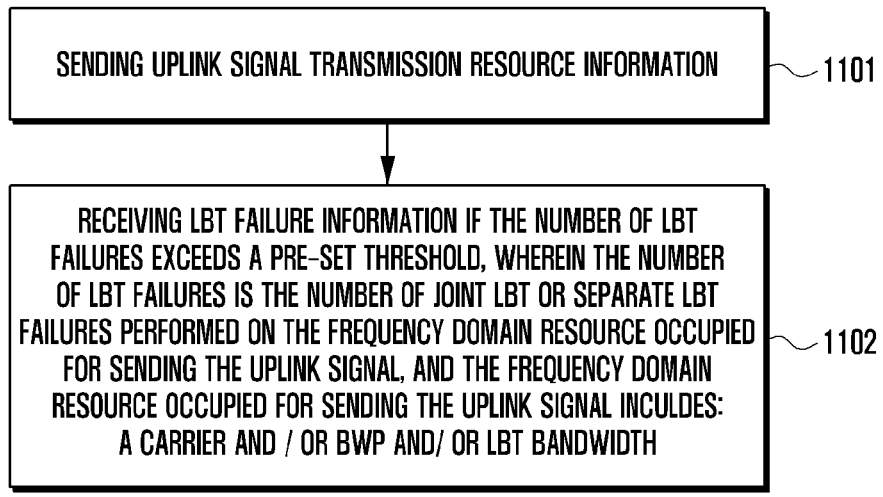
[Fig. 12]
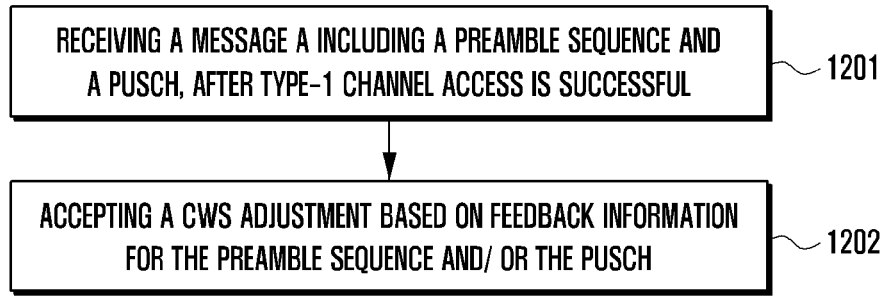

[Fig. 13]
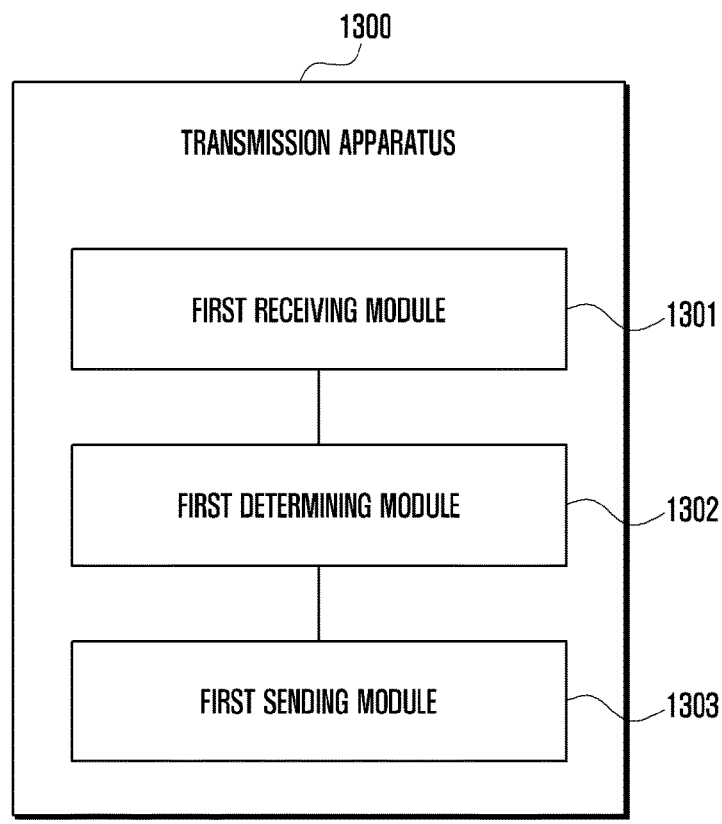
[Fig. 14]
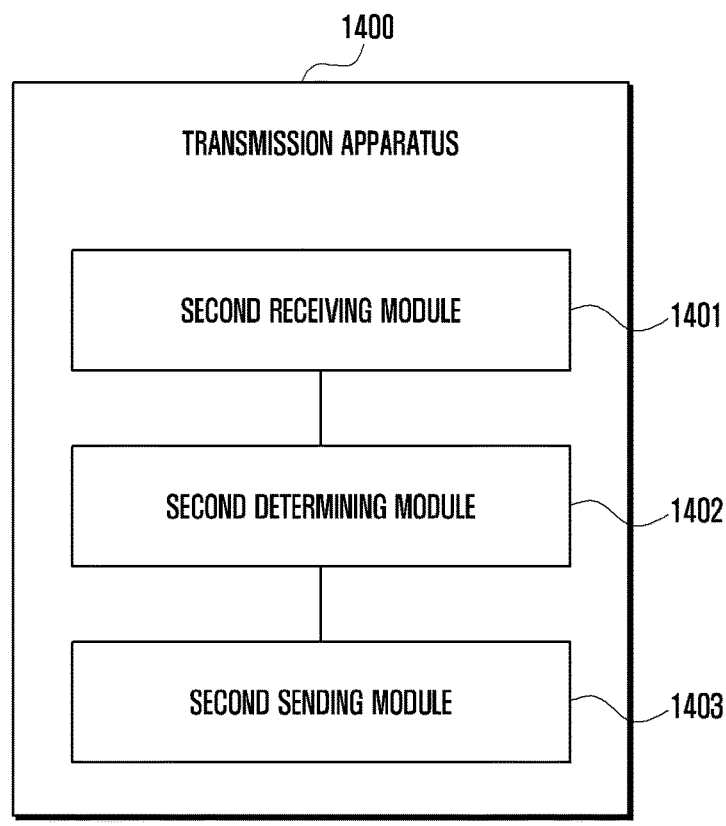

[Fig. 15]
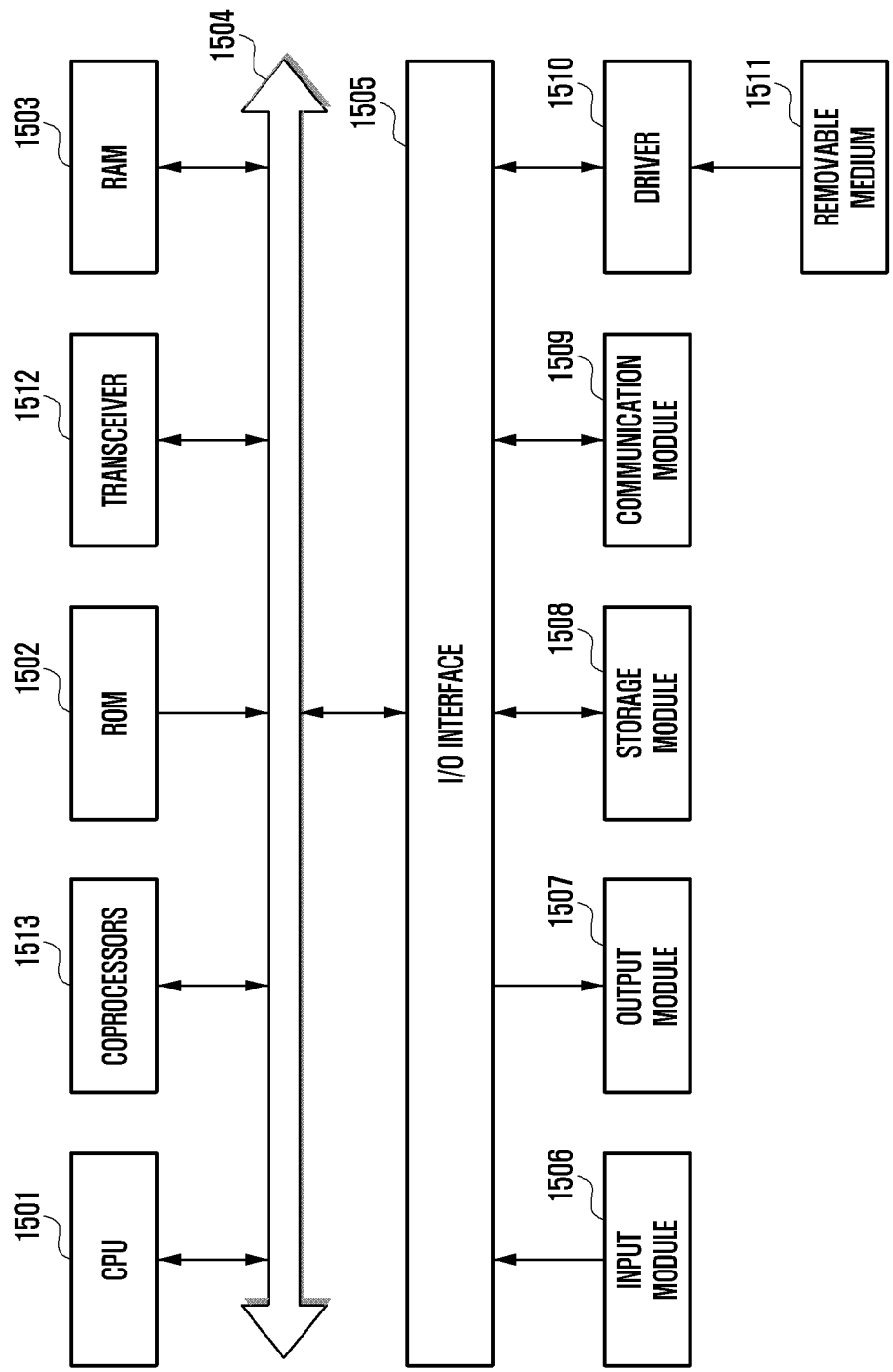

[Fig. 16a]
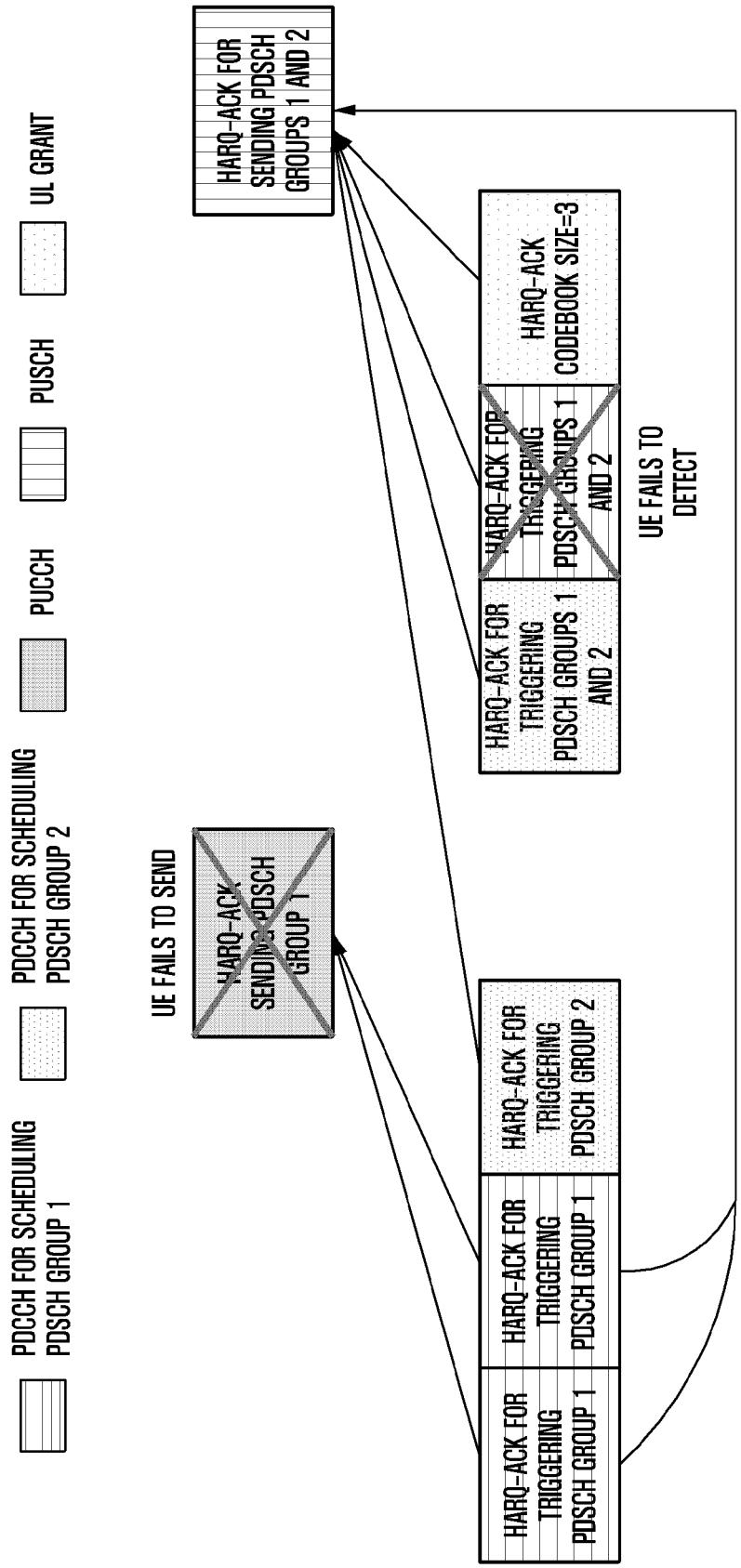

[Fig. 16b]
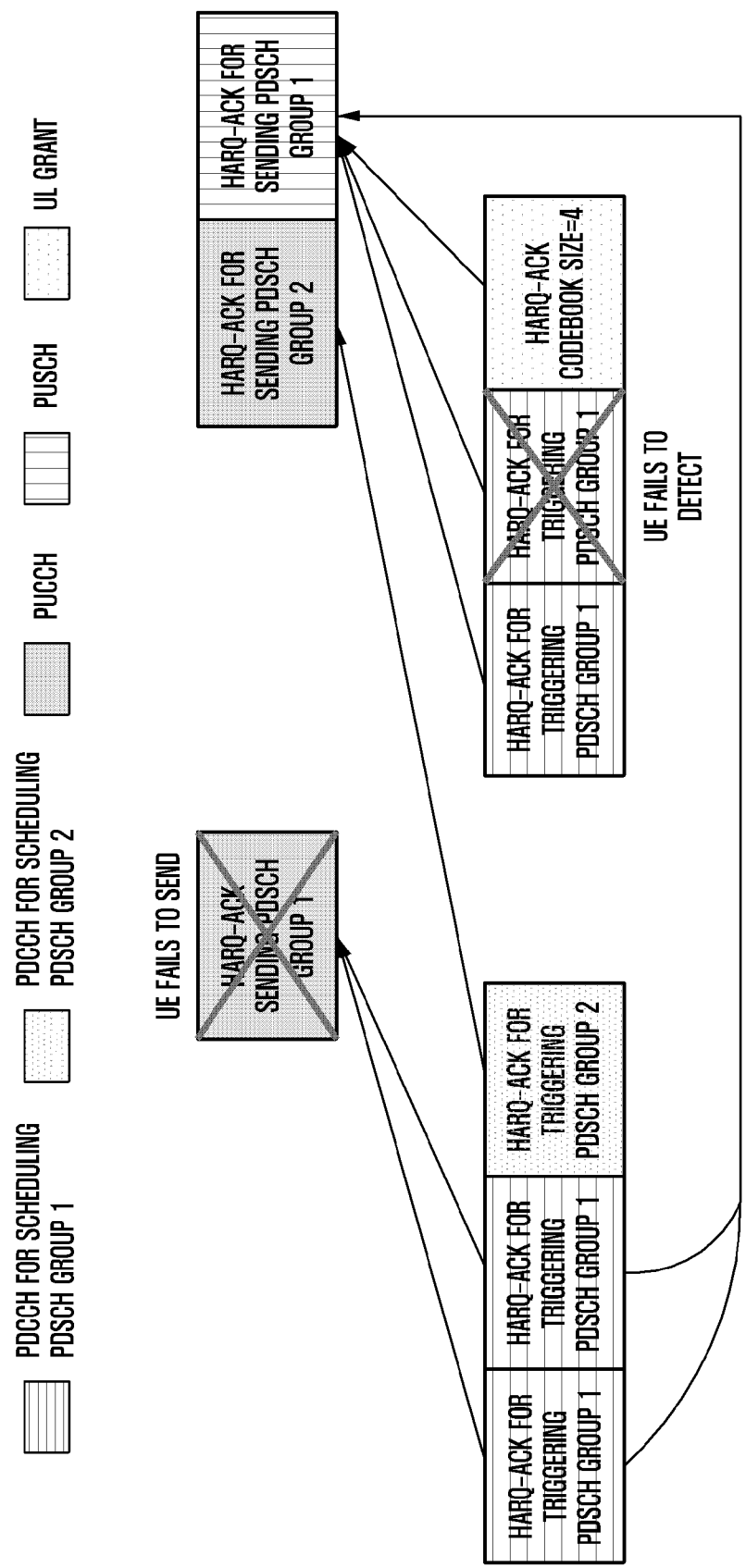

[Fig. 17]
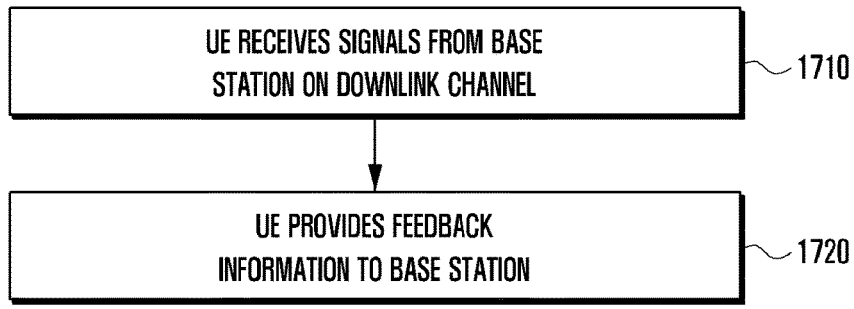
[Fig. 18]
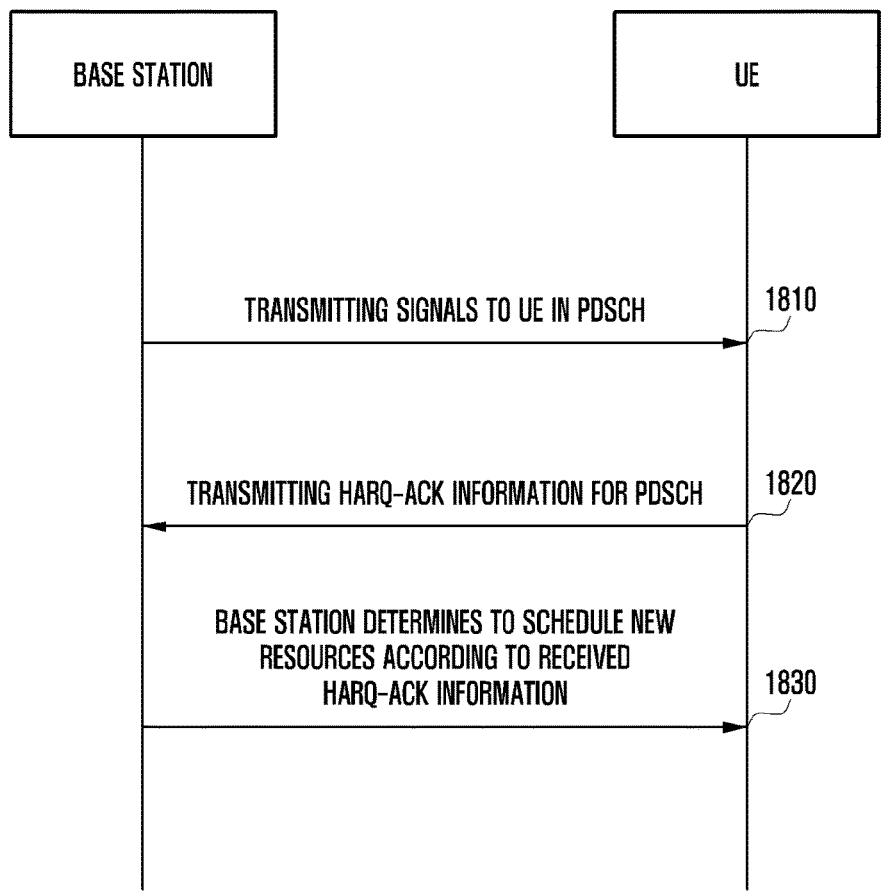
[Fig. 19]
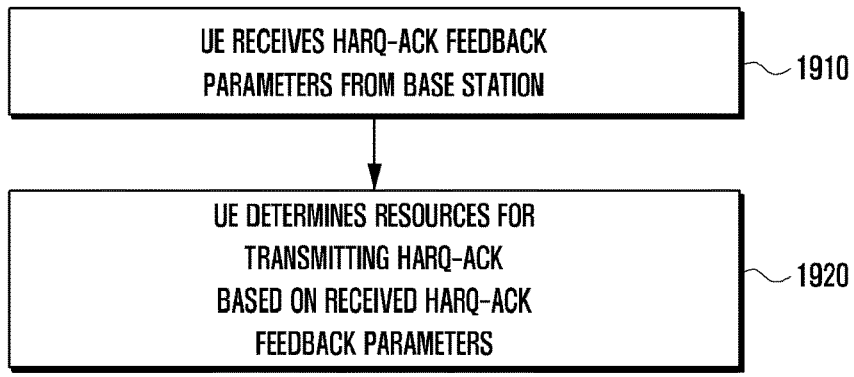

[Fig. 20]
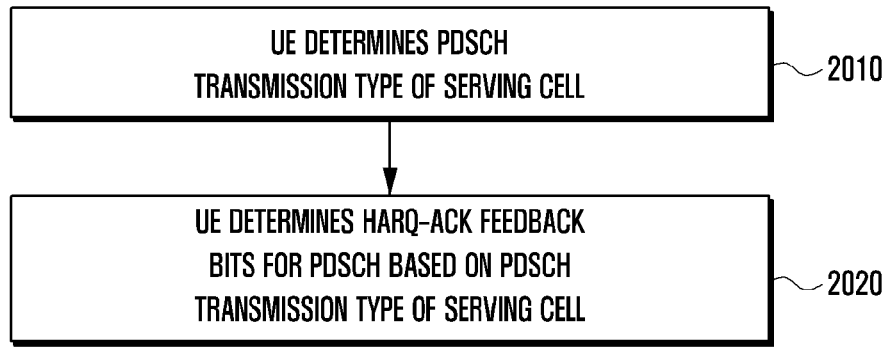
[Fig. 21]
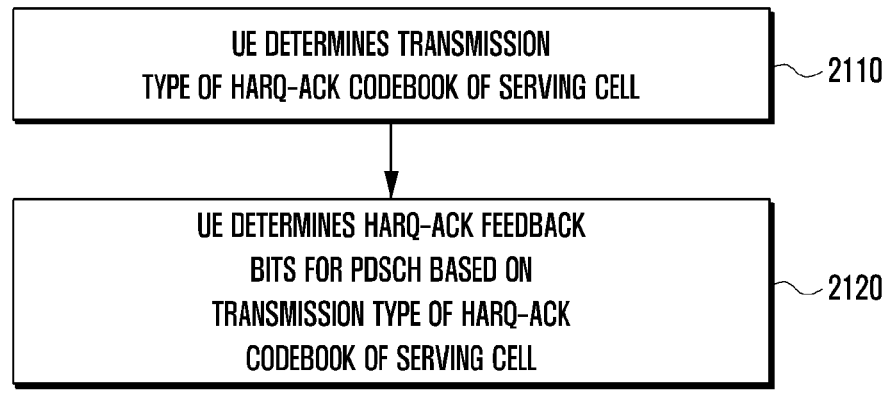
[Fig. 22]
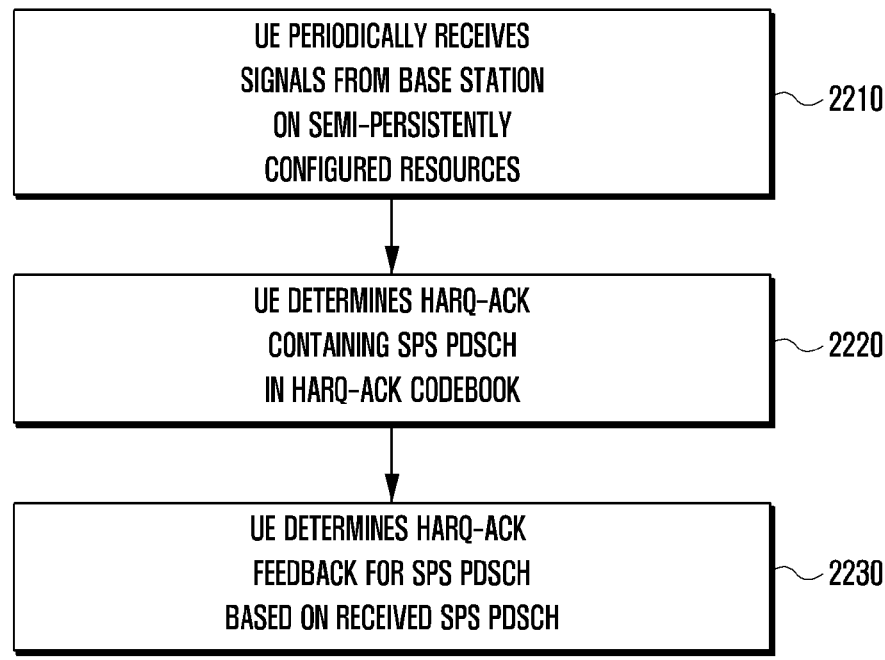

[Fig. 23]
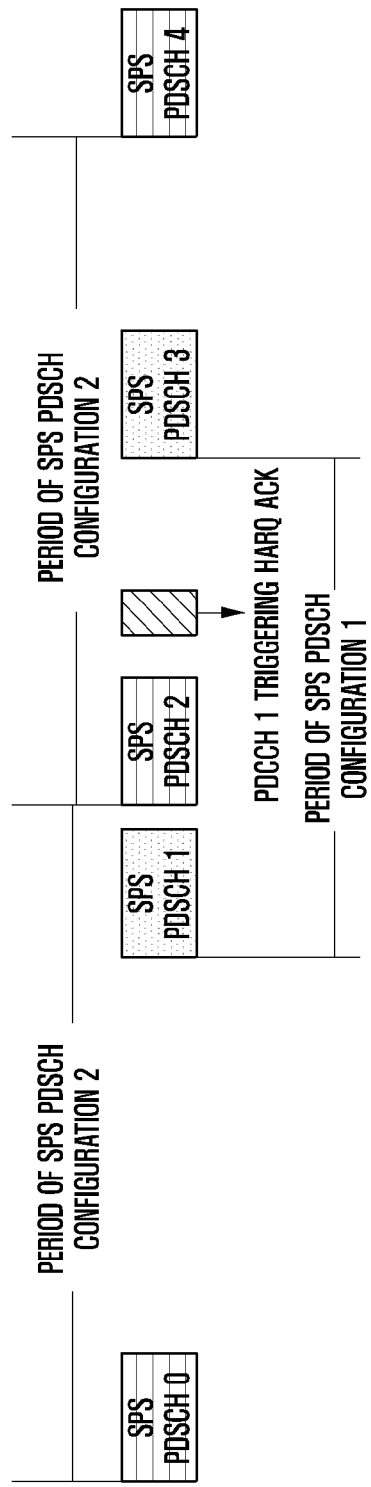

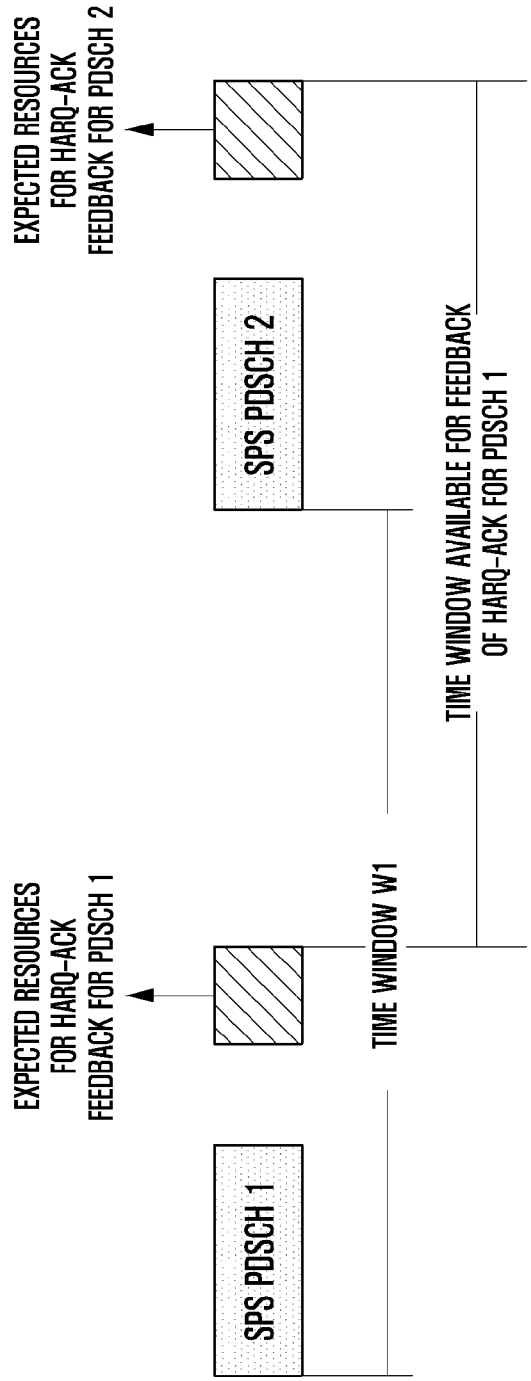
[Fig. 24]

[Fig. 25]
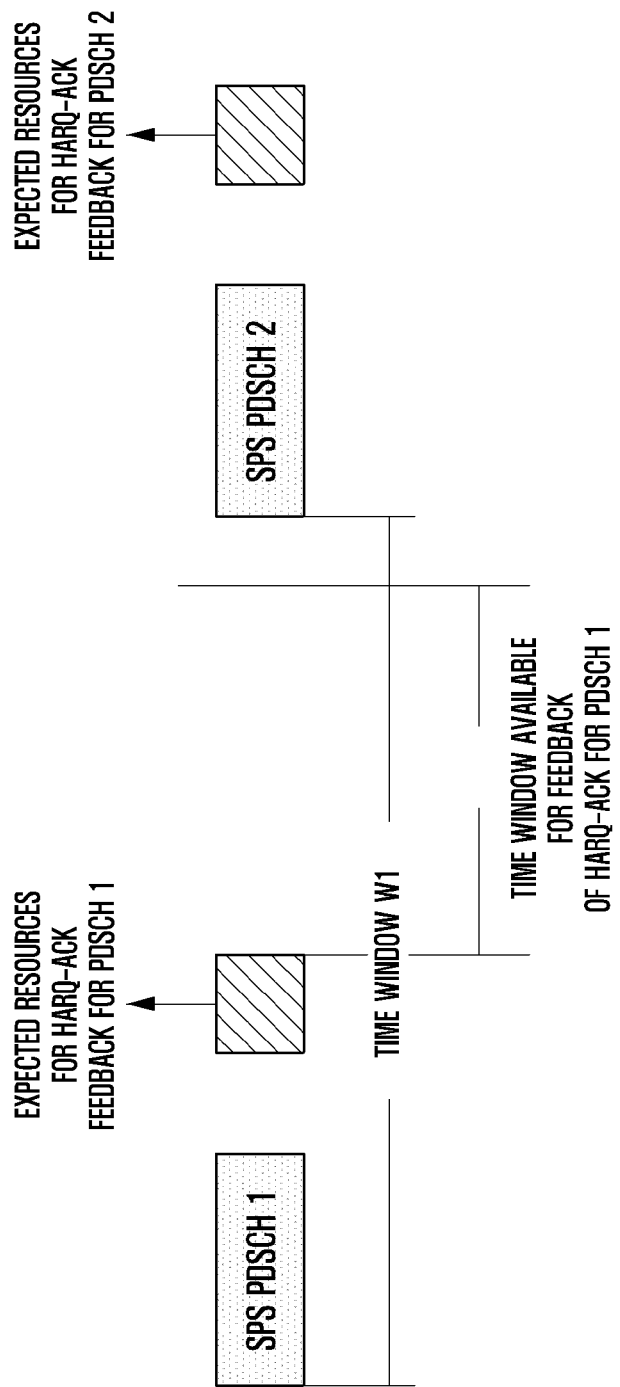

[Fig. 26]
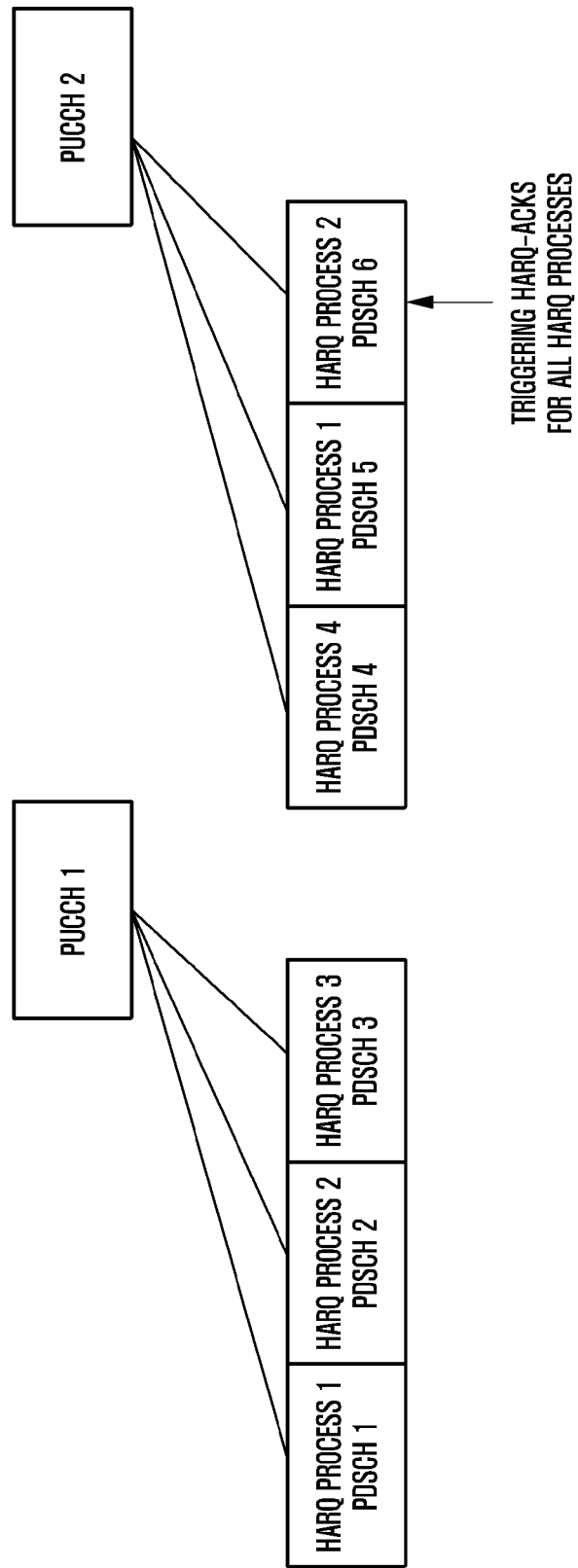

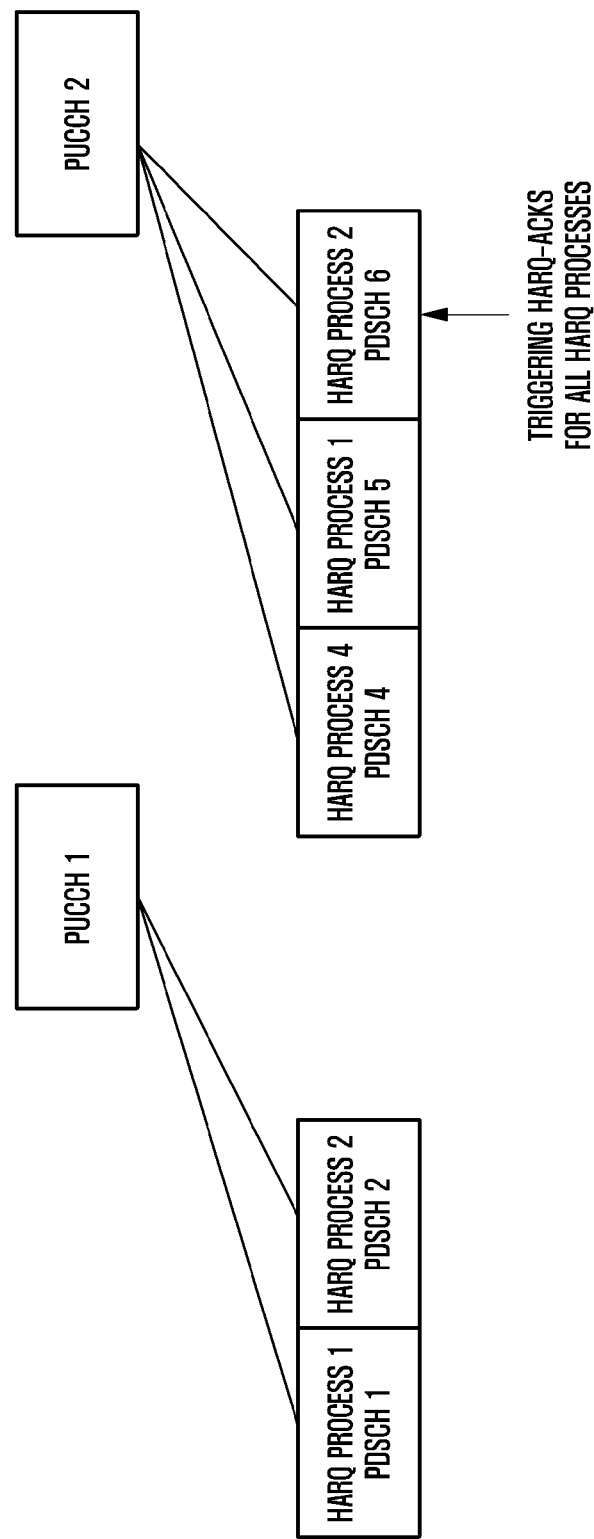
[Fig. 27]

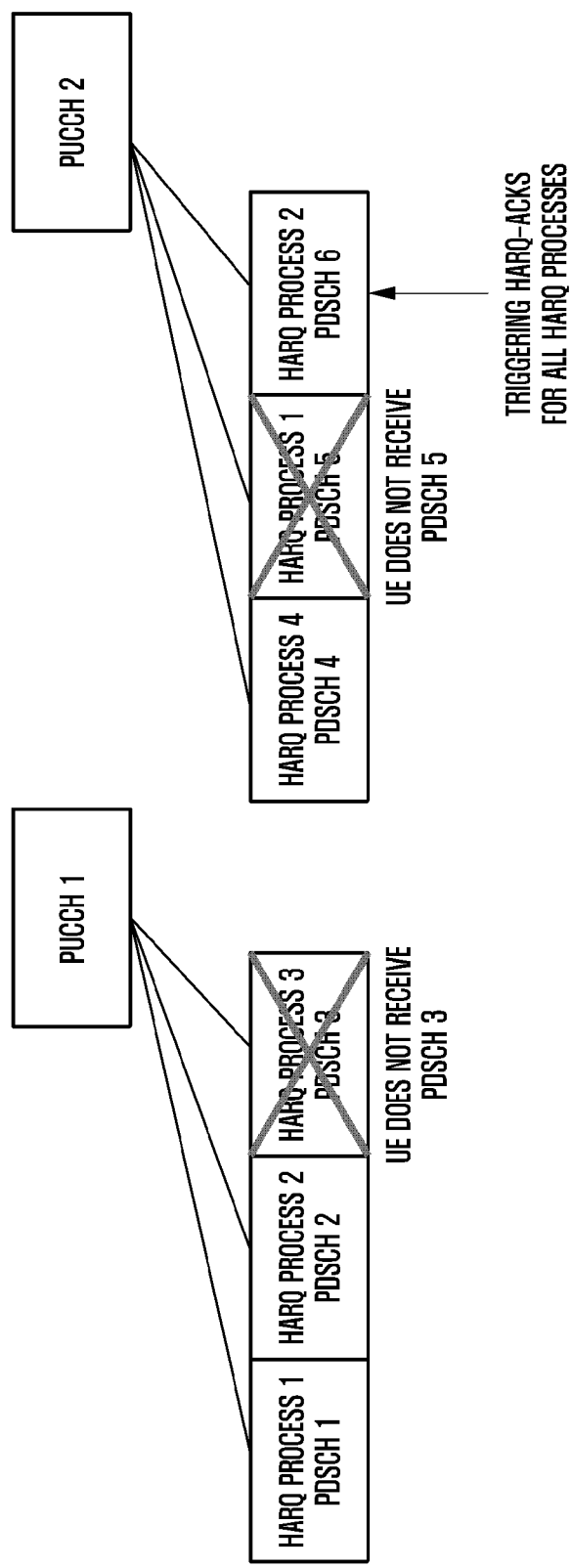
[Fig. 28]

[Fig. 29]
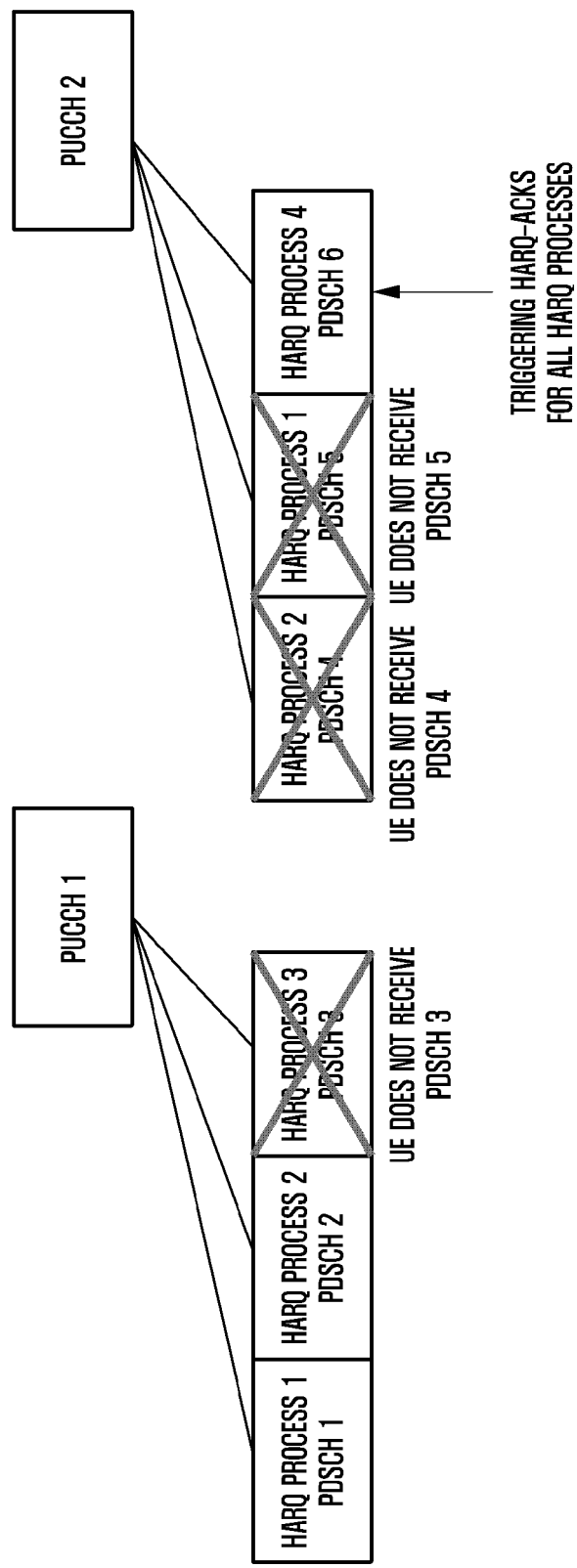

[Fig. 30]
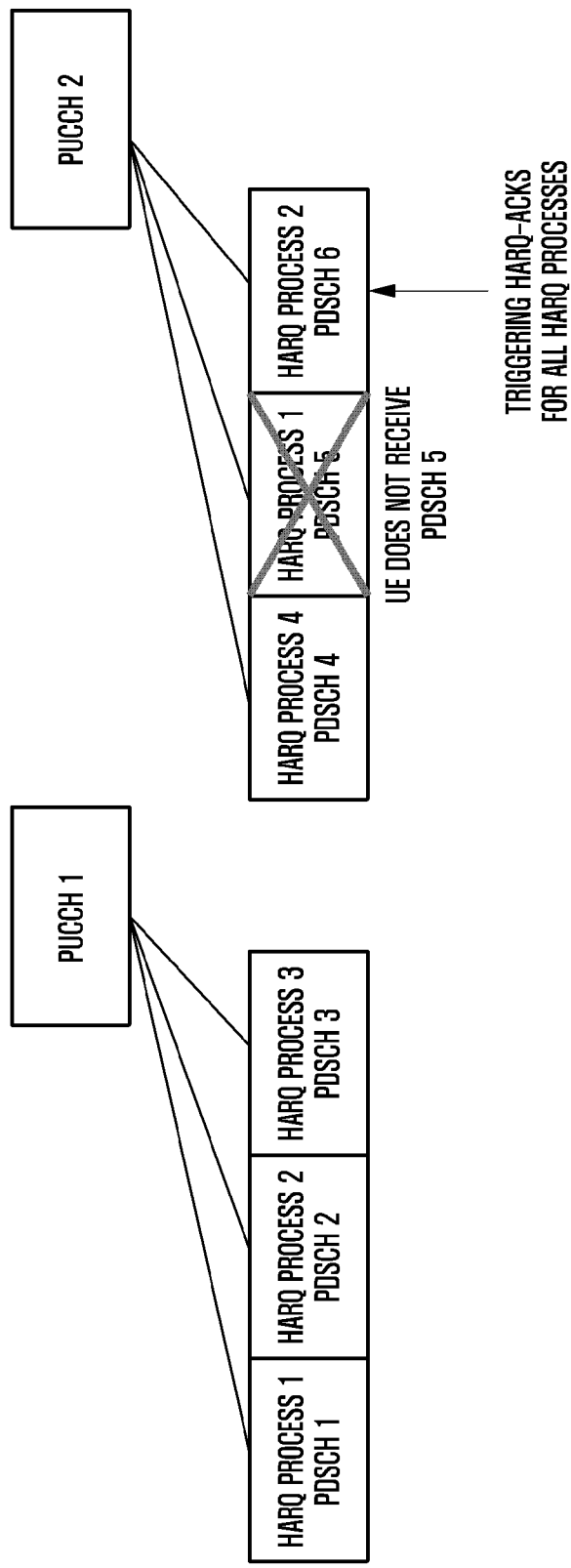

[Fig. 31]
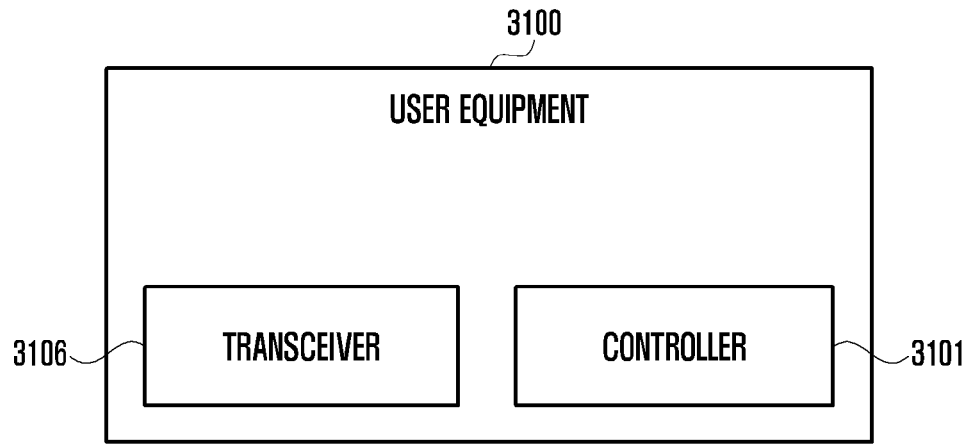
[Fig. 32]
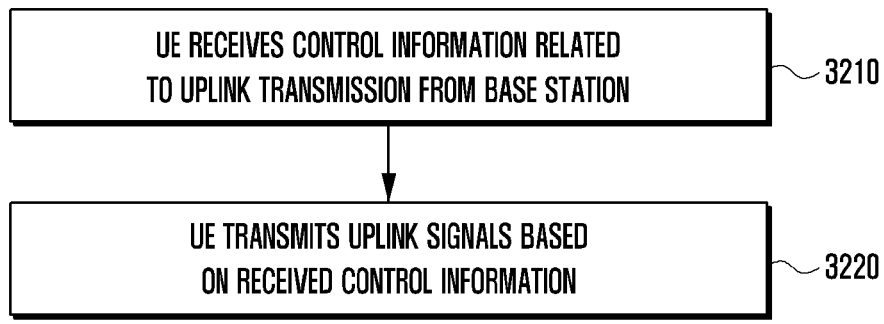
[Fig. 33]
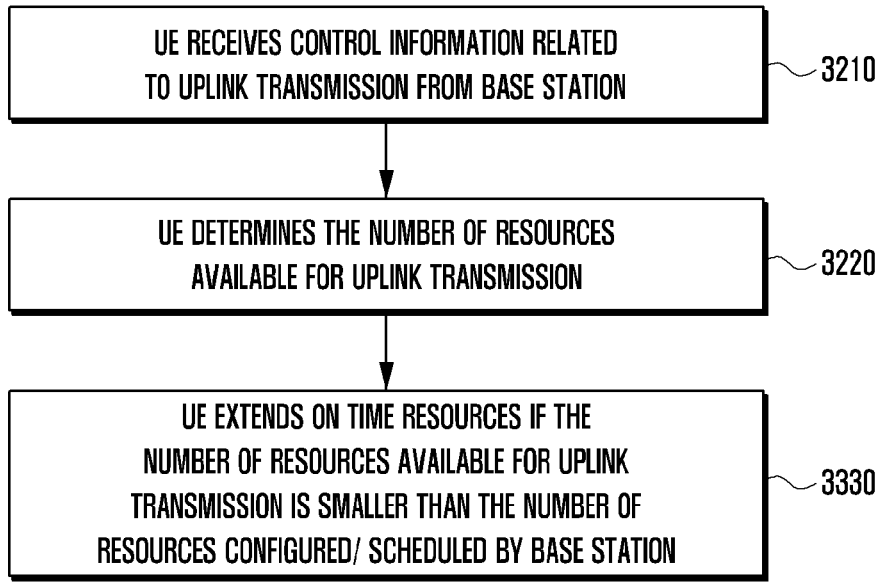

[Fig. 34]
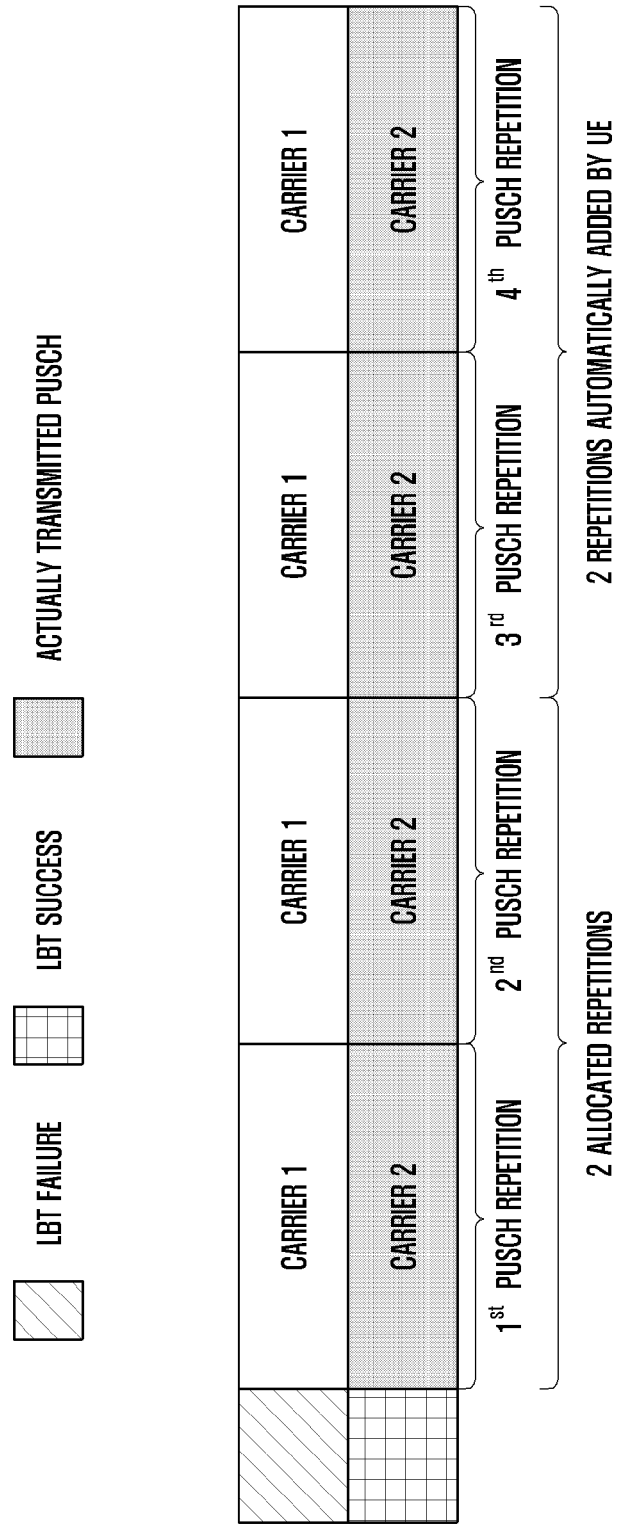

[Fig. 35]
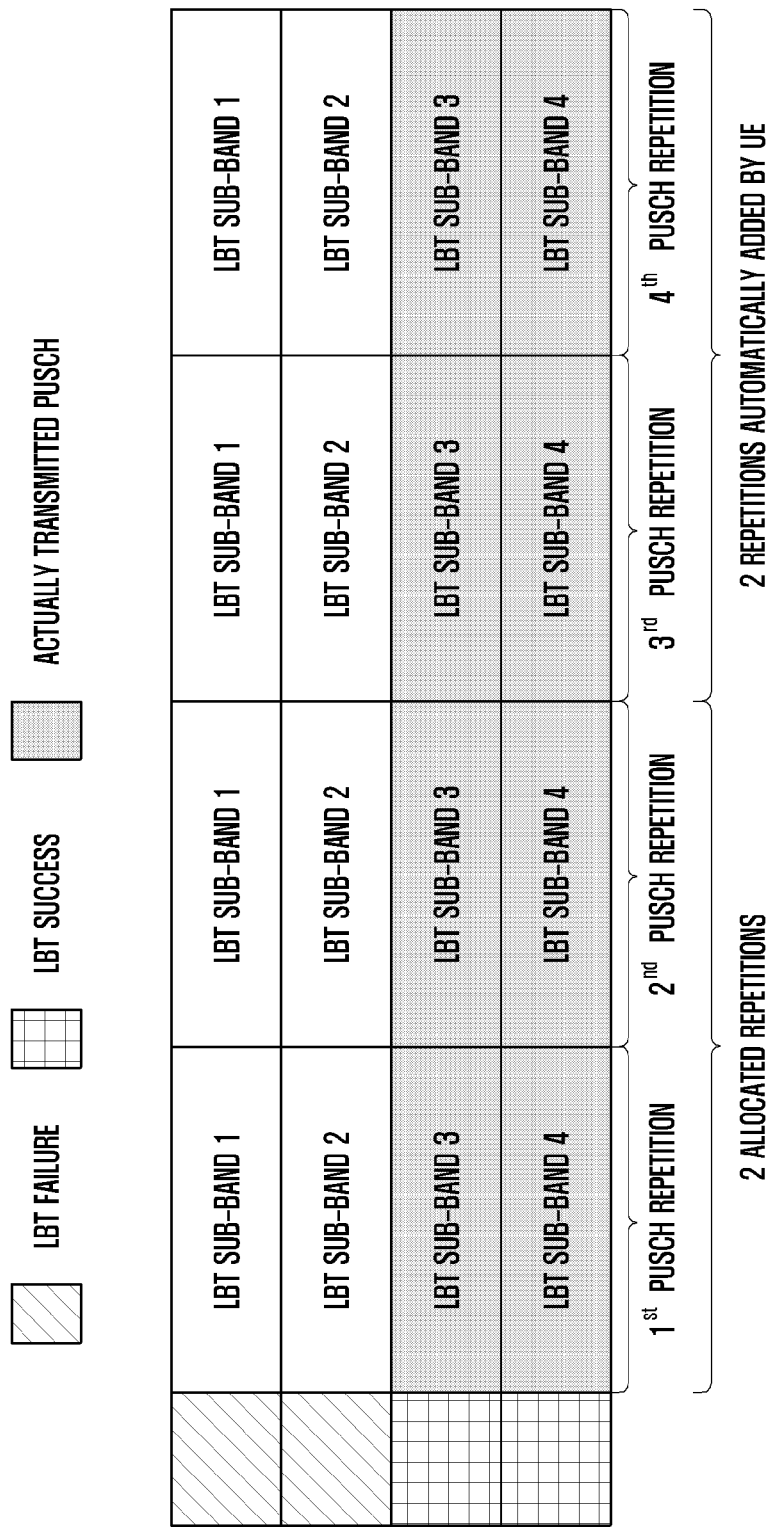

[Fig. 36]
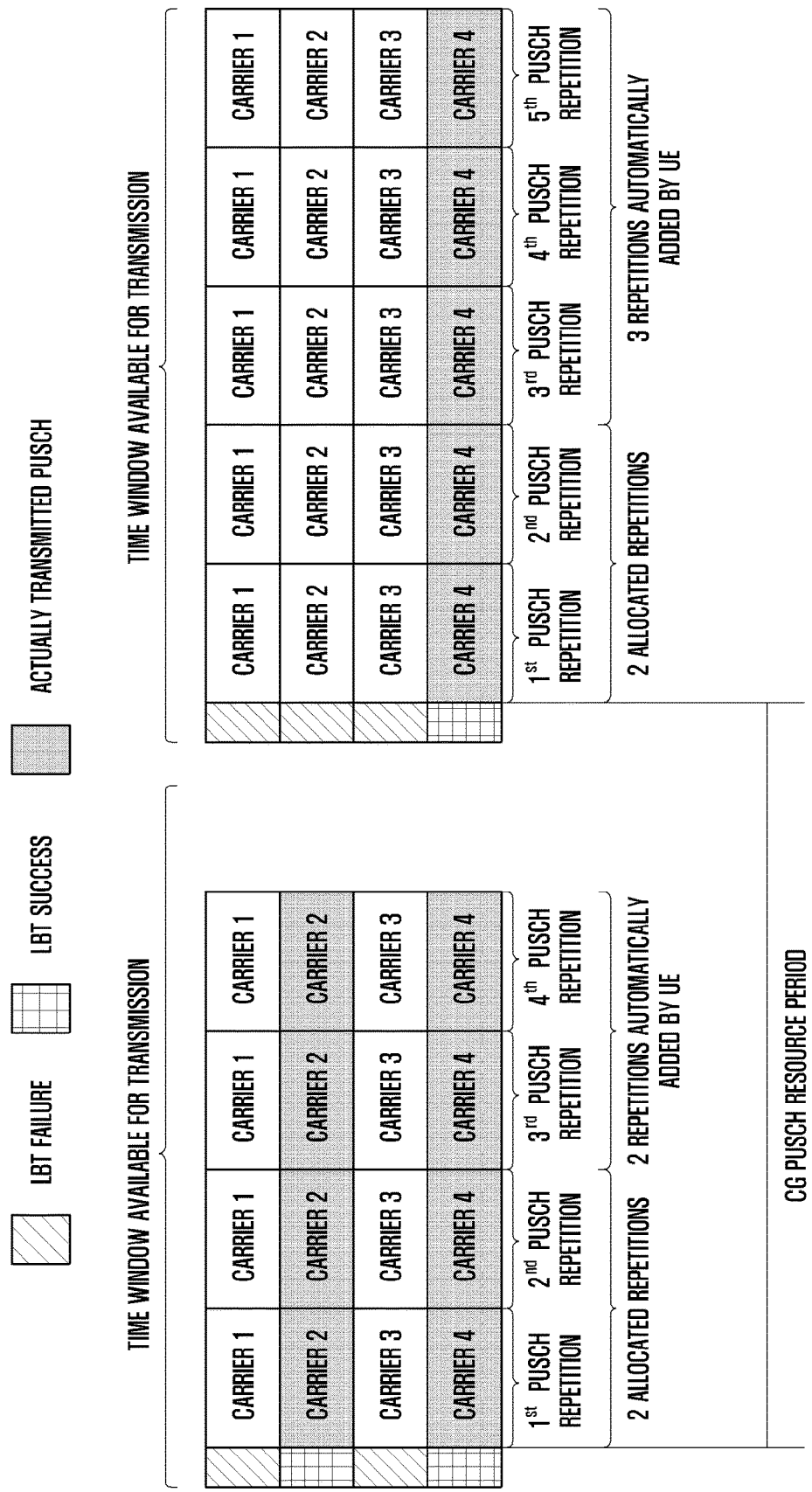

[Fig. 37]
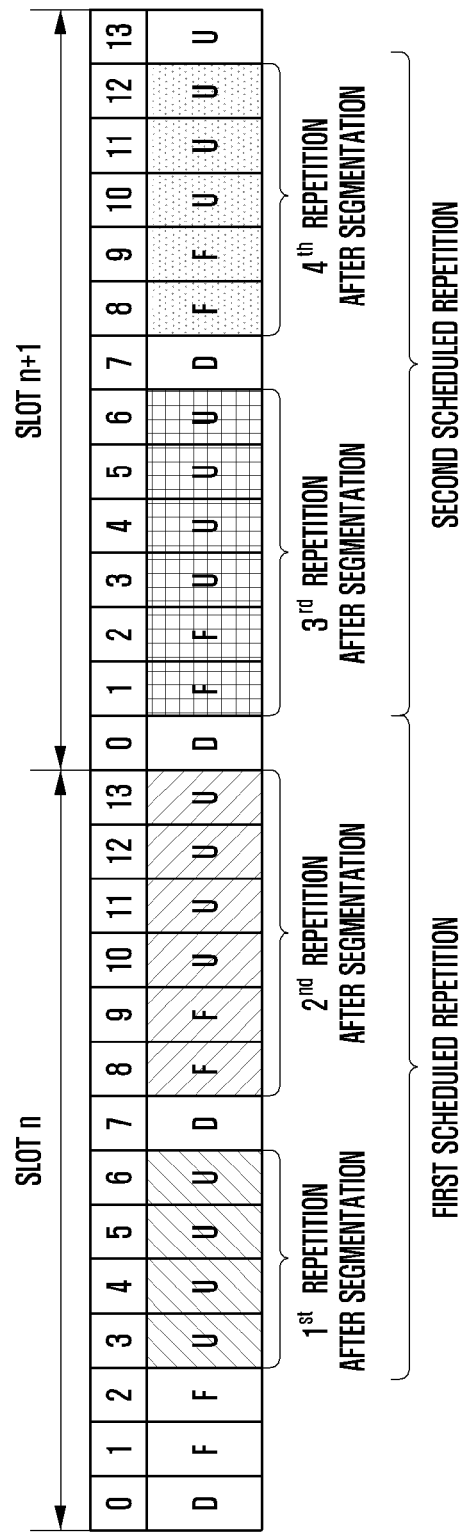

[Fig. 38]
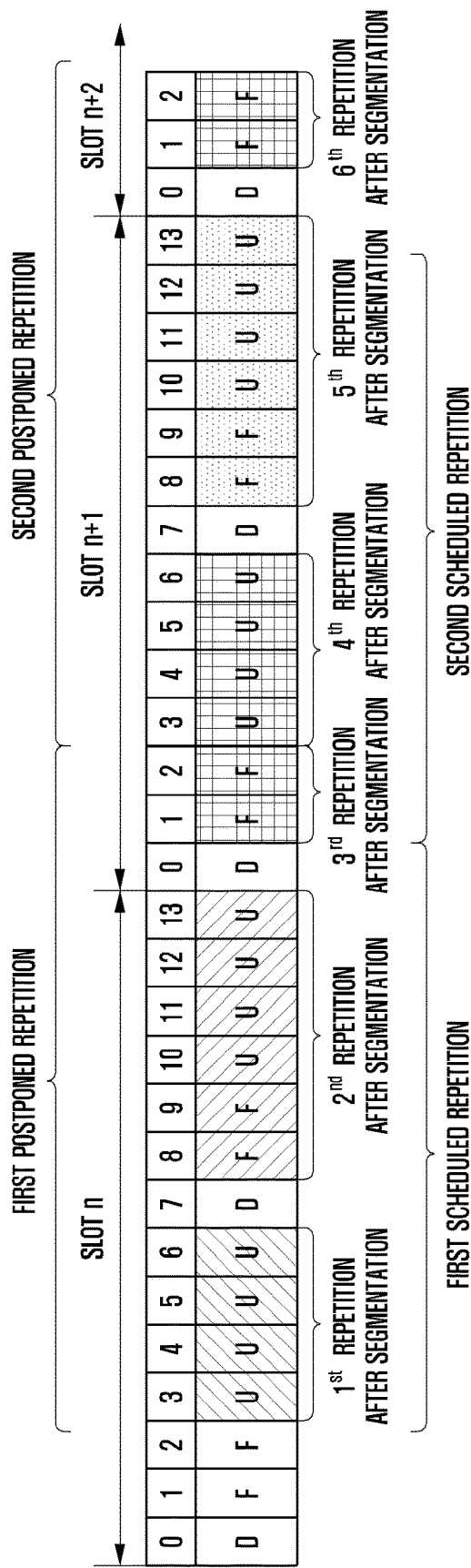

[Fig. 39]
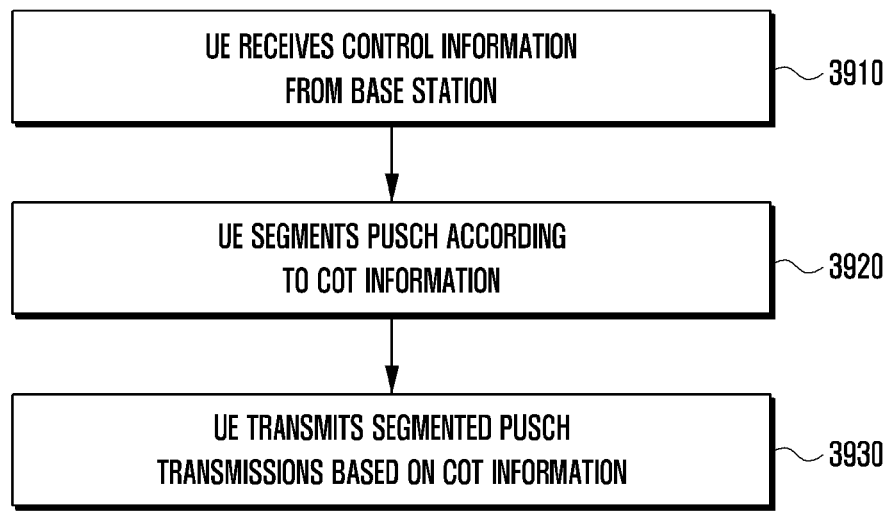

[Fig. 40]
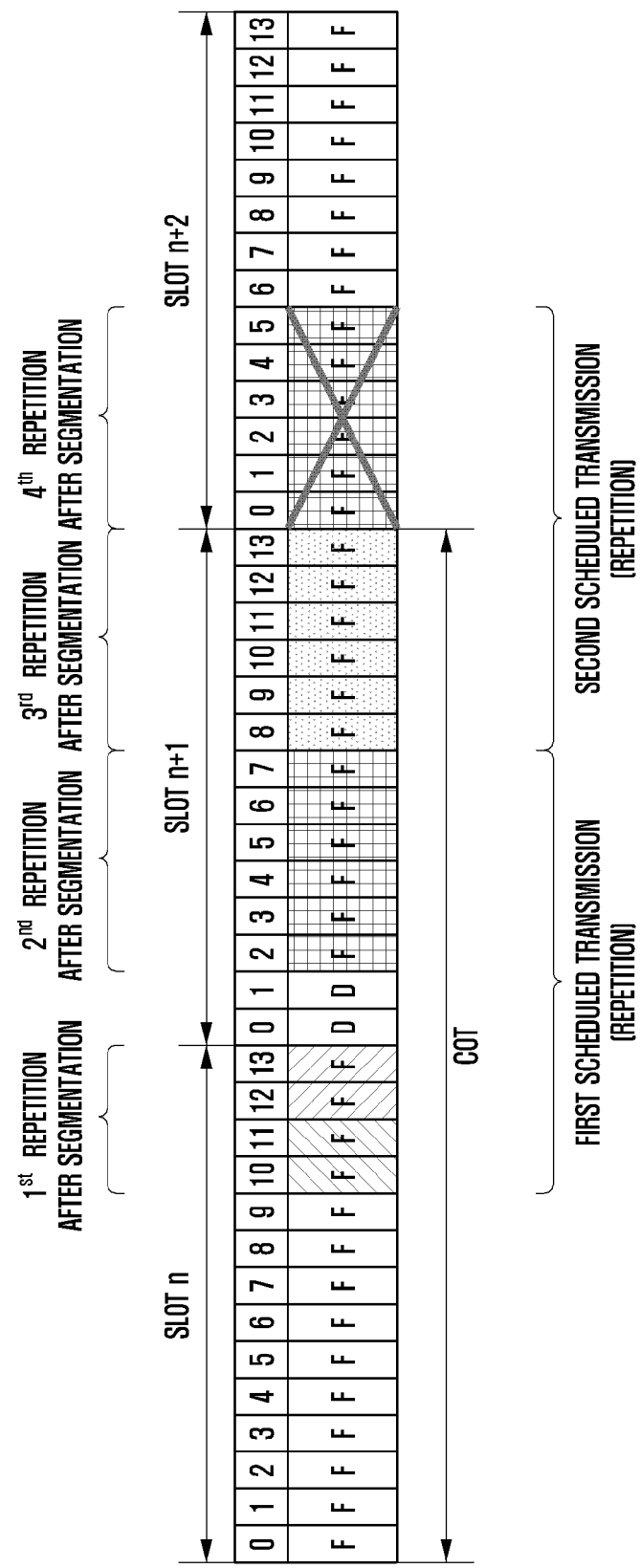

[Fig. 41]
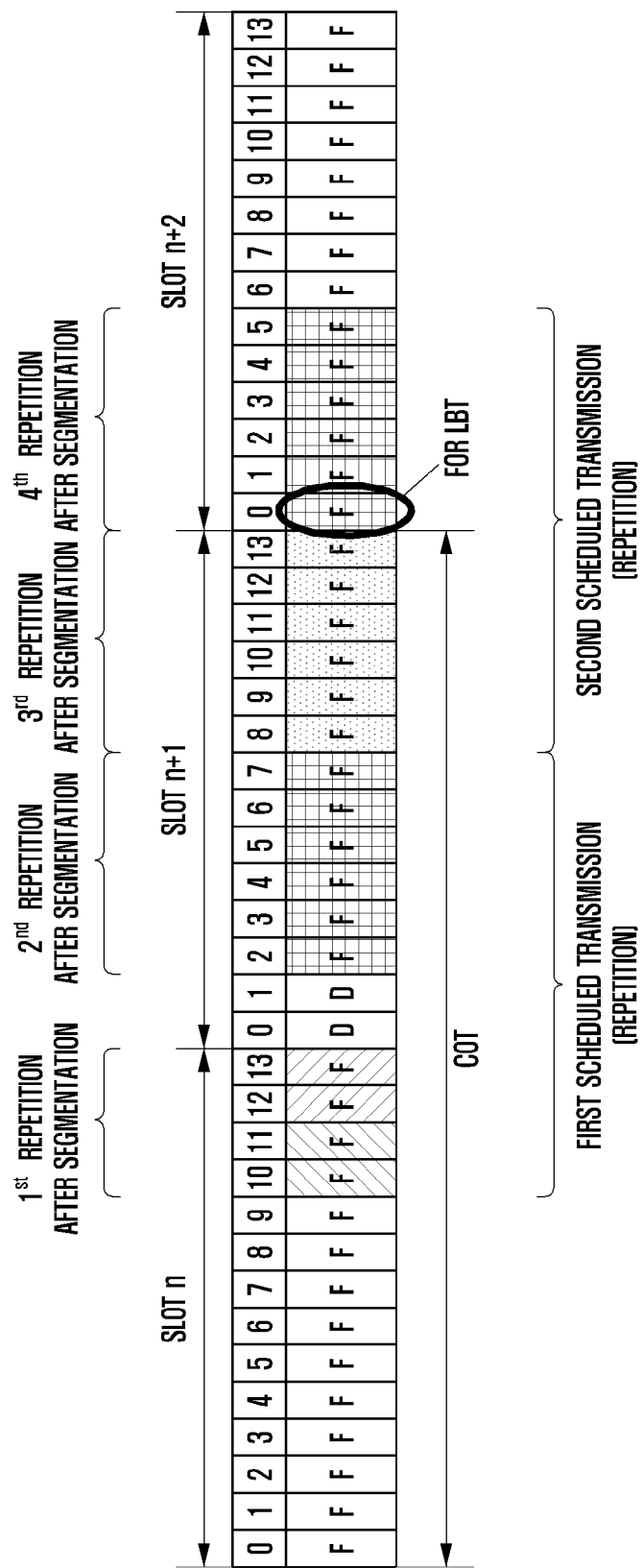

[Fig. 42]
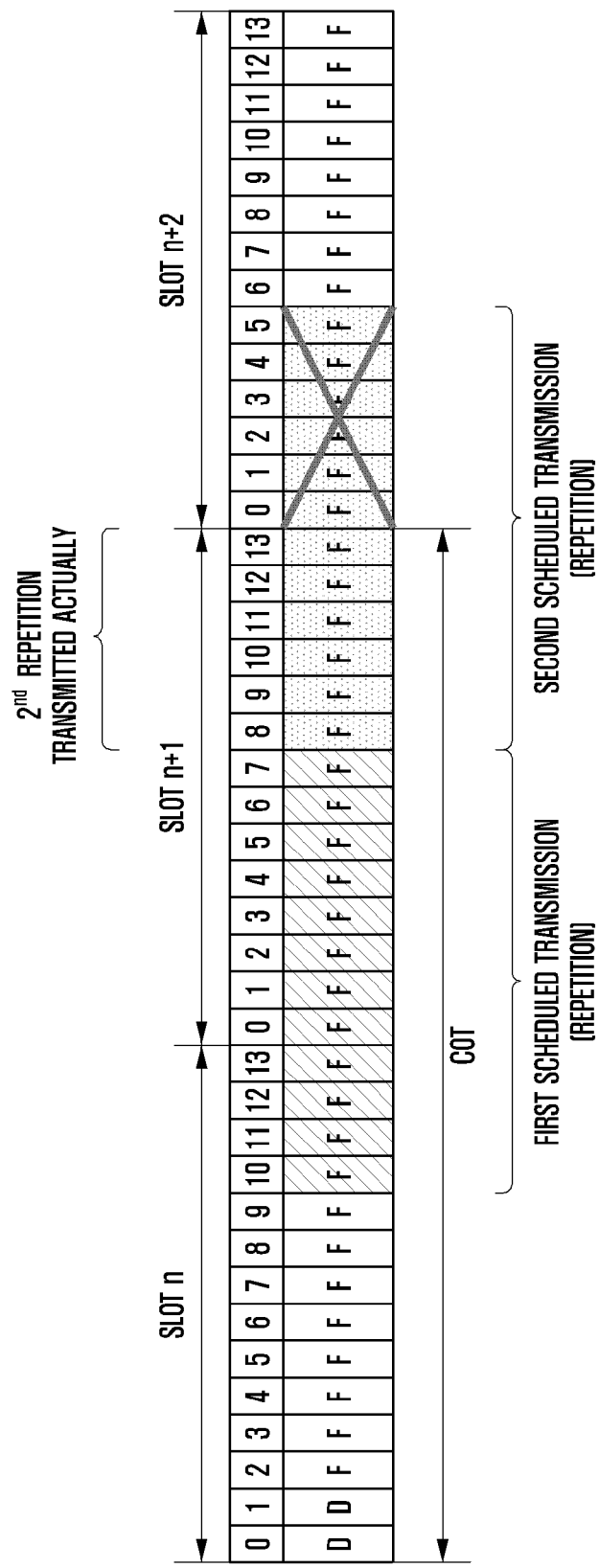

[Fig. 43]
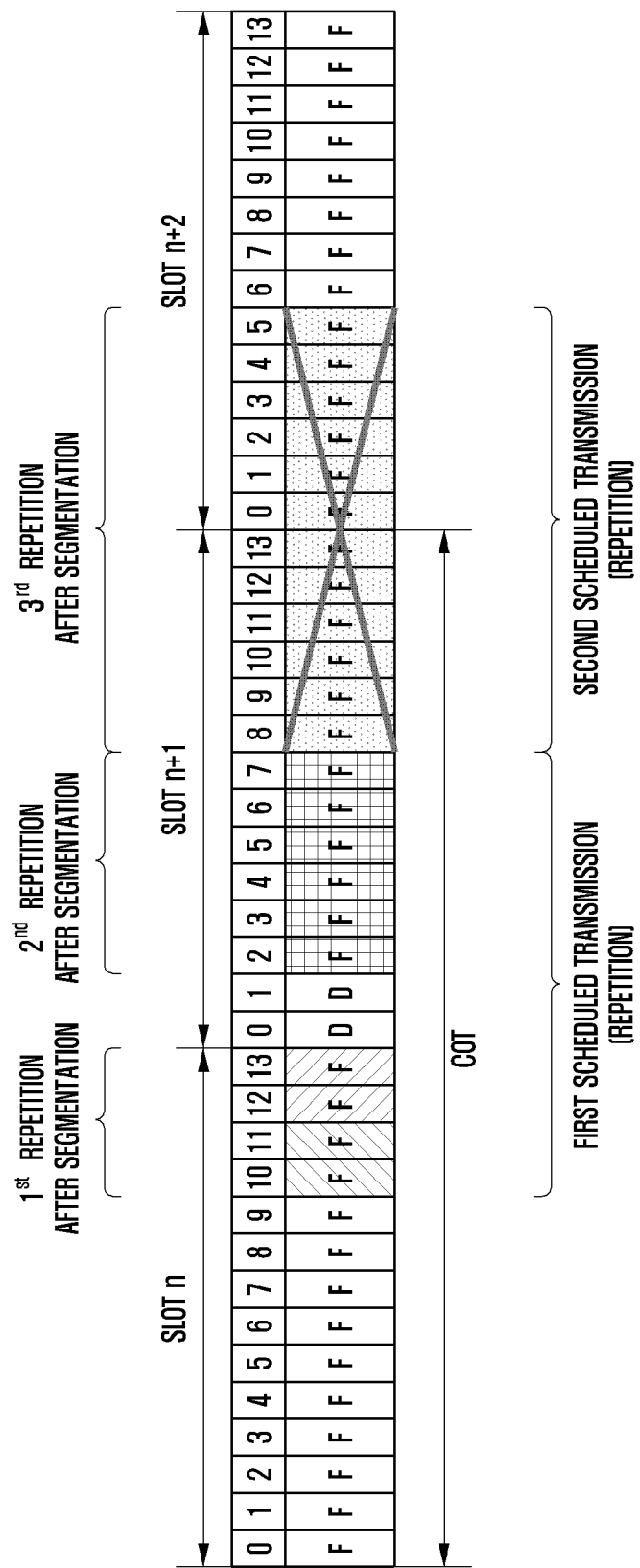

[Fig. 44]
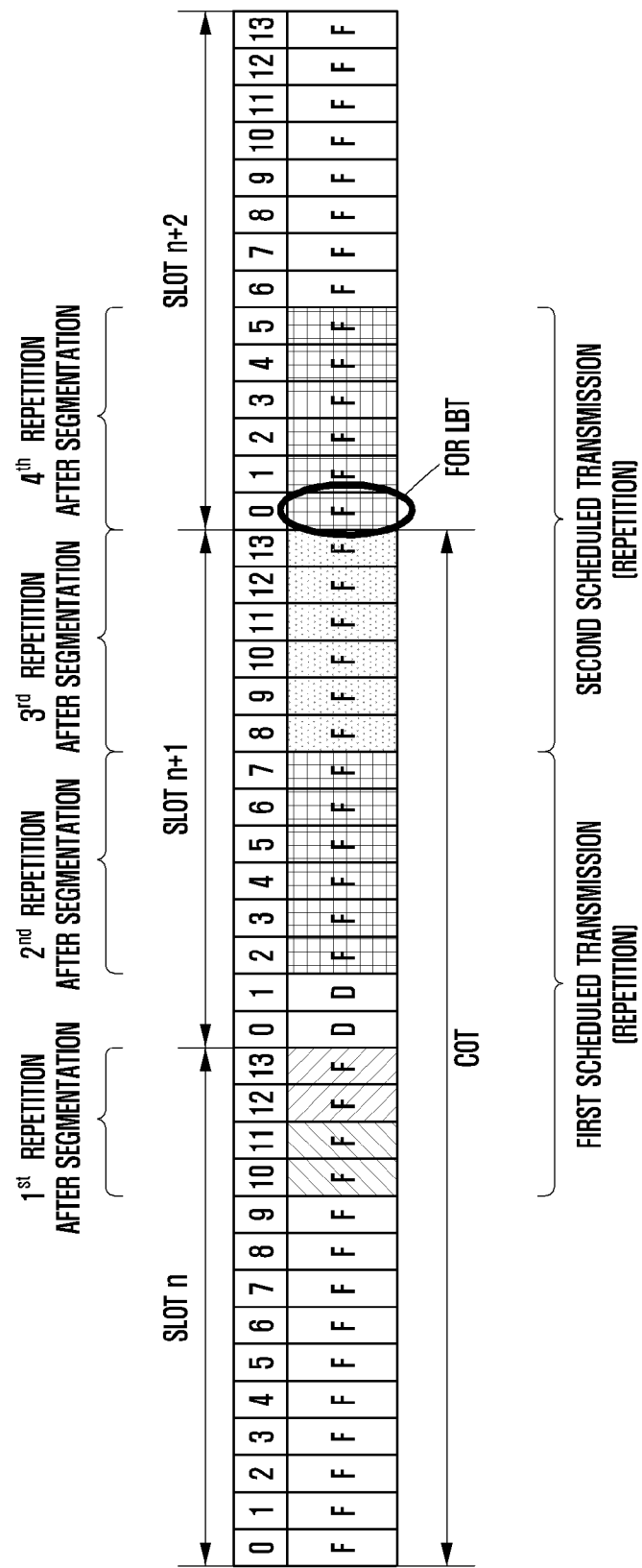

[Fig. 45]
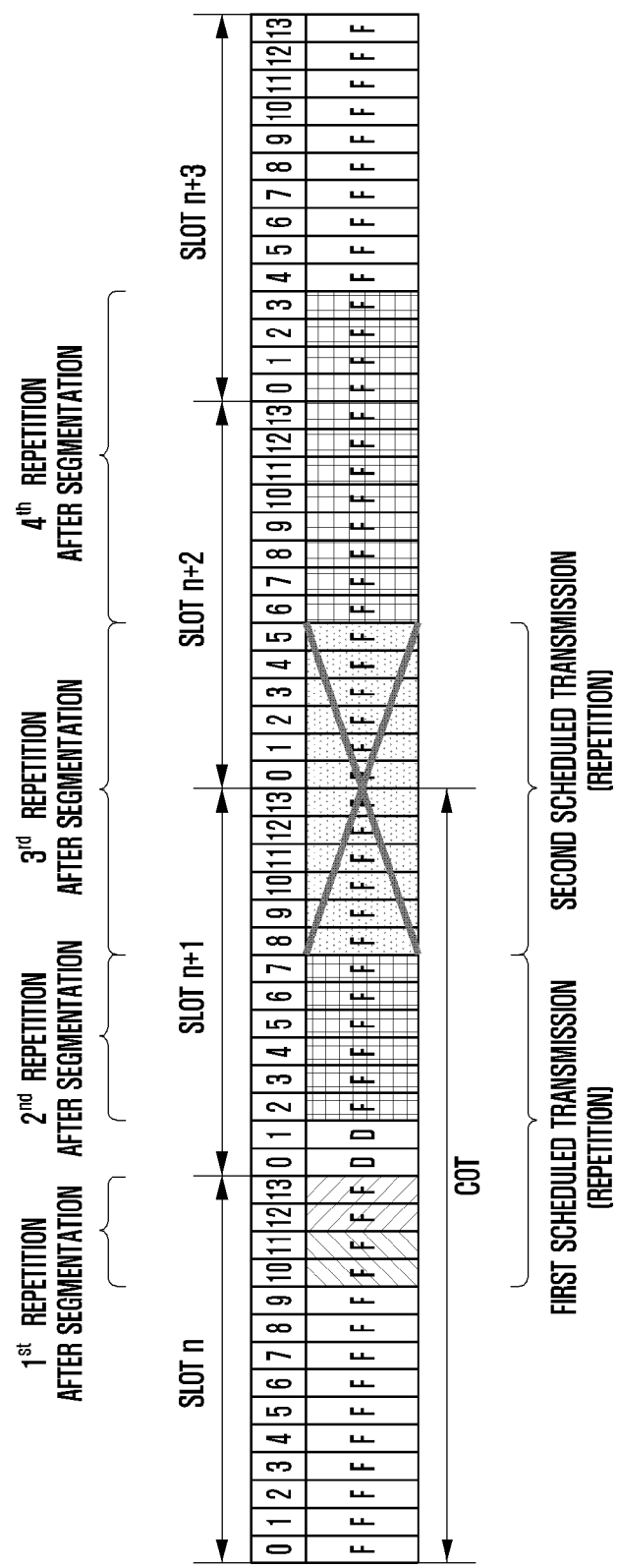

[Fig. 46]
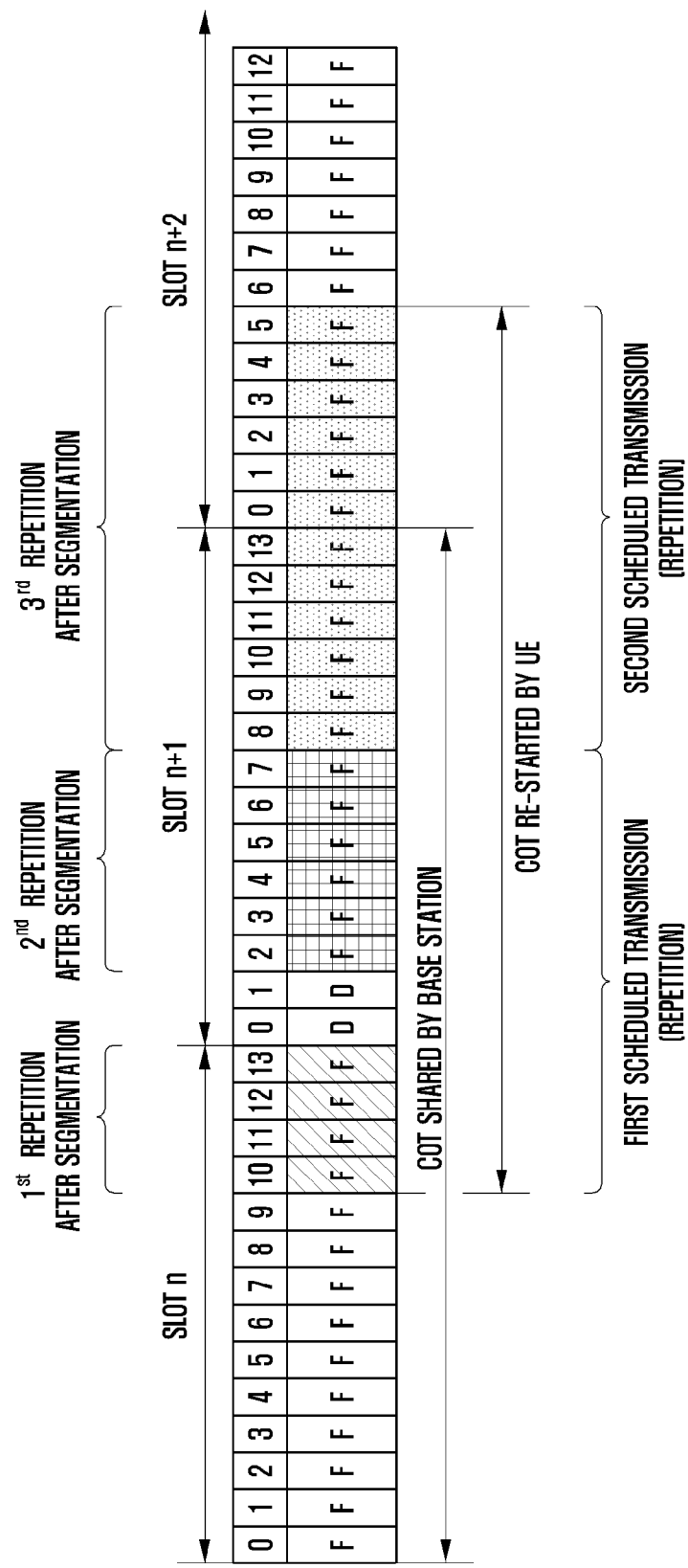

[Fig. 47]
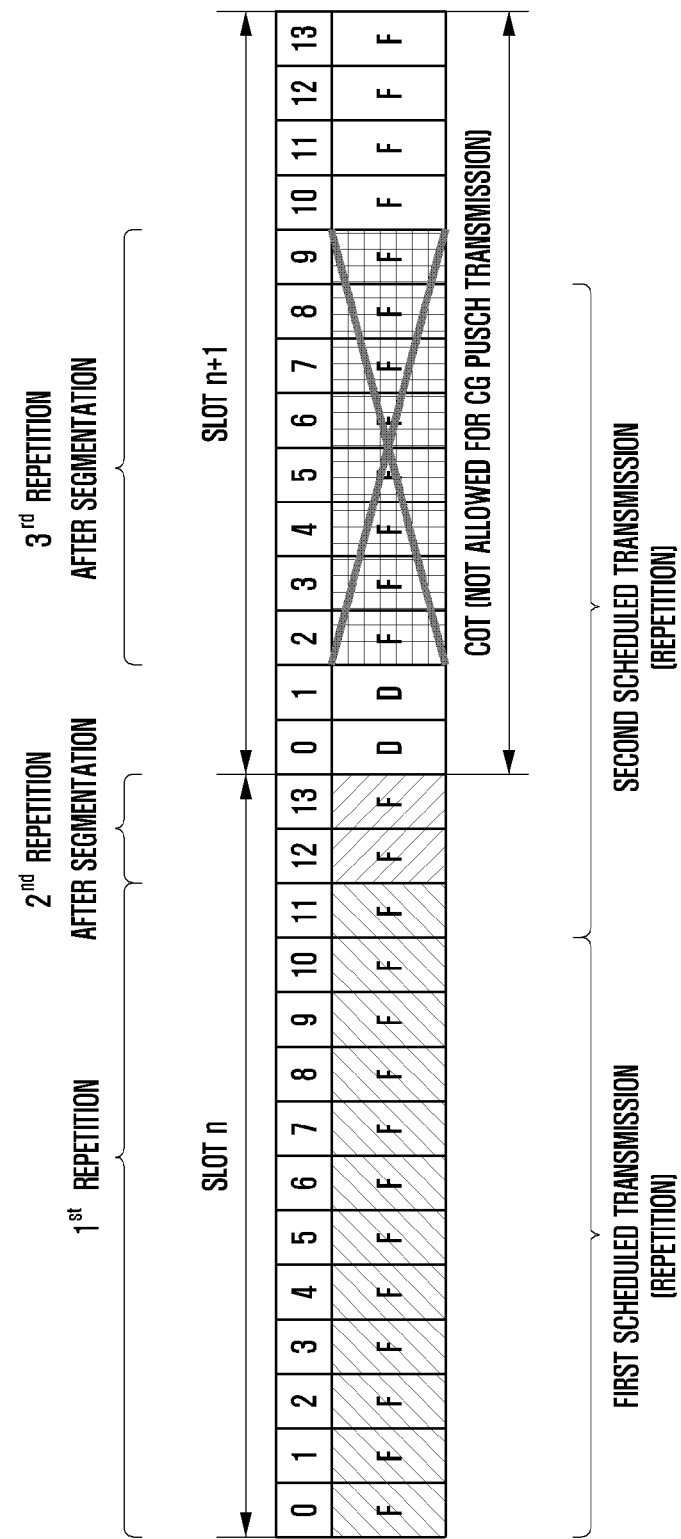

[Fig. 48]
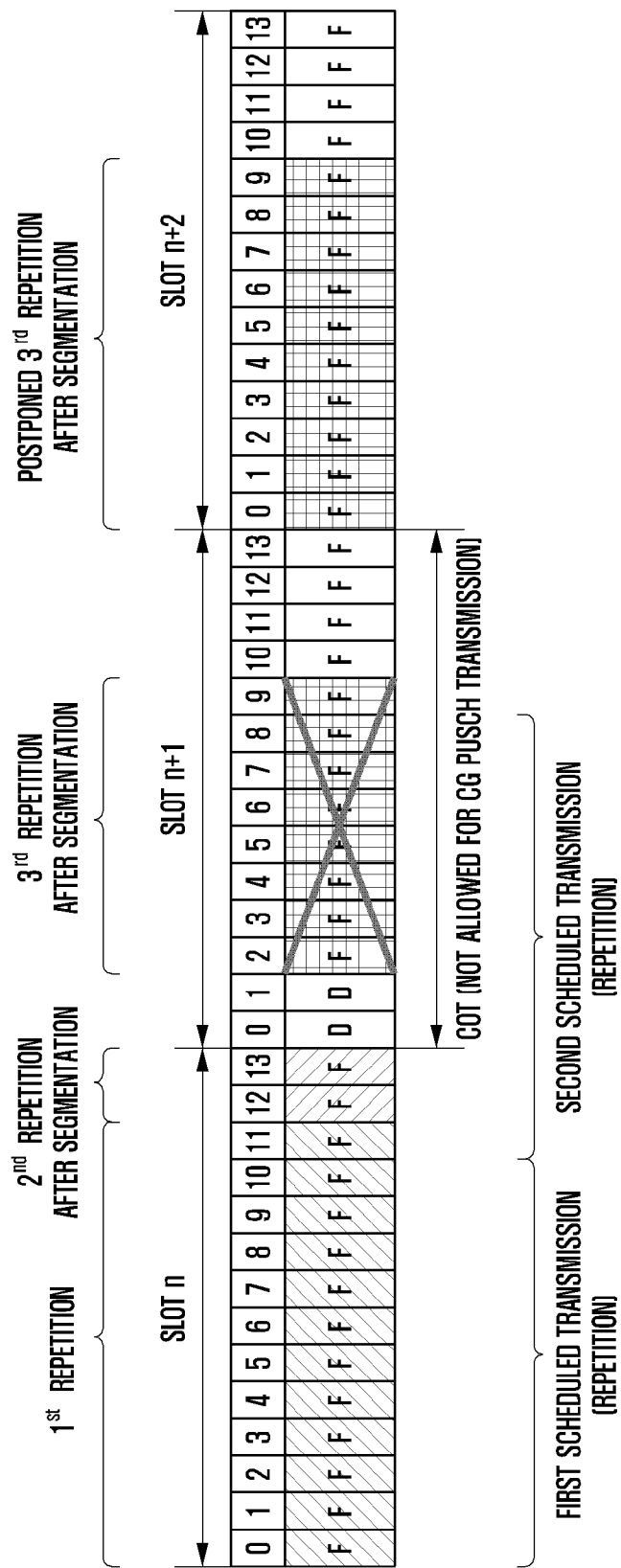

[Fig. 49]
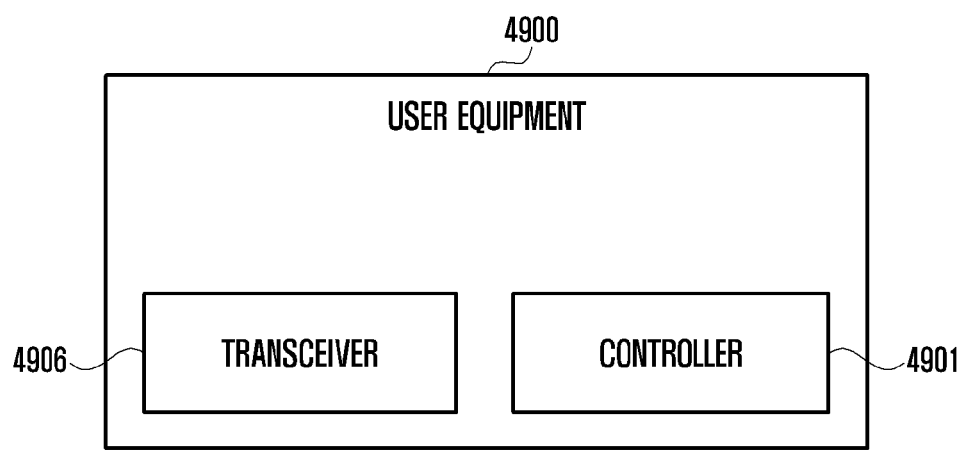

[Fig. 50]
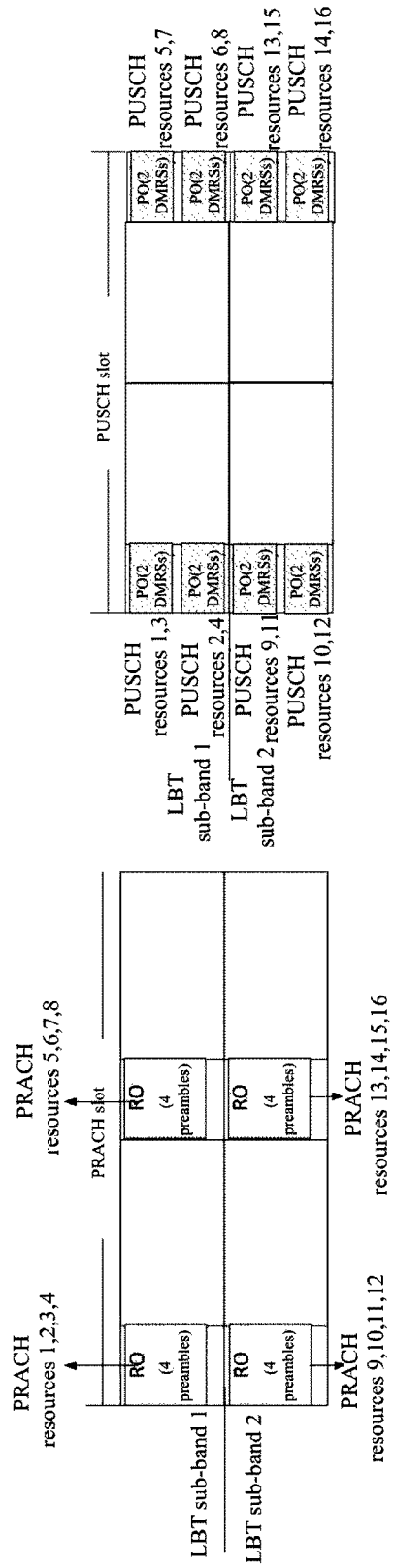

[Fig. 51]
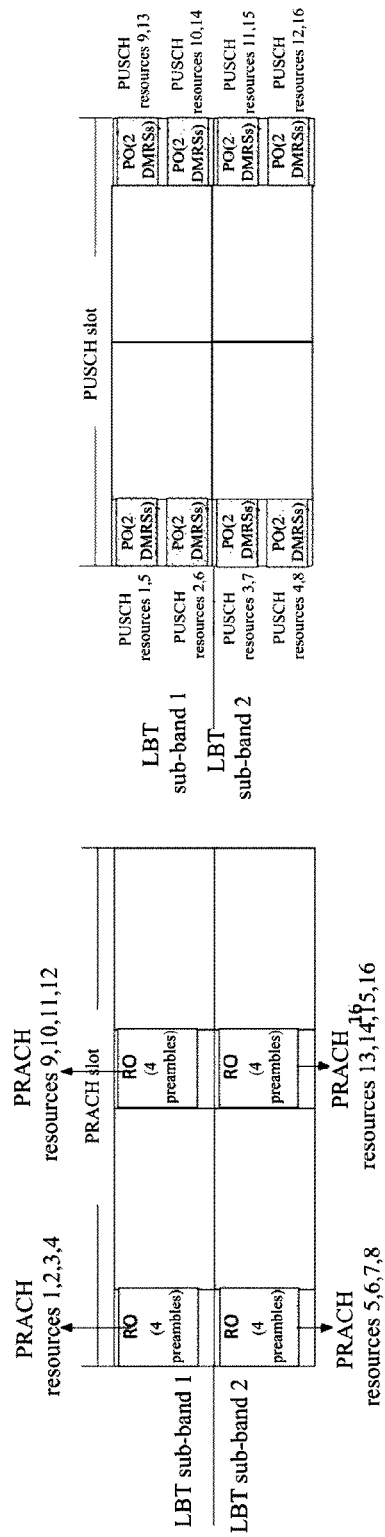

[Fig. 52]
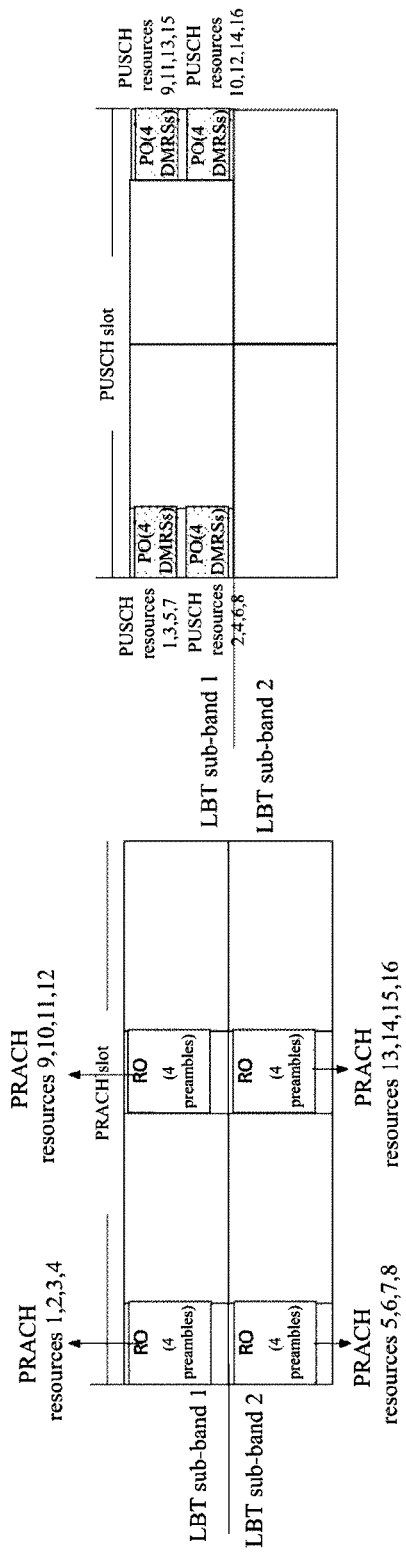

TRANSMISSION OVER A RANDOM ACCESS CHANNEL

CROSS-REFERENCE TO RELATED APPLICATIONS

This application is a 371 of International Application No. PCT/KR2020/013422 filed on Sep. 29, 2020, which claims priority to Chinese Patent Application No. 201910930526.2 filed on Sep. 29, 2019, and Chinese Patent Application No. 201911082950.2 filed on Nov. 7, 2019, the disclosures of which are herein incorporated by reference in their entirety.

BACKGROUND

1. Field

The present disclosure relates to a radio communication method and apparatus, and specifically to a transmission method and apparatus on an unlicensed frequency band.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

In order to accommodate a huge volume of business demands, it is desirable for 5G communication systems to operate on resources from low frequency bands. to high frequency bands around 100G, comprising licensed and unlicensed frequency bands. The unlicensed frequency bands mainly comprise 5 GHz frequency band and 60 GHz frequency band. A 5G system running on the unlicensed frequency band is called as a NR-U system. In the 5 GHz frequency band, 802.11 series Wireless Fidelity (WiFi) systems, radars, and LTE licensed carrier-assisted access systems have been deployed, and all of these systems follow the listen-before-talk (LBT) mechanism, that is, before sending a signal, a channel access procedure must be performed to detect a radio channel. Only when it is detected that the radio channel is idle, the radio channel may be occupied to send the signal. In the 60 GHz frequency band, an 802.11ay system also already exists, so it is also required to follow the LBT mechanism. In other unlicensed frequency bands, effective coexistence methods need to be developed in accordance with corresponding norms.

The procedure of LBT incurred before sending a signal may fail, and thus the corresponding signal would not be sent. In order to reduce an impact of LBT failure on transmission efficiency, a new method is desirable to support multiple transmission occasions for the signal. At the same time, a new method is also desirable to assess the impact of LBT failure on the transmission efficiency.

SUMMARY

The present disclosure is proposed to provide a transmission method and apparatus.

According to an embodiment of the present disclosure, a transmission method may comprise: receiving at least one piece of downlink control information; determining, based on the received downlink control information, a time resource of a to-be-sent hybrid automatic retransmission request-acknowledgement and/or a content of the to-be-sent hybrid automatic retransmission request-acknowledgement; and sending the hybrid automatic retransmission request-acknowledgement based n the determined time resource and/or the determined content.

According to another embodiment of the present disclosure, a transmission method is provided and comprises: receiving uplink signal transmission resource information; determining, based on the uplink signal transmission resource information, a frequency domain resource occupied for sending an uplink signal; and attempting to send the uplink signal on the determined frequency domain resource.

According to another embodiment of the present disclosure, a transmission method is provided and may comprise:

sending at least one piece of downlink control information; and receiving a time resource of hybrid automatic retransmission request-acknowledgement determined based on the downlink control information and/or hybrid automatic retransmission request-acknowledgement sent by hybrid automatic retransmission request-acknowledgement information.

According to another embodiment of the present disclosure, a transmission method is provided and may comprise: sending uplink signal transmission resource information; and attempting to receive the uplink signal on a frequency domain resource determined based on the uplink signal transmission resource information.

According to another embodiment of the present disclosure, a transmission apparatus is provided and may comprise: a first receiving module configured to receive at least one piece of downlink control information; a first determining module configured to determine, based on the downlink control information, a time resource of a to-be-sent hybrid automatic retransmission request-acknowledgement and/or a content of the hybrid automatic retransmission request-acknowledgement; and a first sending module configured to send the hybrid automatic retransmission request-acknowledgement based on the determined time resource and/or content of the hybrid automatic retransmission request-acknowledgement.

According to another embodiment of the present disclosure, a transmission apparatus is provided and may comprise: a second receiving module configured to receive uplink signal transmission resource information; a second determining module configured to determine, based on the uplink signal transmission resource information, a frequency domain resource occupied for sending an uplink signal; and a second sending module configured to attempt to send the uplink signal on the determined frequency domain resource.

According to another embodiment of the present disclosure, a transmission apparatus is provided and may comprise: a first base station sending module configured to send at least one piece of downlink control information; and a first base station receiving module configured to receive a time resource of hybrid automatic retransmission request-acknowledgement determined based on the downlink control information and/or hybrid automatic retransmission request-acknowledgement sent by the hybrid automatic retransmission request-acknowledgement content.

According to another embodiment of the present disclosure, a transmission apparatus is provided and may comprise: a second base station sending module configured to send uplink signal transmission resource information; and a second base station receiving module configured to attempt to receive the uplink signal on a frequency domain resource determined based on the uplink signal transmission resource information.

The present disclosure provides a transmission method and apparatus on an unlicensed frequency band.

The present disclosure further provides a method and device for transmitting uplink control information.

The present disclosure further provides to a method and device for transmitting uplink control information.

BRIEF DESCRIPTION OF THE DRAWINGS

FIG. 1 is a flowchart illustrating a transmission method according to an embodiment of the present disclosure.

FIG. 2A is a schematic diagram of a base station scheduling a plurality of PDSCHs according to another embodiment of the present disclosure.

FIG. 2B is a first enlarged schematic diagram of a base station scheduling a plurality of PDSCHs according to another embodiment of the present disclosure.

FIG. 2C is a second enlarged schematic diagram of a base station scheduling a plurality of PDSCHs according to another embodiment of the present disclosure.

FIG. 2D is a third enlarged schematic diagram of a base station scheduling a plurality of PDSCHs according to another embodiment of the present disclosure.

FIG. 2E is a fourth enlarged schematic diagram of a base station scheduling a plurality of PDSCHs according to another embodiment of the present disclosure.

FIG. 2F is a fifth enlarged schematic diagram of a base station scheduling a plurality of PDSCHs according to another embodiment of the present disclosure.

FIG. 3 is a flowchart of a transmission method according to a further embodiment of the present disclosure.

FIG. 4A is a schematic diagram of a base station scheduling a plurality of PDSCHs according to another embodiment of the present disclosure.

FIG. 4B is a first enlarged schematic diagram of a base station scheduling a plurality of PDSCHs according to another embodiment of the present disclosure.

FIG. 4C is a second enlarged schematic diagram of a base station scheduling a plurality of PDSCHs according to another embodiment of the present disclosure.

FIG. 4D is a third enlarged schematic diagram of a base station scheduling a plurality of PDSCHs according to another embodiment of the present disclosure.

FIG. 5 is a flowchart of a transmission method according to another embodiment of the present disclosure.

FIG. 6 is a flowchart of a transmission method according to another embodiment of the present disclosure.

FIG. 7 is a flowchart of a transmission method according to another embodiment of the present disclosure.

FIG. 8 is a flowchart of a transmission method according to another embodiment of the present disclosure.

FIG. 9 is a flowchart of a transmission method according to another embodiment of the present disclosure.

FIG. 10 is a flowchart of a transmission method according to another embodiment of the present disclosure.

FIG. 11 is a flowchart of a transmission method according to another embodiment of the present disclosure.

FIG. 12 is a flowchart of a transmission method according to another embodiment of the present disclosure.

FIG. 13 is a block diagram a transmission apparatus according to of an embodiment of the present disclosure.

FIG. 14 is a block diagram of a transmission apparatus according to another embodiment of the present disclosure.

FIG. 15 is a detailed schematic diagram showing a hardware entity applicable to the present disclosure.

FIG. 16A is a schematic diagram of feeding back HARQ-ACK in a PUSCH according to another embodiment of the present disclosure.

FIG. 16B is a schematic diagram of feeding back HARQ-ACK in a PUSCH according to another embodiment of the present disclosure.

FIG. 17 illustrates a flowchart of a method performed by a UE according to an embodiment of the present application.

FIG. 18 illustrates an example diagram of communication between a base station and a UE in a communication system supporting hybrid automatic repeat.

FIG. 19 illustrates a flowchart of determining resources for transmitting an HARQ-ACK by a UE according to an embodiment of the present application.

FIG. 20 illustrates a flowchart of an example in which the UE determines HARQ-ACK feedback bits of a PDSCH according to an embodiment of the present application.

FIG. 21 illustrates a flowchart of another example in which the UE determines HARQ-ACK feedback bits of a PDSCH according to an embodiment of the present application.

FIG. 22 illustrates a flowchart of an HARQ-ACK for periodic semi-persistent transmission by a UE according to an embodiment of the present application.

FIG. 23 illustrates an example in which the UE feeds back an HARQ-ACK according to an embodiment of the present application.

FIGS. 24 to 30 illustrate a further example in which the UE feeds back an HARQ-ACK according to an embodiment of the present application.

FIG. 31 illustrates a block diagram of a user equipment according to an embodiment of the present application.

FIG. 32 illustrates a flowchart of a method for transmitting uplink transmission performed by a UE according to an embodiment of the present application.

FIG. 33 illustrates a flowchart of determining resources for uplink transmission by a UE according to an embodiment of the present application.

FIG. 34 illustrates a flowchart of determining frequency resources and time resources for data transmission by a UE according to an embodiment of the present application.

FIG. 35 illustrates a flowchart of determining frequency resources and time resources for data transmission by a UE according to another embodiment of the present application.

FIG. 36 illustrates a time window available for CG PUSCH transmission according to an embodiment of the present application.

FIG. 37 illustrates an example in which a UE processes repeated transmissions of a transport block (TB).

FIG. 38 illustrates another example in which a UE processes repeated transmissions of a transport block (TB).

FIG. 39 illustrates a flowchart of transmitting uplink data by a UE based on channel occupancy time (COT) information according to an embodiment of the present application.

FIG. 40 illustrates an example in which a UE transmits uplink data based on channel occupancy time (COT) information according to an embodiment of the present application.

FIG. 41 illustrates another example in which a UE transmits uplink data based on the channel occupancy time (COT) information according to an embodiment of the present application.

FIG. 42 illustrates another example in which a UE transmits uplink data based on the channel occupancy time (COT) information according to an embodiment of the present application.

FIG. 43 illustrates another example in which a UE transmits uplink data based on the channel occupancy time (COT) information according to an embodiment of the present application.

FIG. 44 illustrates another example in which a UE transmits uplink data based on the channel occupancy time (COT) information according to an embodiment of the present application.

FIG. 45 illustrates another example in which a UE transmits uplink databased on channel occupancy time (COT) information according to an embodiment of the present application.

FIG. 46 illustrates an example in which a UE re-determines the COT to transmit uplink data according to an embodiment of the present application.

FIG. 47 illustrates an example in which a UE transmits uplink data based on channel occupancy time (COT) information.

FIG. 48 illustrates an example in which a UE transmits uplink data based on channel occupancy time (COT) information according to an embodiment of the present application.

FIG. 49 illustrates a block diagram of a user equipment according to an embodiment of the present application.

FIG. 50 illustrates an example of correlation between PRACH resources and PUCCH resources according to an embodiment of the present invention.

FIG. 51 illustrates another example of correlation between PRACH resources and PUCCH resources according to an embodiment of the present invention.

FIG. 52 illustrates another example of correlation between PRACH resources and PUCCH resources according to an embodiment of the present invention.

DETAILED DESCRIPTION

The present disclosure will be further described below in detail in reference to the accompanying drawings and the embodiments. It may be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should be noted that the embodiments in the present disclosure or the features in the embodiments may be combined with each other on a non-conflict basis.

The embodiments of the present application are described in detail below. Examples of the embodiments are shown in the drawings, in which the same or similar reference numerals denote the same or similar elements or elements having the same or similar functions. The embodiments described below with reference to the drawings are exemplary, and are only used to explain the present application, and cannot be construed as limiting of the present application.

Those skilled in the art can understand that unless specifically stated, the singular forms "a", "an", "said" and "the" used herein may also include the plural forms. It should be further understood that the word "comprising" used in the specification of the present application refers to the presence of the described features, integers, steps, operations, elements and/or components, but does not exclude the presence or addition of one or more other features, integers, steps, operations, elements, components, and/or groups thereof. It should be understood that when an element is referred to as being "connected" or "coupled" to another element, it can be directly connected or coupled to the other element, or intervening elements may also be present. In addition, "connected" or "coupled" as used herein may include wirelessly connected or wirelessly coupled. The expression "and/or" as used herein includes all or any unit and all combinations of one or more associated listed items.

Those skilled in the art can understand that, unless otherwise defined, all terms (including technical and scientific terms) used herein have the same meaning as those generally understood by those of ordinary skill in the art to which this application belongs. It should also be understood that terms such as those defined in a general dictionary should be understood to have a meaning consistent with the meaning in the context of the prior art, and unless specifically defined as used herein, it will not be explained in an idealized or excessively formal sense.

Those skilled in the art can understand that the "terminal" and "terminal device" used herein include both a device of a wireless signal receiver, which only has a device of a wireless signal receiver without transmitting capabilities, and a device of hardware for receiving and transmitting, which has a device of hardware for receiving and transmitting bidirectional communication on a bidirectional communication link. Such a device may include: cellular or other communication devices with single-line or multi-line displays or cellular or other communication devices without multi-line displays; PCSs (Personal Communication Systems), which can combine voice, data processing, fax and and/or data communication capabilities; PDAs (Personal Digital Assistants), which can include radio frequency receivers, pagers, Internet/Intranet access, web browsers, notepads, calendars, and/or GPS (Global Positioning System) receivers; conventional laptop and/or palmtop computers or other devices that have and/or include radio frequency receivers. As used herein, a "terminal" and "terminal equipment" may be portable, transportable, installed in a (aeronautical, marine, and/or terrestrial) vehicle, or suitable for and/or configured to operate locally and/or operate at any other location on the earth and/or in the space in a distributed form. The "terminal" and "terminal device" as used herein may also be a communication terminal, an Internet terminal, a music/video playback terminal, for example, may be a PDA, MID (mobile Internet device) and/or a mobile phone with music/video playback functions, and it may also be a device such as a smart TV and set-top box.

Hereinafter, various embodiments of the present application will be described in detail with reference to the drawings.

The present disclosure relates to a radio communication method and apparatus, and specifically to a transmission method and apparatus on an unlicensed frequency band.

FIG. 1 is a flowchart of a transmission method according to an embodiment of the present disclosure. As shown in FIG. 1, the transmission method according to the present embodiment may comprise the following steps.

At step 101, a user equipment (referred to as UE) receives at least one piece of downlink control information (referred to as DCI) used for feeding back hybrid automatic retransmission reQuest-ACK (referred to as HARQ-ACK).

At step 102, the UE determines a time resource of a to-be-sent HARQ-ACK and/or a content of the HARQ-ACK based on the received DCI.

Here, the DCI may comprise a first bit field, a second bit field, and a third bit field. The first bit field is used to indicate a PDSCH group index scheduled by the DCI; the second bit field is used to indicate an ACK feedback status of a PDSCH group scheduled by the DCI; and the third bit field is used to indicate all HARQ processes HARQ-ACK feedback and is used to determine an ACK feedback status of a PDSCH group other than the PDSCH group scheduled by the DCI.

Specifically, the third bit field comprises two bits and has a first status, a second status, a third status, and a fourth status. For example: the first status may be represented by "00"; the second status may be represented by "01"; the third status may be represented by "10"; and the fourth status may be represented by "11".

The first status is used to trigger HARQ-ACK feedback of the current physical downlink shared channel (referred to as PDSCH) group.

The second status is used to trigger HARQ-ACK feedback of two PDSCH groups.

The third status is used to trigger HARQ-ACK feedback of all HARQ processes and is used to indicate that the ACK feedback status of a PDSCH group other than the PDSCH group scheduled by the DCI is an toggled status.

The fourth status is used to trigger HARQ-ACK feedback of all HARQ processes and is used to indicate that the ACK feedback status of a PDSCH group other than the PDSCH group scheduled by the DCI is a non-untoggled status.

Further, the status information of the to-be-sent HARQ-ACK (hereinafter, "HARQ-ACK status information"), which is determined based on the received DCI by the UE, may comprise: the HARQ-ACK of the current PDSCH group; or the HARQ-ACK of two PDSCH groups; or the HARQ-ACK of all HARQ processes.

At step 103, the UE sends the HARQ-ACK based on the determined HARQ-ACK status information, since the to-be-sent HARQ-ACK status information is determined in the above step.

If the UE determines the HARQ-ACK feeding back all HARQ processes based on the received DCI at step 102, then it determines a HARQ-ACK value of each of the HARQ-ACK processes, based on the ACK feedback status of the current PDSCH group indicated by the second bit field and the ACK feedback status of a PDSCH group other than the current PDSCH group indicated by the third bit field.

According to an embodiment of the transmission method of the present disclosure, through the two bits of the third bit field of the DCI, four status may be fed back respectively, namely, 1) triggering HARQ-ACK feedback of the current PDSCH group, 2) triggering HARQ-ACK feedback of two PDSCH groups, 3) triggering HARQ-ACK feedback of all HARQ processes, which is used to indicate that the ACK feedback status of a PDSCH group other than the current PDSCH group is an toggled status, and 4) triggering HARQ-ACK feedback of all HARQ processes, which is used to indicate that the ACK feedback status of a PDSCH group other than the current PDSCH group is a non-toggled status.

However, in the prior art, when the HARQ-ACK feedback of the current PDSCH group is triggered, and the HARQ-ACK feedback of two PDSCH groups is triggered, it needs to be implemented with 1 bit; when the HARQ-ACK feedback of all HARQ processes is triggered and is used to indicate that the ACK feedback status of the further PDSCH group other than the current PDSCH group is an toggled status, and the HARQ-ACK feedback of all HARQ processes is triggered and is used to indicate that the ACK feedback status of a PDSCH group other than the PDSCH group is a non-toggled status, it needs to be implemented with 1 bit. That is, in the prior art, to practice the feedback of the four status, as discussed in the transmission method according to the present disclosure, three bits are required.

Therefore, the transmission method according to an embodiment of the present disclosure reduces DCI overhead by ⅓ compared with the prior art.

Hereinafter, the technical solution of determining HARQ-ACK status information will be described in detail in combination with specific embodiments.

To reduce the impact of an LBT failure on HARQ-ACK feedback, it is necessary to support the HARQ-ACK retransmission mechanism. The base station may trigger the UE to retransmission the HARQ-ACK that the base station did not successfully receive.

Specifically, the base station may configure a dynamic HARQ-ACK codebook based on PDSCH grouping for the UE. The base station may trigger HARQ-ACK feedback of one or more PDSCH groups. If the UE does not send HARQ-ACK due to an LBT failure, or the base station fails to detect HARQ-ACK sent by the UE due to a hidden terminal, the base station may trigger the HARQ-ACK feedback of the PDSCH groups containing the HARQ-ACK, thereby obtaining the HARQ-ACK information again.

In addition, the base station may configure HARQ-ACK feedback based on all PDSCH processes for the UE, and obtain the HARQ-ACK information again. In order to achieve flexible selection of overhead and robustness, the base station may configure a dynamic switching of the dynamic HARQ-ACK codebook and the HARQ-ACK codebook of all PDSCH processes for the UE. In order to avoid too much overhead in the downlink control information DCI, the present embodiment combines the characteristics of the two codebooks to design a bit field for the HARQ-ACK feedback in the DCI.

The downlink DCI for scheduling the PDSCH comprises a bit field for the HARQ-ACK feedback. In order to support HARQ-ACK retransmission, the bit field for the HARQ-ACK feedback comprises: grouping information of the HARQ-ACK feedback of the currently scheduled PDSCH (PDSCH group index), ACK feedback indication information of a PDSCH group (ACK-feedback indicator), HARQ-ACK feedback request group information (PDSCH set), and downlink assignment index (DAI).

The plurality of PDSCHs scheduled by the base station may be divided into one or more PDSCH groups. The HARQ-ACK of all PDSCHs in the same PDSCH group is fed back in the same physical uplink control channel (referred to as PUCCH).

The base station indicates which PDSCH group the currently scheduled PDSCH belongs to through a PDSCH group index.

Each PDSCH group has an ACK-feedback indicator for indicating whether the UE needs to feed back HARQ-ACK information in the last HARQ-ACK feedback of the group when feeding back the HARQ-ACK of the current PDSCH. For example, if the ACK-feedback indicator is toggled from the last ACK-feedback indicator of the same group, then there is no need to feedback the last HARQ-ACK information (single or a plurality of HARQ-ACK of PDSCH belonging to the same group that the last HARQ-ACK information may contain) in the current feedback. If the ACK-feedback indicator remains unchanged from the last ACK-feedback indicator of the same group, then the last HARQ-ACK information needs to be fed back in the current feedback.

The HARQ-ACK feedback request group information PDSCH set is a set of PDSCH groups that need to simultaneously feedback HARQ-ACK in the same PUCCH. For example, the HARQ-ACK feedback request group information comprises the HARQ-ACK feedback that triggers only the currently scheduled PDSCH group, or the HARQ-ACK feedback of the currently scheduled PDSCH group and at least one other group, or the HARQ-ACK feedback of all HARQ processes.

The dynamic HARQ-ACK codebook needs to be determined at least on: the PDSCH group index of the current PDSCH, and the ACK feedback status of this PDSCH group (that is, whether the UE needs to feed back the HARQ-ACK information in the last HARQ-ACK feedback of the group when feeding back the HARQ-ACK of the current PDSCH), and a PDSCH set that may trigger this PDSCH group. The HARQ-ACK codebook of all PDSCH processes needs at least a PDSCH set that may trigger all PDSCH processes.

Further, in order to determine the HARQ-ACK value of each PDSCH process more accurately, it is necessary to indicate the ACK feedback status of the PDSCH of each PDSCH process.

A simple implementation method is to indicate the ACK feedback status of each PDSCH process separately, but the overhead is too much.

In another implementation method, the HARQ-ACK of the HARQ processes belonging to these PDSCH groups may be determined by using the PDSCH group indexes of the dynamic HARQ-ACK codebook and the ACK feedback status of each PDSCH group, thereby reducing DCI overhead. That is, when the base station triggers the HARQ-ACK feedback of all HARQ processes, the base station indicates the ACK feedback status of all PDSCH groups.

For example, the base station configures a maximum of 2 PDSCH groups for the UE, and the base station configures a dynamic switching of the dynamic HARQ-ACK codebook and the HARQ-ACK codebook based on all HARQ processes.

In the DCI, a PDSCH group index of the first bit field is used to indicate grouping information of the HARQ-ACK feedback of the currently scheduled PDSCH. The ACK-feedback indicator of the second bit field indicates the ACK feedback status of the group to which the currently scheduled PDSCH belongs. The third bit field is used to indicate: only triggering the HARQ-ACK feedback in the group to which the currently scheduled PDSCH belongs; triggering the HARQ-ACK feedback in 2 PDSCH groups; triggering the HARQ-ACK feedback in all HARQ processes, wherein the ACK feedback indication of the other group other than the group to which the currently scheduled PDSCH belongs is toggled; and triggering the HARQ-ACK feedback all HARQ processes, wherein the ACK feedback indication of the other group other than the group to which the currently scheduled PDSCH belongs is non-toggled.

Alternatively, in the DCI, the first bit field indicates the PDSCH group index. The ACK-feedback indicator in the second bit field is the ACK feedback status of the current PDSCH group. The third bit field indicates the HARQ-ACK feedback for triggering the current PDSCH group or the current and the further PDSCH group, or indicates the ACK feedback status of the further PDSCH group. The fourth bit field indicates whether to trigger the HARQ-ACK feedback of all HARQ processes.

Specifically, when the fourth bit field triggers the HARQ-ACK feedback of all HARQ processes, the third bit field indicates the ACK feedback status of the further PDSCH group. When the fourth bit field does not trigger the HARQ-ACK feedback of all HARQ processes, the third bit field indicates the HARQ-ACK feedback for triggering the current PDSCH group or triggering the current and the further PDSCH group.

For example, the DCI contains 4 bits, wherein the first bit is the PDSCH group index, the second bit is the ACK feedback status of the current PDSCH group, and the fourth bit is the HARQ-ACK feedback indication for triggering all HARQ processes. When the fourth bit triggers the HARQ-ACK feedback of all HARQ processes, for example, when the value of the fourth bit is 1, the third bit is used to indicate the ACK feedback status of the further PDSCH group other than the current PDSCH group. When the fourth bit does not trigger the HARQ-ACK feedback of all HARQ processes, for example, when the value of the fourth bit is 0, the third bit is used to indicate the HARQ-ACK feeding back the current PDSCH group (for example, the third bit is 0) or the HARQ-ACK feedback of the current and the further PDSCH group (for example, the third bit is 1). The present disclosure does not limit the sequence of these bit fields.

If the base station triggers the HARQ-ACK feedback of all HARQ processes, if a HARQ process does not belong to any PDSCH group, or the HARQ process has been indicated by the base station as no need for further feedback (ACK feedback status is toggled) after the last HARQ-ACK feedback, and the HARQ process has not been scheduled since then (compared to the ACK feedback status of the PDSCH group in the DCI scheduling the last transmission of the HARQ process, the ACK feedback status of the group to which the PDSCH belongs in the DCI that triggers the HARQ-ACK feedback of all HARQ processes is toggled), then the HARQ-ACK value of the HARQ process is NACK. If a HARQ process belongs to a PDSCH group and is not indicated by the base station as "no need for further feedback", ACK or NACK is generated according to a PDSCH decoding result.

FIG. 2A is a schematic diagram of a base station scheduling a plurality of PDSCHs in another embodiment of the present disclosure. FIG. 2B is a first enlarged schematic diagram of a base station scheduling a plurality of PDSCHs in another embodiment of the present disclosure. FIG. 2C is a second enlarged schematic diagram of a base station scheduling a plurality of PDSCHs in another embodiment of the present disclosure. FIG. 2D is a third enlarged schematic diagram of a base station scheduling a plurality of PDSCHs in another embodiment of the present disclosure. FIG. 2E is a fourth enlarged schematic diagram of a base station scheduling a plurality of PDSCHs in another embodiment of the present disclosure. FIG. 2F is a fifth enlarged schematic diagram of a base station scheduling a plurality of PDSCHs in another embodiment of the present disclosure.

As shown in FIG. 2A to FIG. 2F, assuming that the base station schedules PDSCHs 1 to 3, and PDSCH group 1 is indicated (the PDSCH group index value equates to 0) in the DCI for scheduling the PDSCH, then the ACK feedback status value of PDSCH group 1 is 0, and only the HARQ-ACK of PDSCH group 1 (the value of the last 2 bits is 00) is fed back, the HARQ-ACK of PDSCHs 1 to 3 is sent in PUCCH1, and the base station receives PUCCH1 correctly.

The base station schedules PDSCHs 4 to 6, and indicates PDSCH group 2 (PDSCH group index value equates to 1), the ACK feedback status value of PDSCH group 2 is 0, and only the HARQ-ACK of PDSCH group 2 (the value of the last 2 bits is 00) is fed back, the HARQ-ACK of PDSCHs 4 to 6 is sent in PUCCH2, and the base station does not receive PUCCH2 correctly.

The base station schedules PDSCHs 7 to 9, and indicates PDSCH group 1 (PDSCH group index value is 0), the ACK feedback status value of PDSCH group 1 is 1 (toggled, indicating no need to send the HARQ-ACK of PDSCHs 1 to 3), and only the HARQ-ACK of PDSCH group 1 (the value of the last 2 bits is 00) is fed back, the HARQ-ACK of PDSCHs 7 to 9 is sent in PUCCH3, and the base station does not receive PUCCH3 correctly.

The base station schedules PDSCHs 10 to 11 and PDSCH group 2 is indicated (PDSCH group index value=1), the ACK feedback status value of PDSCH group 2 is 0 (non-toggled, still needs to send the HARQ-ACK of PDSCHs 4 to 6), and only the HARQ-ACK of PDSCH group 2 (the value of the last 2 bits is 00) is fed back.

The base station schedules PDSCH 12 and PDSCH group 2 is indicated (PDSCH group index value=1), the ACK feedback status value of PDSCH group 2 is 0 (non-toggled, still needs to send the HARQ-ACK of PDSCHs 4 to 6), and the HARQ-ACK of PDSCH group 1 and group 2 (because the base station does not successfully receive PUCCH3, PDSCH group 1 and group 2 are triggered to send the HARQ-ACK together. The value of the last 2 bits is 01) is fed back, the HARQ-ACK of PDSCHs 4 to 12 is sent in PUCCH4, and the base station does not receive PUCCH4 correctly.

The base station schedules PDSCH 13 and PDSCH 14, and PDSCH group 2 is indicated (PDSCH group index value=1), the ACK feedback status value of PDSCH group 2 is 0 (non-toggled, still needs to send the HARQ-ACK of PDSCHs 4 to 6), and the HARQ-ACK of all PDSCH processes is fed back (because the base station does not successfully receive PUCCH4, the HARQ-ACK of all PDSCH processes is triggered, and the ACK feedback status of PDSCH group 1 is non-toggled relative to the ACK feedback status of PDSCH group 1 the last time. The value of the last 2 bits is 11), the HARQ-ACK of all PDSCH processes (assuming 16 processes) is sent in PUCCH5.

The UE feeds back 16-bit HARQ-ACK. The HARQ-ACK of the PDSCH corresponding to HARQ process 1, 2, 4-12 is actual ACK/NACK; and HARQ processes 3, 13~16 do not belong to any PDSCH group or have been indicated as "no need to send HARQ-ACK", therefore, the HARQ-ACK of these 5 HARQ processes is NACK.

The downlink DCI (UL grant) scheduling the PUSCH comprises a bit field for HARQ-ACK feedback. When the resource for the HARQ-ACK overlaps the PUSCH, the UE sends the HARQ-ACK in the PUSCH resource. When the base station indicates the UE to use the dynamic HARQ-ACK codebook based on the PDSCH group, in order to avoid a size error in the HARQ-ACK codebook, the total number of HARQ-ACK bits to be fed back is indicated in the UL grant, for example, 2-bit DAI, or 4-bit DAI (when TB-based and CBG-based HARQ-ACK sub-codebooks are configured). According to another implemented method, the base station indicates the HARQ-ACK codebook size of a PDSCH group in the UL grant. In order to prevent the UE from misunderstanding the PDSCH group corresponding to the indicated HARQ-ACK codebook size, the base station should avoid triggering HARQ-ACK of more than one PDSCH group to be sent on the same PUSCH at the same time. The UE may believe that the HARQ-ACK codebook size indicated in the UL grant corresponds to the PDSCH group in which the HARQ-ACK is sent in the PUSCH scheduled by this UL grant. Preferably, for a PUSCH, if the base station does not indicate the HARQ-ACK codebook size in the UL grant scheduling the PUSCH, or the PUSCH is not scheduled based on the UL grant (for example, based on the configured PUSCH), the base station should avoid triggering HARQ-ACK of more than one PDSCH group to be sent on the same PUSCH at the same time.

As shown in FIG. 16A, if the base station sends a PDCCH to schedule the PDSCH of PDSCH group 2 in the fourth downlink transmission occasion, and triggers the UE to feed back the HARQ-ACK of PDSCH group 1 and group 2 on the PUSCH in the figure, sends a PDCCH to schedule the PDSCH of PDSCH group 1 in the fifth downlink transmission occasion, and triggers the UE to feed back the HARQ-ACK of PDSCH group 1 and group 2 on the PUSCH in the figure, then the base station sends the UL grant to schedule the PUSCH and indicates that the HARQ-ACK codebook size is 3. If the UE assumes that the PDSCH group corresponding to the HARQ-ACK codebook size indicated in the UL grant is the PDSCH group index that will feedback HARQ-ACK in the PUSCH last received, when the UE does not detect the PDCCH in the fifth downlink transmission occasion, the UE considers that the PDSCH group index that will feedback HARQ-ACK in the PUSCH last received is PDSCH group 2 (PDSCH group 2 scheduled by the PDCCH in the fourth transmission occasion), therefore, it is determined that a 5-bit HARQ-ACK needs to be fed back in the PUSCH, wherein PDSCH group 1 contains 2 bits, and PDSCH group 2 contains 3 bits (determined according to the HARQ-ACK codebook size indicated in the UL grant). Then, the HARQ-ACK that the base station expects to receive is PDSCH group 1 containing 3 bits (determined according to the HARQ-ACK codebook size indicated in the UL grant), and PDSCH group 2 containing 2 bits. Therefore, the bit order of the HARQ-ACK codebook is wrong.

If the base station is limited to only trigger the HARQ-ACK of one PDSCH group when the HARQ-ACK is sent on the PUSCH, the base station may perform scheduling through the example of FIG. 16B. The base station sends a PDCCH to schedule the PDSCH of PDSCH group 1 in the fourth downlink transmission occasion, and triggers the UE to feed back the HARQ-ACK of PDSCH group 1 on the PUSCH in the figure, sends a PDCCH to schedule the PDSCH of PDSCH group 1 in the fifth downlink transmission occasion, and triggers the UE to feed back the HARQ-ACK of PDSCH group 1 on the PUSCH as shown in the FIG. 16B, then the base station sends the UL grant to schedule the PUSCH and indicates that the HARQ-ACK codebook size is 4. Then, although the UE does not receive the PDCCH in the fifth downlink transmission occasion, the UE may determine the HARQ-ACK codebook size indicated in the UL grant based on the PDCCH in the fourth downlink transmission occasion to be the HARQ-ACK codebook size of PDSCH group 1. The UE feeds back 4-bit HARQ-ACK of PDSCH group 1 in the PUSCH.

For a PDSCH group, if the UE does not detect any PDCCH triggering HARQ-ACK to feed back this PDSCH group in the PUSCH, and the HARQ-ACK codebook size of the group indicated in the UL grant is not 0, the UE sends N-bit NACK, where N is less than 2M and determined according to the HARQ-ACK codebook size indicated in the UL grant, and M is the number of bits in the UL grant indicating the HARQ-ACK codebook size of this group.

When the base station instructs the UE to perform the feedback process based on the HARQ-ACK codebook of all PDSCH processes, the HARQ-ACK codebook size is fixed, so the DAI information is not needed. In order to fully use these bits, these bits may be reused for ACK feedback indication information of each PDSCH group. For example, the base station configures a maximum of two PDSCH groups for the UE, each PDSCH group has 1-bit ACK feedback indication information, and the 2-bit DAI may be reused.

At steps 102 and 103, when the HARQ-ACK resource determined by the UE overlaps with configuration-based PUSCH resource, and when the number of bits of the HARQ-ACK codebook exceeds the number of bits determined based on the number of modulation and coding parameters configured to determine the uplink control information and based on configured PUSCH resources, then the UE sends HARQ-ACK on the PUCCH resource determined based on the DCI that triggers the HARQ-ACK transmission, and the UE does not send the configured PUSCH. If the number of bits of the HARQ-ACK codebook does not exceed the number of bits determined based on the number of configured PUSCH resources and based on the modulation and coding parameters configured to determine the uplink control information, then the UE sends the configured PUSCH and sends the HARQ-ACK on the PUSCH. Or, when the number of bits of the HARQ-ACK codebook and the uplink control information of the configured PUSCH (CG-UCI, including uplink control information of PUSCH demodulation for configuration) exceeds the number of bits determined based on the number of configured PUSCH resources and based on the modulation and coding parameters configured to determine the uplink control information, then the UE sends the HARQ-ACK on the PUCCH resource determined based on the DCI that triggers the HARQ-ACK transmission, and the UE does not send the configured PUSCH. Otherwise, the UE sends the configured PUSCH and sends the HARQ-ACK on the PUSCH. Or, when the number of bits of the HARQ-ACK codebook exceeds the number of bits determined based on the number of resources available for sending the HARQ-ACK according to the configured PUSCH and based on the modulation and coding parameters configured to determine the uplink control information, then the UE sends the HARQ-ACK on the PUCCH resource determined based on the DCI that triggers the HARQ-ACK transmission, and the UE does not send the configured PUSCH. Otherwise, the UE sends the configured PUSCH and sends the HARQ-ACK on the PUSCH. The number of configured PUSCH resources is the number of REs determined based on the configured time-frequency resource of the PUSCH. The number of resources of the configured PUSCH that may be used to send the HARQ-ACK is the number of REs determined by the time-frequency resource used for CG-UCI subtracting from the time-frequency resource of the configured PUSCH. For any one of the above methods, if the UE sends the configured PUSCH, it may definitely send CG-UCI at the same time. For any one of the above methods, if there is other uplink control information at the same time, such as CSI, and the UE sends the HARQ-ACK on the PUCCH resource determined based on the DCI that triggers the HARQ-ACK transmission, the UE may simultaneously send CSI information on the PUCCH resource. If the UE sends configured PUSCH, the UE may simultaneously send the CSI information on the configured PUSCH.

FIG. 3 is a flowchart of a transmission method according to another embodiment of the present disclosure. As shown in FIG. 3, the transmission method according to the present embodiment may comprise:

At step 301, the UE receives multiple DCI from the base station. In addition, in the received multiple DCI, a HARQ-ACK timing value indicated by one DCI is non-numeric.

The DCI comprises: a first bit field and a second bit field.

The first bit field is used to indicate a PDSCH group index scheduled by the DCI; and the second bit field is used to indicate an ACK feedback status of a PDSCH group scheduled by the DCI.

At step 302, it determines a time resource of the to-be-sent HARQ-ACK based on the DCI.

Here, the step of determining a time resource of to-be-sent HARQ-ACK based on the DCI comprises: determining a time resource of the HARQ-ACK corresponding to the first DCI based on a timing value in the second DCI.

Further, the step of determining a time resource of HARQ-ACK corresponding to the first DCI based on a timing value in the second DCI comprises: according to such a DCI of that has same value in the first and second bit field respectively and has the smallest time interval, it determines that the time resource of the HARQ-ACK of the DCI is the same as the time resource of HARQ-ACK with a non-numeric timing value. Specifically, it looks for the DCI that has the same value in the first and second bit field respectively and has the smallest time interval, and then determines the HARQ-ACK time resource of the DCI being the same as the HARQ-ACK time resource with a non-numeric timing value.

In addition, if there are two DCIs that has the same value in the first and second bit field respectively and has the smallest time interval, then it is determined that the time resource of HARQ-ACK of the two DCIs is the same as the time resource of the HARQ-ACK with a non-numeric timing value.

At step 303, it sends the HARQ-ACK based on the determined time resource of the HARQ-ACK and/or the HARQ-ACK status information.

According to a transmission method according to another embodiment of the present disclosure, when the received HARQ-ACK timing value is non-numeric, the time resource of the HARQ-ACK corresponding to the first DCI can be determined based on the timing value in the second DCI.

However, in the prior art, when the received HARQ-ACK timing value is non-numeric, retransmission is required.

Therefore, compared with the prior art, the transmission method in another embodiment of the present disclosure may greatly reduce system overhead and improve system efficiency.

Hereinafter, the technical solution of determining a time resource of HARQ-ACK feedback will be described in detail in combination with specific embodiments.

HARQ-ACK timing $K_1$ indicated in $DCI_i$ for scheduling the PDSCH may be accurate time information. For example, the value of $K_1$ is a specific value, which indicates n timeslots or symbols, and it may also indicate non-numeric time information (this non-numeric status may be indicated by a specific value of $K_1$), which indicates that the HARQ-ACK timing needs to be jointly determined by another $DCI_j$.

In a specific implementation process, if the time difference between the PDSCH scheduled by the $DCI_i$ or the DCIi and the last PUCCH is less than a HARQ-ACK processing delay, the base station may indicate $K_1$ as a non-numeric value. Or, because the number of bits of $K_1$ is limited, when the limited value of $K_1$ cannot point to a suitable PUCCH resource, the base station may also indicate $K_1$ as a non-numerical value. Then, according to a predefined rule, the HARQ-ACK sending time of the PDSCH scheduled by the DCIi is determined through HARQ-ACK timing information of another $DCI_j$.

Specifically, for example, if the HARQ-ACK for sending time of the PDSCH scheduled by the DCIi needs to be jointly determined by another $DCI_j$, the HARQ-ACK timing $K_1$ in the $DCI_i$ scheduling PDSCH1 is indicated as non-numeric time information. If the $DCI_j$ indicates the same PDSCH group index as PDSCH1 (same as the PDSCH group index in the $DCI_i$), and has the same ACK feedback indication bit value and is the closest DCI to the $DCI_i$ in the time dimension, then the HARQ-ACK of the PDSCH scheduled by the DCIi is sent together with the HARQ-ACK of the PDSCH scheduled by the DCIj. The $DCI_j$ may be no earlier than the DCIi in the time dimension. Or, the DCIj may be earlier than the $DCI_i$ in the time dimension.

FIG. 4A is a schematic diagram of a base station for scheduling a plurality of PDSCHs in another embodiment of the present disclosure. FIG. 4B is a first enlarged schematic diagram of a base station scheduling a plurality of PDSCHs in another embodiment of the present disclosure. FIG. 4C is a second enlarged schematic diagram of a base station scheduling a plurality of PDSCHs in another embodiment of the present disclosure. As shown in FIG. 4A and FIGS. 4B and 4C, the non-numeric K1 is indicated by "X". PDSCH1 and PDSCH2 belong to the same PDSCH group index 1 (PDSCH group index 0), the ACK feedback status is the same (both as 0), and PDSCH2 is closest to PDSCH1 in the time dimension.

Here, the HARQ-ACK of PDSCH1 and PDSCH2 are fed back in the same HARQ-ACK codebook, so that K1=4 of PDSCH1 is inferred.

PDSCH3 and PDSCH4 belong to the same PDSCH group 2 (PDSCH group index 1), and the ACK feedback status is the same (both as 0). PDSCH4 and PDSCH5/6 belong to the same PDSCH group 2 (PDSCH group index 1), but the ACK feedback status is different. Here, the HARQ-ACK timing of PDSCH4 cannot be determined according to PDSCH5/6, but is determined according to PDSCH3, thus K1=4 of PDSCH4.

If the HARQ-ACK timing of the PDSCH scheduled by the DCIi needs to be jointly determined by another $DCI_j$, the HARQ-ACK timing $K_1$ in the DCIi for scheduling PDSCH1 is indicated as non-numeric time information. If the PDSCH group index indicated by the $DCI_j$ is different from the PDSCH group index of PDSCH1, and the HARQ-ACK feedback of the PDSCH group including PDSCH1 is triggered, and is closest to the $DCI_j$ in the time dimension, then the HARQ-ACK of the PDSCH scheduled by the $DCI_i$ and the HARQ-ACK of the PDSCH scheduled by the $DCI_j$ belong to the same HARQ-ACK codebook. Preferably, the $DCI_j$ is no earlier than the $DCI_i$ in the time dimension.

FIG. 4D is a third enlarged schematic diagram of a base station for scheduling a plurality of PDSCHs in another embodiment of the present disclosure. As shown in FIG. 4A and FIG. 4D, the non-numeric $K_1$ is indicated by "X". PDSCH1/2 belongs to PDSCH group 1, and only triggers HARQ-ACK feedback of PDSCH group 1. PDSCH3 belongs to PDSCH group 2, and only triggers HARQ-ACK feedback of PDSCH group 2. The value of $K_1$ is X. PDSCH4/5 belongs to PDSCH group 1, and triggers HARQ-ACK feedback of PDSCH group 1 and PDSCH group 2. Then, HARQ-ACK of PDSCH3 is fed back together with PDSCH 4/5. It is not difficult to see that in this case, and it is not necessary to check whether an ACK feedback status indication in the $DCI_i$ for scheduling PDSCH3 is the same as the ACK feedback status in the $DCI_j$ scheduling PDSCH4.

FIG. 5 is a flowchart of a transmission method according to another embodiment of the present disclosure. As shown in FIG. 5, the transmission method according to the present embodiment may comprise:

At step 501, it receives uplink signal transmission resource information.

At step 502, it determines a time-frequency resource occupied for sending an uplink signal.

The uplink signal transmission resource information at step 501 comprises at least one of time resource information, frequency domain resource information, and LBT information of the uplink signal. The uplink signal transmission resource information is carried by physical layer signaling or higher layer signaling.

Here, the step of determining the time-frequency resource occupied for sending an uplink signal comprises: based on the uplink signal transmission resource information, channel occupation time, and an LBT sub-band corresponding to the COT, it determines a frequency domain resource occupied for sending the uplink signal; and then it sends the uplink signal on the determined frequency domain resource.

Further, the step of determining the frequency domain resource occupied for sending the uplink signal may comprise: when the uplink signal is within the COT, it determines an LBT sub-band for carrying the uplink signal based on the LBT sub-band where the COT is located; and when the uplink signal is outside the COT, it determines an LBT sub-band for carrying the uplink signal based on the uplink signal transmission resource information.

Further, the step of determining the frequency domain resource occupied for sending the uplink signal may comprise: when the LBT sub-band corresponding to the COT is the LBT sub-band where the PDCCH for triggering the uplink signal transmission is located, the PDCCH for triggering the uplink signal transmission and the uplink signal belong to the same COT; or the LBT sub-band corresponding to the COT is the LBT sub-band where the COT is located.

At step 503, it sends the uplink signal on the determined time-frequency resource.

In the transmission method according to another embodiment of the present disclosure, when the uplink signal is within the COT, it determines an LBT sub-band for carrying the uplink signal based on the LBT sub-band where the COT is located; and when the uplink signal is outside the COT, it determines an LBT sub-band for carrying the uplink signal based on the uplink signal transmission resource information. At the same time, in the transmission method according to another embodiment of the present disclosure, when the LBT sub-band corresponding to the COT is the LBT sub-band for carrying the PDCCH triggering the uplink signal transmission, the PDCCH triggering the uplink signal transmission and the uplink signal belong to the same COT; or the LBT sub-band corresponding to the COT is the LBT sub-band where the COT is located.

The transmission method in another embodiment of the present disclosure reduces system overhead and improves system efficiency by using the foregoing method.

Hereinafter, the technical solution of performing LBT will be described in detail in combination with specific embodiments.

When the UE operates in an unlicensed frequency band, a channel access procedure may need to be performed before sending a signal. The sending process may be performed if and only if the channel is detected to be idle. This procedure is also called LBT (Listen-before-talk).

LBT may be divided into at least two cases of broadband LBT and sub-band LBT.

It assumes that the signal bandwidth to be sent by a sender is BW1, and the sender simultaneously performs the same LBT procedure on the entire BW1, which is called broadband LBT. If BW1 may be divided into N LBT sub-bands (LBT Bandwidth), and the bandwidth of each LBT sub-band is BW2, the sender performs LBT on each LBT sub-band in BW1, which is called sub-band LBT.

For example, BW1=80 MHz, it is divided into N=4 LBT sub-bands, and then BW2=20 MHz for each sub-band. The UE may independently perform LBT on these 4 LBT sub-bands, or select an LBT sub-band to perform a first type of LBT (for example, Cat-4 LBT). If LBT of the LBT sub-band is successful, a second type of LBT may be performed on other sub-bands.

After the base station occupies the channel through the first type of LBT, the base station may send a downlink signal within an allowed maximum channel occupancy time (MCOT); or the UE served by the base station may perform the second type of LBT or may send an uplink signal without the need of performing LBT. If it is the sub-band based LBT, and the base station successfully perform the procedure in the first type of LBT on at least one of the sub-bands, then the base station may send a downlink signal within the allowed maximum channel occupation time (MCOT) and on each sub-band that successfully performs the LBT; or the UE served by the base station may perform the second type of LBT or may send an uplink signal without the need of performing LBT. This situation is called "base station shared COT".

Similarly, after the UE occupies the channel through the first type of LBT, the UE may perform the second type of LBT or may send an uplink signal without the need of performing LBT within the allowed maximum channel occupancy time (MCOT). If it is the sub-band based LBT, and the UE successfully performs the procedure in the first type of LBT on at least one of the sub-bands, then the UE may perform the second type of LBT within the allowed maximum channel occupation time (MCOT) and on each sub-band that successfully performs the LBT, or the UE may send an uplink signal without the need of performing LBT. This situation is called "UE shared COT".

If the to-be-sent PUCCH is within the COT, the UE determines the LBT sub-band for sending the PUCCH according to one or more LBT sub-bands where the COT is located.

Preferably, the UE determines whether the PUCCH is within the COT according to the LBT type of the PUCCH indicated by the base station. For example, if the LBT type is type-1 channel access (also known as Cat-4 LBT), the PUCCH is considered to be outside the COT. If the LBT type is Type 2 channel access (also known as Cat-2 LBT) or Cat-1 LBT, the PUCCH is considered to be within the COT. Preferably, the UE determines whether the PUCCH is within the COT based on COT time information indicated by the base station. For example, if the PUCCH is in time slot n+2, and the base station indicates that time slot n to time slot n+4 are within the COT, then the PUCCH is within the COT.

Preferably, the UE determines the LBT sub-band where the PUCCH resource is located according to an uplink LBT sub-band corresponding to the downlink LBT sub-band where the PDCCH triggering the PUCCH is located. The PDCCH and the PUCCH belong to the same COT. For example, the UCI carried by the PUCCH comprises HARQ-ACK, and HARQ-ACK of the PDSCH triggering the PUCCH scheduled by the PDCCH is carried by the PUCCH.

If all such PDCCHs are located in the same downlink LBT sub-band, the PUCCH is sent in the uplink LBT sub-band corresponding to this downlink LBT sub-band.

If all such PDCCHs are located in at least two different downlink LBT sub-bands, it is determined that the PUCCH is sent in the uplink LBT sub-band corresponding to the one or more downlink LBT sub-bands according to a predefined rule. For example, the PUCCH is sent in the uplink LBT sub-band corresponding to the downlink LBT sub-band where the latest PDCCH is located in time, or the PUCCH is sent in the uplink LBT sub-band corresponding to the downlink LBT sub-band where the earliest PDCCH is located in time, or the PUCCH is sent in the uplink LBT sub-band corresponding to each of the downlink LBT sub-bands of all PDCCHs.

Preferably, the UE may determine the LBT sub-band where the PUCCH resource is located according to an uplink LBT sub-band corresponding to a downlink LBT sub-band that successfully performs LBT. If more than one downlink LBT sub-band successfully performs LBT in one COT, it is determined that the PUCCH is sent in the uplink LBT sub-band corresponding to the one or more downlink LBT sub-bands according to a predefined rule. For example, the PUCCH is sent in the uplink LBT sub-band corresponding to the downlink LBT sub-band having the lowest or highest LBT sub-band index or all LBT sub-bands.

Preferably, the UE may determine the LBT sub-band where the PUCCH resource is located according to the uplink LBT sub-band corresponding to the LBT sub-band where a PUSCH of the same uplink COT as the PUCCH is located. For example, the UE sends the PUSCH after performing the first type of LBT, and an LBT sub-band set that sends the PUSCH is BW3. The UE may send the PUCCH after it sends the PUSCH, and the two signals have no gap in time, then the UE sends the PUCCH in the LBT sub-band having the lowest index or highest index in BW3, or sends the PUCCH in each LBT sub-band in BW3.

If the first type of LBT needs to be performed before the PUCCH is sent, that is, it does not belong to the shared COT, the UE determines the uplink LBT sub-band to send the PUCCH according to an LBT sub-band index indicated in the configured PUCCH resource.

Preferably, the base station configures the UE to determine the uplink LBT sub-band to send the PUCCH according to the LBT sub-band index indicated in the configured PUCCH resource, or determine the uplink LBT sub-band to send the PUCCH according to whether it is within the COT.

According to another embodiment of the present disclosure, when the base station configures the PUCCH resource, the PUCCH resource is configured to determine whether the LBT sub-band where the PUCCH is located may be determined according to the LBT sub-band where the shared COT is located.

If it is configured to determine the LBT sub-band where the PUCCH is located according to the LBT sub-band where the shared COT is located, the LBT sub-band where the PUCCH is located may be determined according to the method described above. Otherwise, the PUCCH may only be sent in the LBT sub-band configured in the PUCCH resource. This may make the base station more flexibly control the PUCCH transmission resource. For example, the base station configures 8 PUCCH resources for the UE, and each PUCCH resource is configured separately as for whether the PUCCH resource may determine the LBT sub-band where the PUCCH is located according to the LBT sub-band where the shared COT is located. For example, the first to third PUCCH resources may determine the LBT sub-band where the PUCCH is located according to the LBT sub-band where the shared COT is located, and the fourth to eight PUCCH resources cannot. If the base station expects the UE to send the PUCCH strictly according to the LBT sub-band configured by the PUCCH resource, it may indicate one of the fourth to eight PUCCH resources.

When the base station configures the PUCCH resource, it may configure both an interlace index and an LBT sub-band index. According to the method described above, when a predefined condition is satisfied, for example, when the PUCCH is located in the shared COT, the LBT sub-band index of the PUCCH determined according to the LBT sub-band of the COT covers the LBT sub-band index in the configured PUCCH resource. When the PUCCH is outside the shared COT, the LBT sub-band where the PUCCH is located is determined according to the LBT sub-band index in the configured PUCCH resource.

When the base station configures an SRS resource, multiple groups of SRSs may be configured. Each group of SRS contains one or more SRS resources. The SRS resources may be located in the same LBT sub-band, or may be located in different LBT sub-bands. Preferably, an SRS resource is limited to an LBT sub-band. Preferably, an SRS resource may be in a plurality of LBT sub-bands, but the frequency domain resource of an SRS resource is continuous. Therefore, it may appear that in the same time unit, the UE has an SRS resource to be sent in a plurality of LBT sub-bands.

Preferably, when the base station configures the SRS resource, the physical resource block PRB and comb where the SRS is located are configured. The PRB information may determine the LBT sub-band information where the SRS resource is located. Or, when the base station configures the SRS resource, it configures an LBT sub-band index, and a PRB and comb in the LBT sub-band.

Similarly, for the sounding reference signal (SRS), the uplink LBT sub-band that sends the SRS may also be determined based on whether the SRS is within the shared COT.

If the to-be-sent SRS is within the COT, the UE determines the LBT sub-band for sending the SRS according to the one or more LBT sub-bands where the COT is located. If the first type of LBT needs to be performed before sending the SRS, that is, it does not belong to the shared COT, the UE determines the uplink LBT sub-band for sending the SRS according to the LBT sub-band index indicated in the configured SRS resource. Or, the base station configures the UE to determine the uplink LBT sub-band for sending the SRS according to the LBT sub-band index indicated in the configured SRS resource, or to determine the uplink LBT sub-band for sending the SRS according to whether it is within the COT. Or, when the base station configures the SRS resource, the SRS resource is configured as for whether the LBT sub-band where the SRS is located may be determined according to the LBT sub-band where the shared COT is located. If it is configured to determine the LBT sub-band where the SRS is located according to the LBT sub-band where the shared COT is located, the LBT sub-band where the SRS is located may be determined according to the method described above; otherwise, the SRS can be sent only in the LBT sub-band configured in the SRS resource.

Preferably, the UE determines the LBT sub-band where the SRS resource is located according to the uplink LBT sub-band corresponding to the downlink LBT sub-band where the PDCCH triggering an aperiodic SRS is located. The PDCCH and the SRS belong to the same COT. Preferably, the UE determines on which LBT sub-bands the SRS is sent according to an intersection of the configured LRS sub-band information of the SRS resource and the downlink LBT sub-band where the PDCCH is located. The intersection of the LBT sub-band where the SRS is located triggered by the base station and the LBT sub-band where the PDCCH that triggers the SRS is located is not an empty set. For example, if the SRS triggered by the base station comprises SRS1 in LBT sub-band 1 and SRS2 in LBT sub-band 2, and the PDCCH that triggers the SRS is on LBT sub-band 1, the UE sends SRS1 only on LBT sub-band 1.

Preferably, the UE determines the LBT sub-band where the SRS resource is located according to the uplink LBT sub-band corresponding to the downlink LBT sub-band that successfully performed LBT. Preferably, the UE determines on which LBT sub-bands the SRS is sent according to an intersection of the configured LRS sub-band information of the SRS resource and LBT successfully downlink LBT sub-bands of the COT where the SRS is located. The intersection of the LBT sub-band where the SRS is located triggered by the base station and the LBT sub-band where the PDCCH that triggers the SRS is located is not an empty set. For example, the SRS triggered by the base station comprises SRS1 in LBT sub-band 1, SRS2 in LBT sub-band 2, SRS in LBT sub-band 3, and the LBT sub-band 1 and sub-band 2 of the COT where the SRS is located are successful in LBT, the UE sends SRS1 only on LBT sub-band 1 and SRS2 on LBT sub-band 2.

Preferably, the UE determines the LBT sub-band where the SRS resource is located according to the uplink LBT sub-band corresponding to the LBT sub-band where the PUSCH of the same uplink COT as the SRS is located. The UE determines on which LBT sub-bands the SRS is sent according to an intersection of the configured LRS sub-band information of the SRS resource and uplink LBT sub-bands that send the PUSCH in the same COT of the SRS. The intersection of the LBT sub-band where the SRS is located triggered by the base station and the LBT sub-band where the PUSCH is located is not an empty set. For example, the UE sends the PUSCH after performing the first type of LBT. The LBT sub-band where the sent PUSCH is located is LBT sub-band 1. The SRS triggered by the base station in the same COT as the PUSCH comprises SRS1 in LBT sub-band 1 and SRS2 in LBT sub-band 2, then the UE sends SRS1 only on LBT sub-band 1.

Preferably, if the intersection described above is an empty set, the UE determines the LBT sub-band that sends the SRS according to the one or more LBT sub-bands where the COT is located. In this case, the LBT sub-band index of the SRS determined by the UE according to the LBT sub-band of the COT covers the LBT sub-band index in the configured SRS resource.

Preferably, if an SRS is located in at least two LBT sub-bands, and at least one of the LBT sub-bands does not belong to the intersection described above, the UE does not send the SRS.

Preferably, if an SRS is located in at least two LBT sub-bands, and at least one of the LBT sub-bands does not belong to the intersection described above, then the UE sends the SRS only on the intersection.

Preferably, if the intersection of the LBT sub-band where the PUCCH or SRS is located and a COT sub-band is an empty set, for example, the SRS or PUCCH resource indicated by the base station is when the SRS or PUCCH is sent in the configured LBT sub-band and the intersection of the configured LBT sub-band and the COT sub-band is an empty set, the UE needs to perform the first type of LBT procedure. If the configured LBT sub-band partially overlaps with the COT sub-band (excluding the case where the configured LBT sub-band is the COT sub-band), the UE needs to perform the first type of LBT procedure on at least one LBT sub-band of the configured LBT sub-band.

The present disclosure does not limit how the UE determines COT sub-band information. For example, it may be determined by the UE through sub-band signaling for indicating the COT sent by the base station, or according to a method such as detecting a reference signal.

According to another embodiment of the present disclosure, the frequency domain resource information in the uplink signal transmission resource information at step 501 comprises frequency domain resource information of a first type of frequency domain resource allocation mode, and/or frequency domain resource information of a second type of frequency domain resource allocation mode. The first type of frequency domain resource allocation mode is interlace-based frequency domain resource allocation, and the second type of frequency domain resource allocation mode is frequency domain resource allocation information based on the physical resource block PRB or resource block group RBG. Preferably, the resource allocated in the second type of frequency domain resource allocation mode is continuous in the frequency domain.

According to an implementation method, the UE receives a fallback mode DCI to schedule the sending of the uplink signal, and the frequency domain resource allocation mode in the fallback mode DCI is determined based on the first type of configuration information. Preferably, the first type of configuration information is system information, and the system information indicates the first or second type of frequency domain resource allocation mode.

Preferably, if the system information does not indicate a frequency domain resource allocation mode, the frequency domain resource allocation in the fallback mode DCI is determined according to a predefined frequency domain resource allocation mode. Preferably, the predefined frequency domain resource allocation mode is the second type of frequency domain resource allocation mode.

Preferably, the frequency domain resource allocation mode in the fallback mode DCI located in a common search space CSS of control resource set CORESET 0 is determined according to the first type of configuration information; and if the frequency domain resource allocation mode is not indicated in the first type of configuration information, it is determined according to the predefined frequency domain resource allocation mode.

The frequency domain resource allocation mode of uplink scheduling information in MAC RAR is determined according to the first type of configuration information; and if the frequency domain resource allocation mode is not indicated in the first type of configuration information, it is determined according to the predefined frequency domain resource allocation mode.

Preferably, the frequency domain resource allocation mode in the fallback mode DCI in the CSS or user-specific search space USS of CORESET other than COREST0 is determined according to the first type of configuration information; and if the frequency domain resource allocation mode is not indicated in the first type of configuration information, it is determined according to a predefined frequency domain resource allocation mode.

According to another implementation method, the frequency domain resource allocation mode in the fallback mode DCI in the CSS or user-specific search space USS of CORESET other than COREST0 is determined according to the predefined frequency domain resource allocation mode.

According to another implementation method, after the UE receives UE-specific signaling (referred to as the second type of configuration information) for indicating the first type and/or the second type of frequency domain resource allocation mode, the frequency domain resource allocation mode in the fallback mode DCI in the CSS or user-specific search space USS of CORESET other than COREST0 is determined according to the UE-specific signaling; and if the UE does not receive the second type of configuration information, the frequency domain resource allocation mode in the DCI is determined according to the predefined frequency domain resource allocation mode. Or, if the UE does not receive the second type of configuration information, but the UE receives the first type of configuration information, the UE determines the frequency domain resource allocation mode in the DCI according to the first type of configuration information.

According to another implementation method, before the UE receives the second type of configuration information, the frequency domain resource allocation mode in the fallback mode DCI is determined according to the first type of configuration information; and if the first type of configuration information does not indicate a frequency domain resource allocation mode, it is determined according to the predefined frequency domain resource allocation mode. After the UE receives the second type of configuration information, the frequency domain resource allocation mode in the fallback mode DCI is determined according to the second type of configuration information.

Preferably, the frequency domain resource allocation mode in the fallback mode DCI located in the common search space is determined according to the first type of configuration information; and if a frequency domain resource allocation mode is not indicated in the first type of configuration information, it is determined according to the predefined frequency domain resource allocation mode.

Preferably, after the UE receives the second type of configuration information, the frequency domain resource allocation mode in the fallback mode DCI in the UE-specific search space is determined according to the second type of configuration information; and if the UE does not receive the second type of configuration information, then the frequency domain resource allocation mode in the DCI is determined according to the predefined frequency domain resource allocation mode. Or, if the UE does not receive the second type of configuration information, but the UE receives the first type of configuration information, the UE determines the frequency domain resource allocation mode in the DCI according to the first type of configuration information.

According to another implementation method, it is assumed that a size of an uplink fallback mode DCI for supporting the first type of frequency domain resource allocation mode is A, a size of the uplink fallback mode DCI for supporting the second type of frequency domain resource allocation mode is B, a size of the downlink fallback mode DCI is C. If max(A,B)<C, and if the UE receives the first type of configuration information indicating as the first type of frequency domain resource allocation mode, then the uplink fallback mode DCI may support a dynamic switching of the first type of frequency domain resource allocation mode and the second type of frequency domain resource allocation mode. If max(A,B)>C, the frequency domain resource allocation mode supported by the uplink fallback mode DCI is determined as one type of the first or second type of frequency domain resource allocation mode according to the first or second type of configuration information, and the uplink falloff mode DCI size is determined according to the corresponding frequency domain resource allocation mode. For the DCI in a non-fallback mode, the frequency domain resource allocation mode that the DCI may support is determined as one type of the first or second type of frequency domain resource allocation mode according to the first or second type of configuration information, and the size of the plink fallback mode DCI is determined according to the corresponding frequency domain resource allocation mode. Generally, in order to reduce the burden of the UE blindly detecting the PDCCH, it is ensured that the size of the uplink and downlink DCI in the fallback mode is the same, for example, by reducing the number of DCI bits with a larger size or adding padding bits to DCI with a smaller DCI size, the final size of different DCI are made the same, thereby reducing the number of DCI blind detections. If the maximum size max (A,B) of the uplink fallback mode DCI is smaller than the size C the downlink fallback mode DCI, the DCI in the uplink fallback mode needs to be filled with bits. In this case, the maximum size max (A,B) may be used to support a more flexible frequency domain resource allocation mode without increasing the final DCI size (final size is C). Generally, in order to avoid too high DCI overhead or impact on scheduling performance, it is not limited that the DCI sizes in the uplink and downlink non-fallback modes must be the same. Therefore, the DCI processing methods for uplink fallback and non-fallback should be different.

If the UE is configured in the first type of frequency domain resource allocation mode, the base station not only indicates index information of the interlace, but also indicates LBT sub-band information of the allocated interlace. It is assumed that the size of the uplink fallback mode DCI for supporting the interlace index information is A1, and the size of the uplink fallback mode DCI for supporting the interlace index information and the LBT sub-band information is A2, where A2>A1, and the size of the downlink fallback mode DCI is C. If A2≤C, then the uplink fallback mode DCI may indicate the interlace index information and the LBT sub-band information. If A2>C, then the uplink fallback mode DCI only indicates the interlace index information and does not indicate the LBT sub-band information.

At step 502, the frequency domain resource occupied for sending an uplink signal is determined according to the frequency domain resource allocation mode. In addition, at step 503, the uplink signal is sent on the frequency domain resource.

According to another embodiment of the present disclosure, the time domain resource information in the uplink signal transmission resource information at step 501 comprises a time starting point when the uplink signal is sent, or a length of time that a channel signal is occupied. For example, the base station may indicate a symbol starting point of a PUSCH effective signal in the UL Grant, and the starting point is the boundary of the symbol. The base station may also indicate the length of time of the occupied channel signal before the symbol starting point of the effective signal in the UL grant, or indicate the starting point of the occupied channel signal, and the starting point is in the symbol boundary or in the symbol. The occupied channel signal may be a cyclic prefix extension (CP extension) of the first effective signal symbol.

Preferably, the length of the occupied channel signal does not exceed one symbol. The length of time of the occupied channel signal is $O_{Li}=\rceil L_i/L_s\lceil *L_s-L_i$, where $L_s$ is a symbol length and $L_i$ is a predefined time length. The length of $L_s$ may vary with sub-carrier spacing SCS. For example, the symbol length $L_s$ of the SCS at 15 KHz is twice the symbol length $L_s$ of the SCS at 30 KHz. The length of $L_s$ may vary depending on the CP type (e.g., long CP or normal CP). In some scenarios, the CP lengths of multiple symbols in a timeslot/mini-timeslot are different and therefore $L_s$ is also different. When calculating $O_{Li}$, the corresponding $L_s$ is determined according to the CP length of each symbol corresponding to the occupied channel signal. $L_i$, i=0, 1, 2, . . . I–1, is a set of predefined time lengths, for example, $L_0$=0, $L_1$=25 us (microseconds), $L_2$=25 us+TA, $L_3$=16 us+TA. The base station directly or indirectly indicates $L_i$, and the UE determines, according to the indicated $L_i$, the time length OLi of the occupied channel signal. The time starting point of the occupied channel signal is in one of the symbols before the starting point of the effective signal symbol, and the starting point $S_i=L_i-L_s*\lfloor L_i/L_s \rfloor L$. If $L_0$=0, no occupied channel signal was sent.

FIG. 6 is a flowchart of a transmission method according to another embodiment of the present disclosure. The embodiment shown in FIG. 6 has some similar contents to the embodiment shown in FIG. 5, which will be omitted. As shown in FIG. 6, the transmission method according to the present embodiment may comprise:

At step 601, it counts the number of failures of joint LBT or separate LBT performed on the uplink channel resources, where the frequency domain resource occupied for sending an uplink signal comprises a plurality of uplink channel resources.

Here, the joint LBT is performed by the following method: performing a type-1 channel access, for the $i^{th}$ uplink channel resource; performing a type-2 channel access for the $i^{th}$ uplink channel resource, after the type-1 channel access for the $i^{th}$ uplink channel resource is successful. The step of the counting the number of failures of joint LBT or separate LBT performed on the uplink channel resources comprises:

when the type-1 channel access for the $i^{th}$ uplink channel resource fails, a result of the type-2 channel access for the $i^{th}$ uplink channel resource is not counted as an LBT failure of the $j^{th}$ uplink channel resource; and at the same time is not counted as an LBT success of the $j^{th}$ uplink channel resource.

Here, the step of counting the number of failures of joint LBT or separate LBT performed on the multiple frequency domain resources occupied for sending an uplink signal comprises: performing a type-1 channel access, for the $i^{th}$ uplink channel resource; performing a type-2 channel access for the $j^{th}$ uplink channel resource, after the type-1 channel access for the $i^{th}$ uplink channel resource is successful. When the type-1 channel access is successful but the type-2 channel access fails, a result of the type-2 channel access for the $j^{th}$ uplink channel resource is not counted as an LBT failure of the $i^{th}$ frequency domain resource occupied for sending the uplink signal; instead it is counted as an LBT failure of the $j^{th}$ frequency domain resource occupied for sending the uplink signal.

In addition, when counting the number of failures, it counts the number of LBT failures on a carrier or a BWP or an LBT sub-band.

In addition, when counting the number of LBT failures on a BWP, it is jointly determined whether the current BWP fails in LBT based on an LBT result of each LBT sub-band in a BWP.

At step 602, if the number of LBT failures exceeds a pre-set threshold, it reports LBT failure information.

According to the transmission method of another embodiment of the present disclosure, when the type-1 channel access for the $i^{th}$ uplink channel resource fails, a result of the type-2 channel access for the $j^{th}$ uplink channel resource is not counted as an LBT failure of the $j^{th}$ uplink channel resource; and at the same time is not counted as an LBT success of the $j^{th}$ uplink channel resource. In addition, according to the transmission method of another embodiment of the present disclosure, when the type-1 channel access is successful, but the type-2 channel access fails, a result of the type-2 channel access for the $j^{th}$ uplink channel resource is not counted as an LBT failure of the $i^{th}$ frequency domain resource occupied for sending the uplink signal; and is counted as an LBT failure of the $j^{th}$ frequency domain resource occupied for sending the uplink signal. The transmission method of another embodiment of the present disclosure reduces system overhead and improves system efficiency by using the foregoing method.

Hereinafter, the technical solution of counting the number of LBT failures will be described in detail in combination with specific embodiments.

When the UE operates in an unlicensed frequency band, a channel access procedure may need to be performed before sending a signal. Transmission may be performed if and only if the channel is detected to be idle. This procedure is also called LBT (Listen-before-talk).

In order to prevent the UE from continuously operating on a very congested unlicensed frequency band carrier or BWP or LBT sub-band, the UE may count the number of LBT failures. For example, the UE maintains a counter. The counter starts from 0. Whenever the UE detects an LBT failure, the counter is incremented by 1. In some scenarios, if the UE detects a successful LBT or N consecutive successful LBT, the counter is cleared to zero and restarted. When the number of LBT failures exceeds a pre-set threshold, the UE may report LBT failure information to the base station. Correspondingly, the base station may schedule the UE to another unlicensed frequency band carrier or BWP or LBT sub-band based on the information.

The UE performs LBT on one or more uplink resources, and counts the number of LBT failures. The uplink resources are carriers, or BWPs, or LBT sub-bands. If the UE performs LBT on a plurality of carriers, BWPs or LBT sub-bands respectively, LBT counting is determined based on whether the respective LBT is successful. If the UE performs joint LBT on a plurality of carriers, BWPs or LBT sub-bands, whether LBT on each carrier, BWP or LBT sub-band is successful may be related.

If LBT on carrier i/BWP i/LBT sub-band i fails or a signal cannot be sent due to a fact that the channel is busy on carrier i/BWP i/LBT sub-band i, the LBT failure can reflect the channel busy status on carrier i/BWP i/LBT sub-band i. If LBT on carrier j/BWP j/LBT sub-band j fails, or a signal cannot be sent on carrier j BWP j/LBT sub-band j, due to a fact that the channel is detected to be busy on a carrier i/BWP i/LBT sub-band i, it cannot reflect the channel busy status on carrier j/BWP j/LBT sub-band j. Therefore, this case is not counted as an LBT failure of carrier j/BWP j/LBT sub-band j, and this case cannot be counted as an LBT success on carrier j/BWP j/LBT sub-band j, that is, this case is not counted.

Specifically, when the UE is configured to perform joint LBT on a plurality of uplink carriers, if the UE fails the type-1 channel access (also called Cat-4 LBT) on a carrier i, which causes the UE to fail to send an uplink signal on the other carrier j, then it cannot be counted as the UE's LBT failure on carrier j. For example, the UE selects a carrier i for the type-1 channel access. If and only if the carrier i successfully perform the type-1 channel access, the type-2 channel access may be performed on the other carrier j. If and only if the second type of channel access is successfully performed on carrier j, the uplink transmission can be performed on carrier J.

If the UE successfully performs the type-1 channel access on carrier i, but the type-2 channel access on carrier j fails, it is counted as an LBT failure of carrier j, and cannot be counted as an LBT failure of carrier i.

If the UE fails to perform the type-1 channel access on carrier i, which results in a failure to send an uplink signal on carrier j, it is counted as an LBT failure of carrier i and cannot be counted as an LBT failure of carrier j. That is, if the channel access procedure on carrier i fails, it may be recorded as an LBT failure of carrier i.

In a case that the UE is configured to perform LBT on a BWP and perform joint LBT on the BWPs of a plurality of uplink carriers, if the UE fails to perform the type-1 channel access (also known as Cat-4 LBT) within the BWP of carrier I, which causes the UE to fail to send an uplink signal on the BWP of the other carrier j, it cannot be counted as an LBT failure of the UE on the BWP of carrier j. For example, the UE selects the BWP of carrier i for the type-1 channel access. If and only if the type-1 channel access is successfully performed on the BWP of carrier i, the type-2 channel access can be performed on the BWP of the other carrier j, and if and only if the type-2 channel access on the BWP of carrier j is successful, uplink transmission can be performed on the BWP of carrier j.

If the UE successfully performs the type-1 channel access on the BWP of carrier i, but the type-2 channel access fails on the BWP of carrier j, it is counted as an LBT failure on the BWP of carrier j and cannot be counted as an LBT failure on the BWP of carrier i. If the UE fails to perform the type-1 channel access on the BWP of carrier i, which causes that an uplink signal cannot be sent on the BWP of carrier j, then it is counted as an LBT failure on the BWP of carrier i, and cannot be counted as an LBT failure on the BWP of carrier j. That is to say, if and only if the channel access procedure performed on the BWP of carrier i fails, it may be recorded as an LBT failure on the BWP of carrier i.

When the UE is configured to perform joint LBT on a plurality of LBT sub-bands, if the UE fails channel access on a LBT sub-band I, which causes the UE to fail to send an uplink signal on the other LBT bandwidth j, then it cannot be counted as an LBT failure of the UE on LBT bandwidth j. For example, the UE selects LBT sub-band i to perform the type-1 channel access. If and only if LBT sub-band i successfully performs the type-1 channel access, the type-2 channel access can be performed on the other LBT sub-band j. If and only if the type-2 channel access of LBT sub-band j is successful, the uplink transmission can be performed on LBT sub-band i and LBT sub-band j. If the UE successfully performs the type-1 channel access on LBT sub-band i, but the type-2 channel access fails on LBT sub-band j and causing the UE to fail to send a signal on LBT sub-band i and LBT sub-band j, then it is counted as an LBT failure on LBT sub-band j but cannot be counted as an LBT failure on LBT sub-band i. If the UE fails to perform the type-1 channel access on LBT sub-band i, which causes that an uplink signal cannot be sent on LBT sub-band j, then it is counted as an LBT failure on LBT sub-band i, but cannot be counted as an LBT failure on LBT sub-band j. That is, if and only if the channel access procedure performed on LBT sub-band i fails, it may be recorded as an LBT failure on LBT sub-band i.

It is not difficult to see that, if a signal cannot be sent on a carrier/BWP/LBT sub-band, and LBT is not performed on this carrier/BWP/LBT sub-band, then it cannot be counted as an LBT failure.

When the sender counts the number of LBT failures, it does not count LBT failures in the case where a signal cannot be sent on a carrier/BWP/LBT sub-band caused by other carrier/BWP/LBT sub-band described above. Therefore, the influence of a carrier or BWP or LBT sub-band on the busy or idle status of another carrier or BWP or LBT sub-band and a statistical result thereof may be avoided.

Preferably, LBT failures are counted with a carrier as the granularity. Preferably, LBT failures are counted with a BWP as the granularity. Preferably, LBT failures are counted with a configured LBT sub-band as the granularity.

Preferably, when a carrier is used as the granularity in the process of counting, the LBT failures of the BWPs or the LBT sub-bands are jointly counted.

Preferably, when a BWP is used as the granularity in the process of counting, the LBT failures of the LBT sub-bands within a BWP are jointly counted. For example, if LBT fails on at least one LBT sub-band in the LBT sub-bands in an uplink transmission, it is counted as an LBT failure of a BWP, or if LBT on all LBT sub-bands fails, it is counted as an LBT failure of a BWP, or, in the LBT sub-bands of an uplink transmission, the LBT failure factor in a BWP is calculated according to a weighted summation method. If the LBT failure factor is greater than a pre-set threshold, it is counted as an LBT failure of a BWP; or in the LBT sub-bands of an uplink transmission, if the number of LBT failed LBT sub-bands or the ratio of the number of LBT failed LBT sub-bands to the total number of LBT sub-bands exceeds a preset threshold, it is counted as an LBT failure of a BWP. Preferably, as described above, an LBT sub-band that has not undergone LBT due to the failure of other LBT sub-band is not counted as an LBT failure of this LBT sub-band.

Preferably, when a BWP is used as the granularity in the process of counting, if an uplink transmission fails in this BWP due to an LBT failure in this BWP, it is counted as an LBT failure of this BWP. For example, the bandwidth of a currently activated BWP is 60 MHz, which is divided into 3 LBT sub-bands, and each LBT sub-band is 20 MHz. An uplink transmission is PUSCH1, and an uplink resource allocated by the base station to PUSCH1 is 40 MHz, corresponding to two LBT sub-bands. If the UE succeeds in LBT on one of the LBT sub-bands, and fails on the other LBT sub-band, resulting in failure to send the PUSCH on any one of the LBT sub-bands, it is counted as an LBT failure. As another example, an uplink transmission is two SRS signals, and SRS1 and SRS2 are located in LBT sub-band 1 and LBT sub-band 2, respectively. If the UE succeeds in LBT on LBT sub-band 1, and fails in LBT on LBT sub-band 2, the UE may send SRS1 on LBT sub-band 1, which shall not be counted as an LBT failure. As another example, according to the method described in the present embodiment, if the UE's LBT failure on the BWP of another carrier causes a transmission failure on the BWP of this carrier, it shall not be counted as an LBT failure of this BWP.

Preferably, when a BWP is used as the granularity in the process of counting, the BWPs are counted respectively. For example, if the UE can only operate on an activated BWP at one time, and may operate on different BWPs at different times, then each BWP has a timer or counter to count the LBT failures of each BWP respectively. The counting of the LBT failures for each BWP is determined according to the method described above, and detailed description thereof will be omitted.

FIG. 7 is a flowchart of a transmission method according to another embodiment of the present disclosure. The embodiment shown in FIG. 7 has some similar contents to the embodiment shown in FIG. 5, and thus these similar contents will be omitted. As shown in FIG. 7, the transmission method according to the present embodiment may comprise:

At step 701, the UE sends a message A including a preamble sequence and a PUSCH, after type-1 channel access is successful.

At step 702, the UE adjusts a CWS based on feedback information for the preamble sequence and/or the PUSCH.

In one aspect, the step of adjusting a CWS based on feedback information for the preamble sequence and/or the PUSCH may comprise: resetting the CWS when the feedback information is fallback random access acknowledgement.

In another aspect, the step of adjusting a CWS based on feedback information for the preamble sequence and/or the PUSCH may comprise: resetting the CWS when the feedback information is a successful random access acknowledgement.

According to the transmission method of another embodiment of the present disclosure, the CWS is kept unchanged when the feedback information is fallback random access acknowledgement, and the CWS is reset when the feedback information is successful random access acknowledgement. Therefore, the transmission method according to another embodiment of the present disclosure improves the accuracy of judging whether the channel is busy or not, thereby reducing system overhead and improving system efficiency at the same time.

Hereinafter, the technical solution of adjusting a CWS will be described in detail in combination with specific embodiments.

In order to reduce a collision probability between hidden terminals, a HARQ-ACK result of the last transmission may be used to reflect whether a collision between different sending nodes occurs and adjust the contention window size (CWS) of the channel access procedure accordingly. Generally, NACK may reflect the occurrence of collision to a certain extent. When the percentage of NACK exceeds a pre-set threshold, the sender increases the CWS, otherwise the CWS is reset.

In a two-step random access procedure, the UE sends Msg A, including a random access preamble sequence and a PUSCH. If the UE receives feedback from the base station after sending Msg A, the UE does not increase the CWS. For example, if the UE sends Msg A preamble and Msg A PUSCH after completing the type-1 channel access, and if the UE receives its own fallback RAR, the UE resets the CWS. In the prior art, if HARQ-ACK of the last PUSCH is NACK or the base station schedules a PUSCH retransmission, the UE increases the CWS. In the present embodiment, although Msg A PUSCH is not successfully received by the base station, and Msg A PUSCH retransmission is scheduled through the fallback RAR, considering that the base station correctly receives the preamble, it means that hidden terminal collision does not occur or mutual influence is small, so there is no need to further increase the CWS to reduce the collision probability. If the UE does not receive any feedback from the UE, for example, the UE has neither received its own fallback RAR nor its own success RAR, the UE increases the CWS. According to another more conservative CWS adjustment method, if the UE receives its own success RAR, the UE resets the CWS; if the UE receives its own fallback RAR, the UE keeps the CWS unchanged; and if the UE has neither received its own fallback RAR nor its own success RAR, the UE increases the CWS.

To avoid extra LBT between Msg A preamble and Msg A PUSCH, the two signals should be continuous in time. If the two signals cannot be continuous in time, it is possible to send a padding signal and/or increase the cyclic prefix of the PUSCH, so that there is no gap between the two signals. Or, the time gap between the two signals is not greater than a pre-set threshold. For example, if the gap is 16 us, there is no need to perform LBT or 16 us LBT before sending Msg A PUSCH.

Hereinafter, the technical solution of a paging occasion will be described in detail in combination with specific embodiments.

In order to reduce the impact of LBT failure on a paging channel, in a paging occasion, for a beam direction, a plurality of PDCCH monitoring occasions (referred to as PDCCH MOs) for paging are defined. For example, a PO comprises S*M PDCCH MOs, where S is the number of beams and M is the number of PDCCH MOs for each beam.

In an licensed frequency band, S is determined according to the number of SSBs actually sent. In an unlicensed frequency band, because the LBT result before each SSB transmission is different, the number of SSBs that can be sent each time may be different. For example, the base station is expected to send 4 SSBs. In an SSB sending window, because LBT success time is late, only 3 SSBs can be sent in the SSB sending window, while in the next SSB sending window, because LBT success time is early, 4 SSBs may be sent. In order to avoid the influence of a changed number of SSBs to the PDCCH MO, S cannot be determined based on the number of SSBs actually sent, but determined based on the number of SSBs expected to be sent. The number of SSBs expected to be sent may be sent to the UE through system information or higher layer signaling.

If in an SSB sending window, the base station may send two or more SSBs, and these SSBs satisfy a QCL (Quasi-co-located) relationship, then, the SSBs that satisfy Mod $(A_i,Q)$=Mod $(A_j,Q)$ corresponds to the same PDCCH MO, where Q is a QCL parameter, and $A_i$ and $A_j$ are DMRS indexes of the SSBs. For example, the number of SSBs expected to be sent is S=4, Q=2, M=4, a PO comprises 4×4 PDCCH MOs, and the SSB of DMRS sequence i corresponds to the $i^{th}$, i+Q, i*2Q . . . PDCCH MO.

Preferably, when calculating the PDCCH MOs for paging in the PO, it is calculated according to the number of SSBs, which are expected to be sent but do not satisfy the QCL relationship, and these SSBs that satisfy the QCL correspond to the same PDCCH MO. For example, the number of SSBs expected to be sent is S=4, Q=2, M=4, and a PO comprises 4×min (Q,S)=8 PDCCH MOs.

The present disclosure is suitable for sending and receiving on unlicensed frequency bands. In addition, the present disclosure is also suitable for applicable scenarios on licensed frequency bands.

The above are only the preferred embodiments of the present disclosure, and do not intend to limit the present disclosure. Any modification, equivalent replacement, and improvement made within the spirit and principle of the present disclosure shall be comprised in the scope of protection of the present disclosure.

If the embodiments shown in FIG. 1 to FIG. 7 are detailed descriptions of the embodiments of the present disclosure from the perspective of the UE, the embodiments of the present disclosure will be described in detail below from the perspective of the base station with reference to the corresponding accompanying drawings.

FIG. 8 is a flowchart of a transmission method according to another embodiment of the present disclosure. The transmission method according to an embodiment of the present disclosure as shown in FIG. 8 will be discussed below.

At step 801, the base station sends at least one DCI.

Here, the DCI comprises: a first bit field, a second bit field, and a third bit field. The first bit field is used to indicate a PDSCH group index scheduled by the DCI, the second bit field is used to indicate an ACK status of a PDSCH group scheduled by the DCI, the third bit field is used to indicate all process feedback HARQ-ACK and is used to determine an ACK status of further PDSCH group other than the PDSCH group scheduled by the DCI.

The third bit field comprises two bits and has a first status, a second status, a third status, and a fourth status. The first status is used to trigger HARQ-ACK feedback of the PDSCH group scheduled by the DCI, the second status is used to trigger HARQ-ACK feedback of two PDSCH groups, the third status is used to trigger HARQ-ACK feedback of all HARQ processes and is used to indicate that the ACK status of the further PDSCH group other than the PDSCH group scheduled by the DCI is an toggled status, the fourth status is used to trigger HARQ-ACK feedback of all HARQ processes and is used to indicate that the ACK status of the further PDSCH group other than the PDSCH group scheduled by the DCI is a non-toggled status.

The status information of the to-be-determined HARQ-ACK comprises: ACK status of the to-be-determined HARQ-ACK; the content of the to-be-determined HARQ- ACK further comprises: the HARQ-ACK of the current PDSCH group, or the HARQ-ACK of two PDSCH groups, or the HARQ-ACK of all HARQ processes.

At step 802, the base station receives a time resource of HARQ-ACK determined based on the DCI and/or HARQ-ACK sent by HARQ-ACK status information.

Here, the step of sending HARQ-ACK will be further discussed below.

The third bit field comprises two sub-bit fields, when a first sub-bit field triggers the HARQ-ACK feeding back all the HARQ processes, a second sub-bit field indicates an ACK status of further PDSCH group other than the PDSCH group scheduled by the DCI, based on the ACK status of the further PDSCH group other than the PDSCH group scheduled by the DCI, and an ACK status of the PDSCH group scheduled by the DCI indicated by the second bit field, determines a HARQ-ACK value of each of the HARQ-ACK processes;

When the first sub-bit field does not trigger the HARQ-ACK for feeding back all HARQ processes, the second sub-bit field triggers the HARQ-ACK for feeding back the PDSCH group scheduled by the DCI, or triggers the HARQ-ACK of two PDSCH groups, and determines a HARQ-ACK value of the PDSCH group based on an ACK status of the PDSCH group scheduled by the DCI indicated by a second bit field.

The embodiment shown in FIG. 1 is an embodiment described on the UE side, and the embodiment shown in FIG. 8 is an embodiment described on the base station side. There is some overlap between the two embodiments, and detailed descriptions thereof are omitted. However, the embodiment shown in FIG. 1 is sufficient to be combined by those skilled in the art to understand the embodiment shown in FIG. 8.

According to an embodiment of the transmission method of the present disclosure, through the two bits of the third bit field of the DCI, four status may be fed back respectively, namely, triggering HARQ-ACK feedback of the current PDSCH group, triggering HARQ ACK feedback of two PDSCH groups, triggering HARQ-ACK feedback of all HARQ processes, which indicates that the ACK status of further PDSCH group other than the current PDSCH group is an toggled status, and triggering HARQ-ACK feedback of all HARQ processes, which indicates that the ACK status of further PDSCH group other than the current PDSCH group is a non-toggled status.

However, in the prior art, when the HARQ-ACK feedback of the current PDSCH group is triggered, and the HARQ-ACK feedback of two PDSCH groups is triggered, it needs to be implemented with 1 bit; when the HARQ-ACK feedback of all HARQ processes is triggered and is used to indicate that the ACK status of further PDSCH group other than the current PDSCH group is an toggled status, and the HARQ-ACK feedback of all HARQ processes is triggered and indicates that the ACK status of further PDSCH group other than the current PDSCH group is a non-toggled status, it needs to be implemented with 1 bit. That is, based on the prior art, if the feedback of the four status of an embodiment of the transmission method according to the present disclosure is desired to be implemented, three bits are required.

Therefore, an embodiment of the transmission method according to the present disclosure reduces DCI overhead by $\frac{1}{3}$ compared with the prior art.

FIG. 9 is a flowchart of a transmission method according to another embodiment of the present disclosure. The transmission method according to an embodiment of the present disclosure as shown in FIG. 9 may be discussed below.

At step 901, it sends multiple DCI.

A HARQ-ACK timing value indicated in a DCI is non-numeric.

The DCI comprises: a first bit field and a second bit field.

The first bit field is used to indicate a PDSCH group index scheduled by the DCI; and the second bit field is used to indicate an ACK status of a PDSCH group scheduled by the DCI.

At step 902, it receives a time resource of HARQ-ACK determined based on the DCI and/or HARQ-ACK sent by HARQ-ACK status information.

Further, the step of receiving a time resource of HARQ-ACK determined based on the DCI and/or HARQ-ACK sent by HARQ-ACK status information comprises: determining that the time resource of the HARQ-ACK is the same as the time resource of HARQ-ACK with a non-numeric timing value, according to such a DCI that has the same value in the first and second bit fields respectively and has the smallest time interval; and receiving the HARQ-ACK based on the determined HARQ-ACK time resource.

Further, if there are two DCIs that have the same value in the first and second bit fields respectively and have the smallest time interval, then it is determined that the time resource of HARQ-ACK of the two DCIs is the same as the time resource of the HARQ-ACK with a non-numeric timing value.

The embodiment shown in FIG. 3 is an embodiment described on the UE side, and the embodiment shown in FIG. 9 is an embodiment described on the base station side. There is some overlap between the two embodiments, and detailed descriptions thereof are omitted. However, the embodiment shown in FIG. 3 is sufficient to be combined by those skilled in the art to understand the embodiment shown in FIG. 9.

According to a transmission method according to another embodiment of the present disclosure, when the received HARQ-ACK timing value is non-numeric DCI, it is possible to determine the time resource of the HARQ-ACK corresponding to the first DCI based on the timing value in the second DCI.

However, in the prior art, when the received HARQ-ACK timing value is non-numeric DCI, retransmission is required. Therefore, compared with the prior art, the transmission method in another embodiment of the present disclosure may greatly reduce system overhead and improve system efficiency.

FIG. 10 is a flowchart of a transmission method according to another embodiment of the present disclosure. The transmission method according to an embodiment of the present disclosure as shown in FIG. 10 may comprise:

At step 1001, it sends uplink signal transmission resource information.

At step 1002, it receives the uplink signal on a frequency domain resource determined based on the uplink signal transmission resource information.

The frequency domain resource is determined based on the uplink signal transmission resource information by: determining the frequency domain resource occupied for sending the uplink signal based on the uplink signal transmission resource information, channel occupation time, and an LBT sub-band corresponding to the COT. Then at step 1002, it receives the uplink signal on the determined frequency domain resource.

Further, the step of determining this frequency domain resource occupied for sending the uplink signal comprises the following details.

When the uplink signal is within the COT, it determines an LBT sub-band for carrying the uplink signal based on the LBT sub-band where the COT is located; and When the uplink signal is outside the COT, it determines an LBT sub-band for carrying the uplink signal based on the uplink signal transmission resource information.

The step of determining the frequency domain resource occupied for sending the uplink signal may comprise: when the LBT sub-band corresponding to the COT is the LBT sub-band where the PDCCH for triggering the uplink signal transmission is located, the PDCCH for triggering the uplink signal transmission and the uplink signal belong to the same COT; or Further, the LBT sub-band corresponding to the COT is the LBT sub-band where the COT is located.

The embodiment shown in FIG. 5 is an embodiment described on the UE side, and the embodiment shown in FIG. 10 is an embodiment described on the base station side. There is some overlap between the two embodiments, and detailed descriptions thereof are omitted. However, the embodiment shown in FIG. 5 is sufficient to be combined by those skilled in the art to understand the embodiment shown in FIG. 10.

In the transmission method according to another embodiment of the present disclosure, when the uplink signal is within the COT, it determines an LBT sub-band for carrying the uplink signal based on the LBT sub-band where the COT is located; and when the uplink signal is outside the COT, it determines an LBT sub-band for carrying the uplink signal based on the uplink signal transmission resource information. At the same time, in the transmission method according to another embodiment of the present disclosure, when the LBT sub-band corresponding to the COT is the LBT sub-band where the PDCCH triggering the uplink signal transmission is located, the PDCCH for triggering the uplink signal transmission and the uplink signal belong to the same COT; or the LBT sub-band corresponding to the COT is the LBT sub-band where the COT is located.

The transmission method in another embodiment of the present disclosure reduces system overhead and improves system efficiency by using the foregoing method.

FIG. 11 is a flowchart of a transmission method according to another embodiment of the present disclosure. The transmission method according to an embodiment of the present disclosure as shown in FIG. 11 may comprise:

At step 1101, it sends uplink signal transmission resource information.

At step 1102, if the number of LBT failures exceeds a pre-set threshold, LBT failure information is received, where the number of LBT failures is the number of joint LBT or separate LBT failures performed on the frequency domain resource occupied for sending the uplink signal, and the frequency domain resource occupied for sending the uplink signal comprises: a carrier and/or BWP and/or LBT bandwidth.

Further, the number of LBT failures is counted by a rule of:

It performs a type-1 channel access, for the $i^{th}$ uplink channel resource;

It performs a type-2 channel access for the $j^{th}$ uplink channel resource, after the type-1 channel access for the $i^{th}$ uplink channel resource is successful;

When the type-2 channel access fails due to the failure of the type-1 channel access, it is determined that the LBT fails for the $i^{th}$ frequency domain resource occupied for sending the uplink signal, but not for the $j^{th}$ frequency domain resource occupied for sending the uplink signal fails; at the same time, it will not regarded that LBT succeeds for the $j^{th}$ frequency domain resource occupied for sending the uplink signal.

Further, the number of LBT failures is counted by a rule of:

It performs a type-1 channel access, for the $i^{th}$ uplink channel resource;

It performs a type-2 channel access for the $j^{th}$ uplink channel resource, after the type-1 channel access for the $i^{th}$ uplink channel resource is successful;

when the type-1 channel access is successful, but the type-2 channel access fails, a result of the type-2 channel access for the $i^{th}$ uplink channel resource is not counted as an LBT failure of the $i^{th}$ frequency domain resource occupied for sending the uplink signal; and is counted as an LBT failure of the $j^{th}$ frequency domain resource occupied for sending the uplink signal.

When counting the number of failures, it counts the number of LBT failures on a carrier or a BWP or an LBT sub-band.

When counting the number of LBT failures on a BWP, it is jointly determined whether the current BWP fails in LBT based on an LBT result of each LBT sub-band within a BWP.

The embodiment shown in FIG. 6 is an embodiment described on the UE side, and the embodiment shown in FIG. 11 is an embodiment described on the base station side. There is some overlap between the two embodiments, and detailed descriptions thereof are omitted. However, the embodiment shown in FIG. 6 is sufficient to be combined by those skilled in the art to understand the embodiment shown in FIG. 11.

According to the transmission method of another embodiment of the present disclosure, when the type-1 channel access for the $i^{th}$ uplink channel resource fails, a result of the type-2 channel access for the $j^{th}$ uplink channel resource is not counted as an LBT failure of the $j^{th}$ uplink channel resource; and at the same time is not counted as an LBT success of the $j^{th}$ uplink channel resource. In addition, according to the transmission method of another embodiment of the present disclosure, when the type-1 channel access is successful, but the type-2 channel access fails, a result of the type-2 channel access for the $j^{th}$ uplink channel resource is not counted as an LBT failure of the $i^{th}$ frequency domain resource occupied for sending the uplink signal, but is counted as an LBT failure of the $j^{th}$ frequency domain resource occupied for sending the uplink signal. The transmission method of another embodiment of the present disclosure reduces system overhead and improves system efficiency by using the foregoing method.

FIG. 12 is a flowchart of a transmission method according to another embodiment of the present disclosure. The transmission method according to an embodiment of the present disclosure as shown in FIG. 12 may comprise the following steps.

At step 1201, it receives a message A including a preamble sequence and a PUSCH, after type-1 channel access is successful.

The preamble sequence and the PUSCH are continuous in time.

At step 1202, it accepts a CWS adjustment based on feedback information for the preamble sequence and/or the PUSCH.

Further, the step of accepting a CWS adjustment based on feedback information for the preamble sequence and/or the PUSCH comprises: when the feedback information is fallback random access acknowledgement, the CWS adjustment is accepted.

The embodiment shown in FIG. 7 is an embodiment described on the UE side, and the embodiment shown in FIG. 12 is an embodiment described on the base station side. There is some overlap between the two embodiments, and detailed descriptions thereof are omitted. However, the embodiment shown in FIG. 7 is sufficient to be combined by those skilled in the art to understand the embodiment shown in FIG. 12.

According to the transmission method of another embodiment of the present disclosure, the CWS is kept when the feedback information is fallback random access acknowledgement, and the CWS is reset when the feedback information is a successful random access acknowledgement. Therefore, the transmission method according to another embodiment of the present disclosure improves the accuracy of judging whether the channel is busy or not, thereby reducing system overhead and improving system efficiency at the same time.

FIG. 13 is a block diagram of a transmission apparatus according to an embodiment of the present disclosure. As shown in FIG. 13, a transmission apparatus 1300 according to an embodiment of the present disclosure may comprise at least a first receiving module 1301, a first determining module 1302, and a first sending module 1303.

The first receiving module 1301 is configured to receive at least one DCI.

Here, the DCI may comprise: a first bit field, a second bit field, and a third bit field. The first bit field is used to indicate a PDSCH group index scheduled by the DCI, the second bit field is used to indicate an ACK status of a PDSCH group scheduled by the DCI, the third bit field is used to indicate all process feedback HARQ-ACK and is used to determine an ACK status of further PDSCH group other than the PDSCH group scheduled by the DCI.

The third bit field comprises two bits and has a first status, a second status, a third status, and a fourth status. The first status is used to trigger HARQ-ACK feedback of the PDSCH group scheduled by the DCI, the second status is used to trigger HARQ-ACK feedback of two PDSCH groups, the third status is used to trigger HARQ-ACK feedback of all HARQ processes and is used to indicate that the ACK status of the further PDSCH group other than the PDSCH group scheduled by the DCI is an toggled status, and the fourth status is used to trigger HARQ-ACK feedback of all HARQ processes and is used to indicate that the ACK status of the further PDSCH group other than the PDSCH group scheduled by the DCI is a non-toggled status.

The status information of the to-be-sent HARQ-ACK comprises: ACK status of the to-be-determined HARQ-ACK. The contents of the to-be-determined HARQ-ACK further comprises: the HARQ-ACK of the current PDSCH group, or the HARQ-ACK of two PDSCH groups, or the HARQ-ACK of all HARQ processes.

The first determining module 1302 is configured to determine a time resource of the to-be-sent HARQ-ACK and/or status information of the to-be-sent HARQ-ACK determined based on the DCI.

The first sending module 1303 is configured to send the HARQ-ACK based on the determined HARQ-ACK time resource and/or HARQ-ACK status information.

The third bit field comprises two sub-bit fields. The first sending module 1303 further comprises: a first sending sub-determination module configured to, when a first sub-bit field triggers the HARQ-ACK feeding back all the HARQ processes, make a second sub-bit field indicate an ACK status of further PDSCH group other than the PDSCH group scheduled by the DCI. In addition, the second sub-bit field is used to determine a HARQ-ACK value of each of the HARQ-ACK processes, based on the ACK status of the further PDSCH group other than the PDSCH group scheduled by the DCI, and an ACK status of the PDSCH group scheduled by the DCI indicated by the second bit field.

When the first sub-bit field does not trigger the HARQ-ACK for feeding back all the HARQ processes, the second sub-bit field triggers the HARQ-ACK for feeding back the PDSCH group scheduled by the DCI, or triggers the HARQ-ACK of two PDSCH groups, and determines a HARQ-ACK value of the PDSCH group based on an ACK status of the PDSCH group scheduled by the DCI indicated by a second bit field.

The embodiment of the transmission apparatus shown in FIG. 13 is a hardware form of the embodiment of the transmission method shown in FIG. 1. There are some similar explanations between the two embodiments, and detailed descriptions thereof are omitted. However, the embodiment of the transmission method shown in FIG. 1 is sufficient to be combined by those skilled in the art to understand the embodiment of the transmission apparatus shown in FIG. 13.

According to an embodiment of the transmission apparatus of the present disclosure, through the two bits of the third bit field of the DCI, four status may be fed back respectively, namely, triggering HARQ-ACK feedback of the current PDSCH group, triggering HARQ-ACK feedback of two PDSCH groups, triggering HARQ-ACK feedback of all HARQ processes, which indicate that the ACK status of further PDSCH group other than the current PDSCH group is an toggled status, and triggering HARQ-ACK feedback of all HARQ processes, which indicates that the ACK status of further PDSCH group other than the current PDSCH group is a non-toggled status.

However, in the prior art, when the HARQ-ACK feedback of the current PDSCH group is triggered, and the HARQ-ACK feedback of two PDSCH groups is triggered, it needs to be implemented with 1 bit; when the HARQ-ACK feedback of all HARQ processes is triggered and is used to indicate that the ACK status of further PDSCH group other than the current PDSCH group is an toggled status, and the HARQ-ACK feedback of all HARQ processes is triggered and is used to indicate that the ACK status of further PDSCH group other than the current PDSCH group is a non-toggled status, it needs to be implemented with 1 bit. That is, based on the prior art, if the feedback of the four status of an embodiment of the transmission method according to the present disclosure is desired to be implemented, three bits are required.

Therefore, an embodiment of the transmission method according to the present disclosure reduces DCI overhead by 1/3 compared with the prior art.

FIG. 14 is a block diagram of a transmission apparatus according to another embodiment of the present disclosure. As shown in FIG. 14. The transmission apparatus 1400 according to an embodiment of the present disclosure may comprise at least a second receiving module 1401, a second determining module 1402, and a second sending module 1403.

The second receiving module 1401 is configured to receive uplink signal transmission resource information.

The second determining module 1402 is configured to determine, based on the uplink signal transmission resource information, a frequency domain resource occupied for sending an uplink signal.

The second determining module 1402 may comprise: a second determining sub-determination module (not shown) and a second determining sub-sending module (not shown). The second determining sub-determination module (not shown) is configured to determine, based on the uplink signal transmission resource information, channel occupation time, and an LBT sub-band corresponding to the COT, a frequency domain resource occupied for sending the uplink signal. The second determining sub-sending module (not shown) is configured to attempt to send the uplink signal on the determined frequency domain resource.

In addition, the second determining sub-determination module (not shown) is further configured to, when the uplink signal is within the COT, determine an LBT sub-band for carrying the uplink signal based on the LBT sub-band where the COT is located; and when the uplink signal is outside the COT, determine an LBT sub-band for carrying the uplink signal based on the uplink signal transmission resource information.

In addition, the second determining sub-determination module (not shown) is further configured to, when the LBT sub-band corresponding to the COT is the LBT sub-band where the PDCCH for triggering the uplink signal transmission is located, the PDCCH for triggering the uplink signal transmission and the uplink signal belong to the same COT.

The second sending module 1403 is configured to attempt to send the uplink signal on the determined frequency domain resource.

The embodiment of the transmission apparatus shown in FIG. 14 is a hardware form of the embodiment of the transmission method shown in FIG. 5. There are some similar explanations between the two embodiments, and detailed descriptions thereof are omitted. However, the embodiment of the transmission method shown in FIG. 5 is sufficient to be combined by those skilled in the art to understand the embodiment of the transmission apparatus shown in FIG. 14.

When the uplink signal is within the COT, the transmission apparatus according to another embodiment of the present disclosure determines an LBT sub-band for carrying the uplink signal based on the LBT sub-band where the COT is located. When the uplink signal is outside the COT, the transmission apparatus determines an LBT sub-band for carrying the uplink signal based on the uplink signal transmission resource information. At the same time, in the transmission apparatus according to another embodiment of the present disclosure, when the LBT sub-band corresponding to the COT is the LBT sub-band where the PDCCH for triggering the uplink signal transmission is located, the PDCCH for triggering the uplink signal transmission and the uplink signal belong to the same COT; or the LBT sub-band corresponding to the COT is the LBT sub-band where the COT is located.

The transmission apparatus in another embodiment of the present disclosure reduces system overhead and improves system efficiency by using the foregoing method.

FIG. 15 is a detailed schematic diagram showing a hardware entity applicable to the present disclosure. The hardware entity shown in FIG. 15 may be suitable as a base station, a UE, or a server in various embodiments of the present disclosure. The hardware entity comprises one or more processors, transceivers, etc. The one or more processors are, for example, one or more central processing units (CPUs) 1501, and/or one or more coprocessors 1513, and the like. The processor may perform various appropriate actions and processes according to executable instructions stored in a read-only memory (ROM) 1502 or executable instructions loaded from the storage section 1508 into a random access memory (RAM) 1503. The transceiver 1512 may comprise a transmitter and a receiver.

The processor may communicate with the read-only memory 1502 and/or the random access memory 1503 to execute executable instructions, connect to the transceiver 1512 through a bus 1504, and communicate with other entities via the transceiver 1512, thereby completing operations corresponding to any one of the methods provided in the embodiments of the present disclosure.

In addition, in the RAM 1503, various programs and data required for the operation of the apparatus may be stored. The CPU 1501, the ROM 1502, and the RAM 1503 are connected to each other through the bus 1504. With the RAM 1503, the ROM 1502 is an optional module. The RAM 1503 stores executable instructions, or writes executable instructions to the ROM 1502 at runtime, and the executable instructions cause the CPU 1501 to perform operations corresponding to the foregoing communication method. An input/output (I/O) interface 1505 is also connected to the bus 1504. The transceiver 1512 may be integratedly configured, or may be configured to have multiple sub-modules (for example, multiple IB network cards) and be on a bus link.

The following components may be connected to the I/O interface 1505: an input portion 1506 including a keyboard, a mouse, and the like; an output portion 1507 including a cathode ray tube (CRT), a liquid crystal display (LCD), a speaker, and the like; a storage portion 1508 including a hard disk and the like; and a communication portion 1509 including a network interface card such as a LAN card, and a modem. The communication portion 609 performs communication processing via a network such as the Internet. A driver 1510 is also connected to the I/O interface 1505 as needed. A removable medium 1511, such as a magnetic disk, an optical disk, a magneto-optical disk, and a semiconductor memory, is installed on the driver 1510 as needed, so that a computer program read therefrom is installed into the storage portion 1508 as needed.

It should be noted that the architecture shown in FIG. 15 is only an optional implementation. In the specific practice process, the number and types of the components in FIG. 15 may be selected, deleted, added, or replaced according to actual needs. Different functional component settings may also be implemented in separate settings or integrated settings. For example, the GPU and CPU may be set separately or the GPU may be integrated on the CPU. The transceiver may be set separately or integrated on the CPU or GPU, and the like. These alternative embodiments all fall into the protection scope disclosed in the present disclosure.

In addition, according to the embodiments of the present disclosure, the processes described above with reference to the flowcharts may be implemented as computer software programs. For example, the present disclosure provides a non-transitory machine-readable storage medium that stores machine-readable instructions, and the machine-readable instructions can be executed by a processor to execute instructions corresponding to the method steps provided in the present disclosure. In such an embodiment, the computer program may be downloaded and installed from a network through the communication portion 609, and/or installed from the removable medium 1511. The computer program, when executed by the central processing unit (CPU) 1501, executes the above-mentioned functions as defined in the method of the present disclosure.

This application further relates to wireless communication technology, and in particular, to a method and device for transmitting uplink control information.

With the rapid development of the information industry, especially the increasing demand from the mobile Internet and the Internet of Things (IoT for short), unprecedented challenges has been brought to future mobile communication technologies. In order to cope with these unprecedented challenges, the communication industry and academia have conducted 2020-oriented extensive research on fifth-generation (5G) mobile communication technology. According to the work plan organized by 3GPP (Third Generation Partnership Project), the work on Rel-16 of 5G has been basically completed, and the second phase of the work is in progress.

According to an aspect of the present application, a method performed by a user equipment (UE) in a communication system is provided. The method comprises: receiving, by the UE, signals from a base station on a downlink channel; transmitting, by the UE, feedback information to the base station.

Optionally, the UE determines resources for transmitting an HARQ-ACK based on hybrid automatic repeat request acknowledgement (HARQ-ACK) feedback parameters received from the base station, wherein, the HARQ-ACK feedback parameters are indicated by the base station when triggering the UE to feedback the HARQ-ACK; or wherein, the HARQ-ACK feedback parameters are indicated by the base station when configuring PDSCH transmission.

Optionally, when the UE receives the indication triggering the UE to feedback an HARQ-process-based HARQ-ACK of the base station, the UE feeds back HARQ-ACKs for all the triggered HARQ processes; and wherein, all the HARQ processes correspond to same or different priorities, or correspond to same or different HARQ-ACK codebook index.

Optionally, wherein, when the UE receives the indication triggering the UE to feedback the HARQ-process-based HARQ-ACK of the base station, the UE feeds back the HARQ-ACK based on a condition, wherein, the UE feeding back the HARQ-ACK based on the condition comprises: feeding back, by the UE, a valid HARQ-ACK for an HARQ process meeting the condition, and a default HARQ-ACK value for an HARQ process not meeting the condition; or feeding back, by the UE, only the valid HARQ-ACK for the HARQ process meeting the condition; or determining, by the UE, a size of the HARQ-ACK feedback only according to a number of HARQ processes meeting the condition, and feeding back valid HARQ-ACKs for these HARQ processes meeting the condition based on the determined size of the HARQ-ACK feedback; wherein, the condition is that HARQ-ACK parameters corresponding to the HARQ process are as same as the HARQ-ACK parameters indicated by the base station when triggering HARQ-ACK feedback.

Optionally, if priorities of HARQ-ACKs for HARQ processes to be fed back are different, then the HARQ-ACK feedback parameters are determined according to parameters corresponding to an HARQ-ACK with highest priority among the HARQ-ACKs to be fed back.

Optionally, wherein a physical downlink control channel (PDCCH) triggering HARQ-ACK feedback is common to a UE group, and the PDCCH indicates an HARQ-ACK codebook index of each UE, or wherein the PDCCH indicates that one HARQ-ACK codebook index is applicable to each UE of this group.

Optionally, wherein the indication triggering HARQ-ACK feedback received by the UE from the base station only triggers HARQ-ACKs for physical downlink shared channel (PDSCH) groups of a same HARQ-ACK codebook to be fed back together.

Optionally, wherein the indication triggering HARQ-ACK feedback received by the UE from the base station triggers HARQ-ACKs for PDSCH groups of different HARQ-ACK codebooks to be fed back together.

Optionally, the indication triggering HARQ-ACK feedback includes an HARQ-ACK codebook index triggering feeding back the HARQ-ACK, and index information of PDSCH groups of the triggered HARQ-ACK codebook; or the indication triggering HARQ-ACK feedback includes HARQ-ACK size information of respective HARQ-ACK codebook, and/or New_feedback indication (NFI) information of respective HARQ-ACK codebook.

Optionally, the method further comprises: determining HARQ-ACK feedback bits for a PDSCH of a serving cell based on the transmission type of the PDSCH.

Optionally, if the serving cell is configured with transport block (TB)-based PDSCH transmission, then the UE determines HARQ-ACK feedback bits of the PDSCH of the serving cell according to the TB; and if the serving cell is configured with code block group (CBG)-based PDSCH transmission, then the UE determines the HARQ-ACK feedback bits of the PDSCH of the serving cell according to attributes of an HARQ-ACK codebook to which the PDSCH belongs, wherein, the HARQ-ACK codebook to which the PDSCH belongs is configured to be CBG-based or TB-based.

Optionally, for a UE in a serving cell configured with TB-based PDSCH transmission, each HARQ process generates a 1-bit HARQ-ACK per TB; for a UE in a serving cell configured with CBG-based PDSCH transmission, if there is at least one codebook for CBG-based transmission in HARQ-ACK codebooks configured for the UE, then each HARQ process generates an N-bit HARQ-ACK, wherein N is a maximum configured number of CBGs.

Optionally, if the UE is triggered to feedback an HARQ-process-based HARQ-ACK, and the serving cell is configured with multiple codebooks, then HARQ-ACK bits for each HARQ process of the serving cell are determined based on a maximum number of HARQ-ACK bits corresponding to codebook configuration of the serving cell.

Optionally, in the case that the UE is configured with semi-persistent (SPS) transmission, when the HARQ-ACK codebook includes only the HARQ-ACKs for the SPS PDSCHs, if the UE does not receive any of the SPS PDSCHs, the UE does not transmit the HARQ-ACKs; if the UE receives at least one SPS PDSCH, the UE transmits HARQ-ACKs for all SPS PDSCHs.

Optionally, the SPS PDSCH further includes downlink control information, and the downlink control information at least includes at least one of PDSCH group information, downlink allocation index (DAI) information, and new feedback indication (NFI information.

Optionally, the SPS PDSCH group to which the SPS PDSCH belongs is as same as the PDSCH group to which the dynamically scheduled PDSCH belongs; or, the PDSCH group to which the SPS PDSCH belongs is a separate SPS PDSCH group, wherein whether the respective SPS PDSCHs feeding back HARQ-ACK in the same HARQ-ACK codebook belong to a same SPS PDSCH group is determined based on configuration information or HARQ-ACK timing information in activation DCI.

Optionally, when the HARQ-ACK feedback is triggered, only SPS PDSCH group to which the SPS PDSCH belongs is triggered; or when the HARQ-ACK feedback is triggered, HARQ-ACKs for all SPS PDSCHs are triggered.

Optionally, when the UE transmits feedback information to the base station, power of a physical uplink control channel (PUCCH) used for transmitting the feedback information is determined according to a number of hybrid automatic repeat request acknowledgement (HARQ-ACK) information bits.

Optionally, the number of HARQ-ACK information bits for determining the power of the PUCCH is determined according to a predefined condition, and the predefined condition is at least one of the following conditions:

For the transport block (TB) t for the HARQ process h of one carrier c, if the UE has reported ACK previously, or if the UE has reported ACK previously and the UE has not subsequently received the PDSCH of this TB t since the feedback, then a number of HARQ-ACK bits of HARQ process h is not counted in the number of HARQ-ACK information bits for determining the power of the PUCCH;

For the transport block (TB) t for the HARQ process h of the one carrier c, if the UE has not reported the ACK previously, or if the UE receives another new PDSCH for this HARQ process h after HARQ-ACK feedback of last time, then the number of the HARQ-ACK bits of the HARQ process is counted in the number of the HARQ-ACK information bits for determining the power of the PUCCH;

For the HARQ process h of the one carrier c, if the UE has never received any transport block (TB) t, then the number of the HARQ-ACK bits of the HARQ process is not counted in the number of the HARQ-ACK information bits for determining the power of the PUCCH;

For the HARQ process h of the one carrier c, if the UE has never received any transport block (TB) t, then the number of the HARQ-ACK bits for HARQ process is counted in the number of the HARQ-ACK information bits for determining the power of the PUCCH;

For the transport block (TB) t for the HARQ process h of the one carrier c, if the UE has reported NACK, and has not received a new PDSCH for this process since the feedback, then the number of the HARQ-ACK bits for the HARQ process is not counted in the number of the HARQ-ACK information bits for determining the power of the PUCCH;

For the transport block (TB) t for the HARQ process h of the one carrier c, if the UE has reported NACK, and has not received a new PDSCH for this process since the feedback, then the number of the HARQ-ACK bits for the HARQ process is counted in the number of the HARQ-ACK information bits for determining the power of the PUCCH.

FIG. 17 illustrates a flowchart of a method performed by a UE according to an embodiment of the present application.

In operation 1710, the UE receives signals from the base station on a downlink channel. In operation 1720, the UE provides feedback information to the base station.

Downlink transmission refers to transmitting signals from a base station (BS) to a user equipment (UE). Downlink signals include data signals, control signals, and reference signals (pilots). The base station transmits downlink data in physical downlink shared channels (PDSCHs) or transmits downlink control information in downlink control channels. Uplink transmission refers to transmitting signals from the user equipment to the base station. Uplink signals include data signals, control signals, and reference signals. The user equipment transmits uplink data in physical uplink shared channels (PUSCHs), or transmits uplink control information in physical uplink control channels (PUCCHs). The base station can dynamically schedule PDSCH transmission and PUSCH transmission of the user equipment through the physical downlink control channels (PDCCHs). The uplink control information carried on the PUCCHs can be classified into various types, including hybrid automatic repeat request (HARQ) acknowledgement information (HARQ-ACK), channel state indication (CSI) information, and scheduling requests (SRs).

FIG. 18 illustrates an example diagram of communication between a base station and a UE in a communication system supporting hybrid automatic repeat. In step 1810, a transmitting node such as a base station transmits signals, such as one transport block (TB), to the UE in PDSCH. In 1820, the UE transmits HARQ-ACK information of the PDSCH to the base station. In 1830, the base station determines to schedule new resources according to the received HARQ-ACK information to retransmit this TB or to transmit a new TB.

If in 1820, the base station does not successfully receive the HARQ-ACK information, the base station cannot determine whether the UE has correctly received the TB, and thus cannot make a proper scheduling decision. In order to reduce the impact of HARQ-ACK information reception failure on scheduling, it is necessary to support HARQ-ACK retransmission mechanism. For example, the base station may trigger the UE to retransmit the HARQ-ACK that the base station has not successfully received. According to one implementation, the base station can trigger the UE to feedback HARQ-ACKs for all HARQ processes. According to another implementation, the base station may trigger the UE to feedback HARQ-ACK feedback for one or more PDSCH groups. In addition, for services with different performance requirements, such as eMBB and URLLC, requirements for HARQ-ACK feedback are also different. One can configure multiple sets of HARQ-ACK feedback parameters, such as HARQ-ACK codebook indexes, HARQ-ACK codebook priorities, HARQ-ACK codebook types, HARQ-ACK timing, resources for feeding back HARQ-ACK and so on to meet different performance requirements.

FIG. 19 illustrates a flowchart of determining resources for transmitting an HARQ-ACK by a UE according to an embodiment of the present application.

In step 1910, the UE receives HARQ-ACK feedback parameters from the base station. In step 1920, the UE determines resources for transmitting the HARQ-ACK based on the received HARQ-ACK feedback parameters.

In one embodiment, HARQ-ACK feedback parameters are indicated by the base station when the base station triggers the UE to feedback an HARQ-ACK for a HARQ process, or indicated by the base station when the base station configures the PDSCH transmission, for example, the base station configures the HARQ-ACK feedback parameters while configuring semi-persistently transmitting SPS PDSCH information. The HARQ-ACK feedback parameters at least include HARQ-ACK codebook information, for example, an HARQ-ACK codebook index, or a priority corresponding to the HARQ-ACK codebook. The HARQ-ACK feedback parameters also include an HARQ-ACK codebook type. The HARQ-ACK codebook type includes at least one of the following codebooks: a semi-persistent codebook, such as Type-1 codebook defined in TS 38.213; and a dynamic codebook, such as Type-2 codebook defined in TS 38.213; a codebook based on all HARQ processes, for example, Type-3 codebook defined in TS 38.213; a dynamic codebook based on a PDSCH group, for example, Type-2 codebook defined in TS 38.213 which is based on the PDSCH group. The HARQ-ACK feedback parameters may also include PUCCH resource configuration, a coding rate offset value offset when the HARQ-ACK is fed back on the PUSCH, and configuration based on TB or CBG transmission.

In one embodiment, all HARQ processes in the codebook based on all HARQ processes are a total number of HARQ processes configured by the base station.

In another embodiment, all HARQ processes for the codebook based on all HARQ processes correspond to a total number of HARQ processes of one HARQ-ACK codebook or priority configured by the base station. For example, the base station configures two HARQ-ACK codebooks, and HARQ processes of each HARQ codebook are configured separately. For example, HARQ-ACK codebook 0 configures with HARQ processes 1 and 2, and HARQ-ACK codebook 1 configures HARQ process 3~7. When the base station triggers an HARQ-ACK based on all HARQ processes, if HARQ-ACK codebook information is indicated, for example, HARQ-ACK codebook 0, then the UE feeds back HARQ-ACKs for all the HARQ processes of this HARQ-ACK codebook, that is, the all HARQ processes are HARQ processes 1 and 2.

In one embodiment, for the all HARQ-process-based feedback, the HARQ-ACK parameters used in the feeding back HARQ-ACKs for all HARQ processes are determined according to at least one of the following ways:
 (1) A set of HARQ-ACK parameters are predefined, for example, HARQ-ACK parameters of low priority, and for example, HARQ-ACK parameters with priority index or HARQ-ACK codebook index of 0.
 (2) The base station is configured with a set of HARQ-ACK parameters.
 (3) The base station configures one or more sets of HARQ-ACK parameters, and determines a set of HARQ-ACK parameters according to the PDCCH that triggers all HARQ processes.

When scheduling transmission of one HARQ process, a transmitting node can indicate which set of HARQ-ACK feedback parameters is used for this HARQ process through scheduling signaling DCI, for example, by indicating through a bit field in the DCI, or by indicating through DCI format (for example, the base station configures the DCI format that the UE needs to monitor, and configures HARQ-ACK feedback parameters corresponding to this DCI format, or the corresponding relationship between the DCI format and the HARQ-ACK feedback parameters are predefined by the standards). Or, when configuring transmission of one HARQ process, the transmitting node configures which set of HARQ-ACK feedback parameters is used for this HARQ process. For example, when the base station configures the SPS PDSCH parameters, it configures which set of HARQ-ACK feedback parameters is used of respective HARQ process of this SPS PDSCH.

According to one implementation of the present invention, when the UE receives the indication that the base station triggers the UE to feedback HARQ-ACKs for HARQ processes, the UE determines HARQ-ACK parameters of HARQ-ACKs for HARQ processes to be fed back, and only feeds back the HARQ-ACKs for the HARQ processes meeting the condition, where the method for the UE to determine the HARQ-ACK parameters of the HARQ-ACKs for the HARQ processes to be fed back has been described above, and will not be repeatedly described here. The conditions to be met include, for example, that HARQ-ACK parameters corresponding to this HARQ process are as same as HARQ-ACK parameters of the HARQ-ACKs for HARQ processes to be fed back, for example, the HARQ-ACK parameters corresponding to this HARQ process are as same as HARQ-ACK parameters indicated by DCI which triggers the HARQ-ACK feedback; or the HARQ-ACK parameters corresponding to this HARQ process are as same as the parameters configured by the base station to feedback HARQ-ACKs for all HARQ processes.

According to one implementation, the UE determines the size of the HARQ-ACK feedback according to the number of all HARQ processes, and feeds back valid HARQ-ACKs only for the HARQ processes meeting the condition, and returns a default HARQ-ACK value for the HARQ process failing to meet the condition. According to another implementation, the UE determines the size of the HARQ-ACK feedback based only on the number of HARQ processes meeting the condition, and feeds back valid HARQ-ACKs based on the determined size of the HARQ-ACK feedback for these HARQ process meeting the condition.

A PDCCH triggering HARQ-ACK feedback may be a PDCCH scheduling PDSCH. The PDCCH triggering HARQ-ACK feedback may be a PDCCH scheduling PUSCH. A PDCCH dedicated to triggering HARQ-ACK feedback may be UE-specific, that is, only triggers HARQ-ACK feedback for one UE, or may be shared by a UE group, that is, may trigger HARQ-ACK feedback for a group of UEs. As the PDCCH triggering HARQ-ACK feedback varies, the method of determining HARQ-ACK parameters used in feeding back the HARQ-ACKs may vary.

The HARQ-ACK parameters used when the UE feeds back the HARQ-ACKs can be determined in at least one of the following ways:
 (1) Determined through the priority parameters of the PDSCH scheduled by the PDCCH triggering HARQ-ACK feedback,
 (2) Determined through the HARQ-ACK priority or HARQ-ACK codebook information of the PDSCH scheduled by the PDCCH triggering HARQ-ACK feedback,
 (3) Determined through the priority parameters of the PUSCH scheduled by PDCCH triggering HARQ-ACK feedback,
 (4) Determined through HARQ-ACK parameters indicated by the PDCCH when triggering HARQ-ACK feedback.

The base station may configure a bit field used to indicate HARQ-ACK parameters in the PDCCH. For example, the base station includes the bit field indicating HARQ-ACK parameters in the PDCCH by way of configuration through higher layer signaling. If the base station does not configure the bit field, or the base station configures that the PDCCH does not include the bit field, then HARQ-ACK parameters used in HARQ-ACK feedback triggered by this PDCCH are determined according to predefined rules. For example, the predefined rules are: if priority information of the scheduled PDSCH or PUSCH is included in the same PDCCH, then the HARQ-ACK parameters used in the HARQ-ACK feedback are determined according to the priority information, that is, according to any of (1) to (3). Or, the base station configures the HARQ-ACK parameters used in HARQ-ACK feedback triggered by the PDCCH. For different PDCCHs, different predefined rules may be used. For example, if the PDCCH triggering HARQ-ACK feedback is a PDCCH scheduling PDSCH, then determination is made according to (1) or (2), and if the PDCCH triggering HARQ-ACK feedback is a PDCCH dedicated to triggering HARQ-ACK, determination is made according to HARQ-ACK parameters configured by the base station for use in the HARQ-ACK feedback triggered by the PDCCH.

If the PDCCH triggering HARQ-ACK feedback is common to a UE group, for each UE, an HARQ-ACK codebook index or HARQ-ACK parameters are indicated respectively, or one HARQ-ACK codebook index or HARQ-ACK parameters applicable to each UE in this group are indicated. According to one implementation, the HARQ-ACK parameters used for feeding back HARQ-ACKs for HARQ processes are determined according to a predefined set of parameters or a set of parameters configured by the base station.

According to one implementation, the base station configures feedback based on TB or CBG for each HARQ-ACK codebook or priority. This configuration is the same for multiple HARQ-ACK feedback methods. For example, for a carrier, the base station configures the codebook 0 of the two HARQ-ACK codebooks corresponding to this carrier with CBG-based transmission and the codebook 1 of the two HARQ-ACK codebooks with TB-based transmission, through higher layer signaling RRC parameters PDSCH-ServingCellConfig. If the base station indicates the UE to feedback based on all HARQ processes, if the indicated HARQ-ACK codebook is codebook 0, then the HARQ-ACK for each HARQ process of this carrier is fed back based on CBG, and if the indicated HARQ-ACK codebook is codebook 1, then the HARQ-ACK for each HARQ process of this carrier is fed back based on TB.

According to another implementation, the base station may configure feedback based on TB or CBG for each HARQ-ACK codebook or priority respectively in all-HARQ-process-based feedback, and may configure feedback based on TB or CBG for each HARQ-ACK codebook or priority respectively in feedback based on another form. For example, for a carrier, the base station configures one of the two HARQ-ACK codebooks corresponding to this carrier with CBG-based transmission and the other with TB-based transmission, through the higher layer signaling RRC parameters PDSCH-ServingCellConfig. In addition, the base station configures both of the two HARQ-ACK codebooks with TB-based transmission, when it configures all-HARQ-process-based feedback through higher layer signaling RRC parameters pdsch-HARQ-ACK-OneShotFeedbackCBG-r16. If the base station indicates the UE to feedback based on all HARQ processes, no matter whether a codebook of a carrier is configured with TB-based or CBG-based transmission in PDSCH-ServingCellConfig for this carrier, the UE feeds back based on TB. If the base station indicates the UE to feedback based on semi-persistent codebook Type-1 or dynamic codebook Type-2, the UE determines that this HARQ-ACK codebook is to be fed back based on CBG or TB, according to the HARQ-ACK codebook to which the HARQ-ACK to be fed back belongs and configuration in PDSCH-ServingCellConfig.

For HARQ-process-based feedback, if it is not configured whether an HARQ-ACK codebook or priority is fed back based on TB or CBG, then it is fed back according to a predefined method, for example, based on TB. According to one implementation, for a specific HARQ-ACK codebook, it can be determined whether each HARQ process is fed back based on TB or CBG, based on predefined rules. For example, for an HARQ-ACK codebook corresponding to high priority, each HARQ process is fed back based on TB. For an HARQ-ACK codebook corresponding to low priority, it is determined whether each HARQ process is fed back based on TB or CBG according to the configuration of the base station.

For example, in a same PUCCH or PUSCH, only HARQ-ACKs of a same priority can be transmitted, therefore, HARQ-ACK feedback parameters can be determined and HARQ processes meeting the condition can be determined, by the priority of the PDSCH or PUSCH scheduled by PDCCH triggering HARQ-ACK feedback. For example, the base station schedules PDSCH 1 through PDCCH 1, and indicates that HARQ-ACK codebook index is 0. The base station triggers the UE to feedback ARQ-ACKs for all HARQ processes. Assuming that a total number of HARQ process is 16, where the HARQ-ACK codebook index corresponding to HARQ processes 1~8 is 1, and the HARQ-ACK codebook index corresponding to HARQ processes 9~16 is 0. The size of the HARQ-ACK codebooks is 16 bits, corresponding to 16 HARQ processes. The UE may determine the HARQ-ACK values for these processes according to the decoding results of the PDSCH for HARQ processes 9~16, and the HARQ-ACK values for HARQ processes 1~8 are default values, such as NACKs. In addition, the UE feeds back HARQ-ACK according to HARQ-ACK parameters whose HARQ-ACK codebook index is 0. For example, the PUCCH resource for HARQ-ACK feedback are determined according to HARQ-ACK parameters whose HARQ-ACK codebook index is 0.

For another example, if the priority of the scheduled PUSCH is priority 1, then HARQ-ACK codebook is the codebook corresponding to priority 1. The UE feeds back 16 bits, where the UE determines the HARQ-ACK values of these processes according to the decoding results of the PDSCH for HARQ processes 1-8, and the HARQ-ACK values for HARQ processes 9~16 are the default values, such as NACKs. In addition, the UE feeds back HARQ-ACK according to HARQ-ACK parameters with an HARQ-ACK codebook index of 1/PUSCH priority of 1.

For another example, the priority of the scheduled PDSCH is priority 0, and the priority of the HARQ-ACK codebook indicated by the PDCCH is 1. The UE feeds back 16 bits, where the UE determines the HARQ-ACK values for these processes according to the decoding results of the PDSCH for HARQ processes 1-8, and the HARQ-ACK values for HARQ processes 9~16 are the default values, such as NACKs. In addition, the UE feeds back HARQ-ACK according to HARQ-ACK parameters with an HARQ-ACK codebook index of 1.

According to another implementation of the present invention, when the UE receives the indication that the base station triggers the UE to feedback the HARQ-ACKs for HARQ processes, the UE feeds back HARQ-ACKs for all HARQ processes, and these HARQ processes may correspond to the same or different priorities, or correspond to the same or different HARQ-ACK codebook indexes. For each HARQ process, the UE feeds back a valid HARQ-ACK value.

Similarly, a PDCCH triggering HARQ-ACK feedback may be a PDCCH scheduling PDSCH, or a PDCCH scheduling PUSCH, or a PDCCH dedicated to triggering HARQ-ACK feedback. As the PDCCH triggering HARQ-ACK feedback varies, the method of determining HARQ-ACK parameters used in feeding back HARQ-ACKs may vary. The specific method of determining HARQ-ACK parameters used in feeding back HARQ-ACKs has been described in detail above, and will not be repeatedly described here. In addition, the UE may determine the HARQ-ACK parameters used in feeding back HARQ-ACKs according to the parameters corresponding to the highest priority HARQ-ACK codebook of all HARQ processes, or the parameters corresponding to the lowest priority HARQ-ACK codebook.

For example, the base station schedules PDSCH 1 through PDCCH 1, and indicates that the HARQ-ACK codebook index is 0. The base station triggers the UE to feedback HARQ-ACKs for all HARQ processes. Assuming that the total number of HARQ process is 16, where the HARQ-ACK codebook index corresponding to HARQ processes 1~8 is 1, and the HARQ-ACK codebook index corresponding to HARQ processes 9~16 is 0. The size of HARQ-ACK codebook is 16 bits, corresponding to 16 HARQ processes, and the UE can determine the value of HARQ-ACK for each process according to the decoding results of the PDSCH for each process. The UE determines the PUCCH resources for HARQ-ACK feedback and so on according to HARQ-ACK parameters corresponding to HARQ-ACK codebook index 0. For another example, if HARQ-ACK codebook 0 is a codebook configured with TB-based transmission, no matter whether an HARQ-ACK codebook corresponding to each HARQ process is transmitted based on TB or CBG, each process feeds back HARQ-ACK with TB as the granularity.

For another example, the base station triggers the UE to feedback HARQ-ACK in the PUSCH, and HARQ-ACK feedback parameters should be determined according to the parameters corresponding to the HARQ-ACK with the highest priority among the HARQ-ACKs to be fed back. For example, the UE feeds back a 16-bit HARQ-ACKs on PUSCH 1, corresponding to the decoding results of the PDSCH of 16 HARQ process. A part of the HARQ processes corresponds to codebook 0, and another part of the HARQ processes corresponds to codebook 1, where the priority of codebook 1 is higher than that of codebook 2. Assuming that codebook 0 corresponds to $\beta$_offset set 1, and codebook 1 corresponds to $\beta$_offset set 2, then it is determined that one $\beta$_offset in $\beta$_offset set 2 is used to determine the modulation and coding rate of HARQ-ACKs on the PUSCH, according to the $\beta$_offset set 2 of codebook 1 and a $\beta$_offset index indicated in the PDCCH scheduling the PUSCH.

For another example, the base station schedules PDSCH 1 through PDCCH 1, indicates that the priority number of PDSCH 1 is 0, and the priority of the HARQ-ACK codebook indicated by PDCCH 1 is 1. The base station triggers the UE to feedback HARQ-ACKs for all HARQ processes. Assuming that the total number of HARQ processes is 16, where the HARQ-ACK codebook index corresponding to HARQ processes 1~8 is 1, and the HARQ-ACK codebook index corresponding to HARQ processes 9~16 is 0. The size of HARQ-ACK codebook is 16 bits, corresponding to 16 HARQ processes, and the UE can determine the value of HARQ-ACK for each process according to the decoding results of the PDSCH for each process. The UE determines the PUCCH resources for HARQ-ACK feedback and so on according to HARQ-ACK parameters corresponding to HARQ-ACK codebook index 1. For another example, if HARQ-ACK codebook 1 is a codebook transmitted based on TB, no matter whether an HARQ-ACK codebook corresponding to each HARQ process is transmitted based on TB or CBG, each process feeds back HARQ-ACK with TB as the granularity.

For another example, the base station configures HARQ-ACK parameters fed back based on all HARQ processes as HARQ-ACK parameters with priority 0. The base station schedules PDSCH 1 through PDCCH 1, indicates that the priority number of PDSCH 1 is 1. The base station triggers the UE to feedback HARQ-ACKs for all HARQ processes. Assuming that the total number of HARQ processes is 16, where the HARQ-ACK codebook index corresponding to HARQ processes 1~8 is 1, and the HARQ-ACK codebook index corresponding to HARQ processes 9~16 is 0. The size of HARQ-ACK codebook is 16 bits, corresponding to 16 HARQ processes, and the UE can determine the value of HARQ-ACK for each process according to the decoding results of the PDSCH for each process. The UE determines the PUCCH resources for HARQ-ACK feedback and so on according to HARQ-ACK parameters corresponding to HARQ-ACK codebook index 0. For another example, if HARQ-ACK codebook 0 is a codebook transmitted based on TB, no matter whether an HARQ-ACK codebook corresponding to each HARQ process is transmitted based on TB or CBG, each process feeds back HARQ-ACK with TB as the granularity.

In the above description, the base station triggers the UE to feedback HARQ-ACKs for HARQ processes, which may be the HARQ-ACK feedback that triggers all configured HARQ processes, or the HARQ-ACK feedback that triggers the configured or pre-defined HARQ process group.

For example, the base station configures 16 HARQ process for the UE, classifies HARQ processes 1~8 as one HARQ process group 1, and classifies HARQ processes 9~16 as one HARQ process group 2, the base station can trigger one HARQ process group or multiple HARQ process groups each time.

For another example, the base station configures HARQ processes for each HARQ priority or HARQ-ACK codebook. Assuming that HARQ processes 1-3 are configured for high priority, and HARQ processes 4~8 are configured for low priority. When the base station triggers HARQ-process-based HARQ-ACK feedback, if the triggered feedback is feedback for all high-priority HARQ processes, the UE feeds back the HARQ-ACKs for HARQ processes 1-3, and if the triggered feedback is feedback for all low-priority HARQ processes, the UE feeds back HARQ-ACKs for HARQ processes 4~8.

For another example, HARQ processes to be fed back may be determined according to a bit field for HARQ process configured in the DCI to be monitored. For example, a number of HARQ processes to be fed back can be determined by a maximum number of bits in the bit field for HARQ process in each DCI to be monitored. Assuming that the downlink DCI to be monitored is DCI format 1_2, where the bit field for HARQ process is 2 bits, then the number of HARQ processes to be fed back is $2^2=4$. Or, assuming that the downlink DCIs to be monitored are DCI format 1_1 and 1_2, where the bit field for HARQ process of DCI format 1_2 is 2 bits, and the number of bits for HARQ process of DCI format 1_1 is 4, then the number of HARQ processes to be fed back is 16. If the number of HARQ processes configured by the base station is smaller than the number of HARQ processes determined based on the number of bits of DCI above, then the number of HARQ processes to be fed back is determined according to the number of HARQ processes configured by the base station. Assuming that the downlink DCIs to be monitored are DCI format 1_1 and 1_2, where the bit field for HARQ process of DCI format 1_2 is 2 bits, the number of bits for HARQ process of DCI format 1_1 is 4, the number of HARQ processes configured by the base station is 8, and the number of HARQ processes to be fed back is 8.

For another example, HARQ processes to be fed back may be determined according to a bit field for HARQ process configured in the DCI to be monitored and a DCI corresponding to priority of HARQ-ACK feedback. Assuming that the downlink DCIs to be monitored are DCI format 1_1 and 1_2, where DCI format 1_1 can only schedule PDSCH of priority 0, the number of bits for HARQ process of DCI format 1_1 is 4, and DCI format 1_2 can schedule PDSCH of priority 0 or 1, and the bit field for HARQ process of DCI format 1_2 is 2 bits. If the HARQ-ACKs to be fed back are determined based on HARQ-ACK parameters of priority 1, the HARQ processes to be fed back are determined only based on the bit field for HARQ process of DCI format1_2, that is, four HARQ processes. If the HARQ-ACKs to be fed back are determined according to HARQ-ACK parameters of priority 0, HARQ processes to be fed back are determined according to the maximum value of bit fields for HARQ process of DCI format1_2 and DCI format1_1, that is, 16 HARQ processes. Similarly, if the number of HARQ processes configured by the base station is smaller than the number of HARQ processes determined according to the above method, then the number of HARQ processes to be fed back is determined according to the number of HARQ processes configured by the base station.

The method described above can be used for any HARQ-process-based HARQ-ACK feedback.

In addition to HARQ-process-based HARQ-ACK feedback, the base station can also configure the UE to perform PDSCH-group-based HARQ-ACK feedback. When scheduling the PDSCH, the base station can dynamically indicate which PDSCH group each PDSCH belongs to through DCI, or indicate which PDSCH group this PDSCH belongs to when configuring the PDSCH. The UE can feedback the HARQ-ACKs for each PDSCH group in the group in the unit of PDSCH group.

If the base station configures multiple sets of HARQ-ACK codebooks for the UE, and at least one set of HARQ-ACK codebooks is a dynamic codebook based on PDSCH group, the base station needs to indicate both PDSCH group information and HARQ-ACK codebook information when scheduling or configuring the PDSCH. DAI (Downlink assignment indication) is only counted in the same PDSCH group of the same HARQ-ACK codebook.

According to one implementation, an HARQ-ACK codebook corresponding to each PDSCH group is determined according to predefined corresponding relationship or configuration by base station. For example, the base station configures two PDSCH groups, and configures an HARQ-ACK codebook corresponding to each PDSCH. Then, when scheduling the PDSCH, the base station indicates the PDSCH group to determine the HARQ-ACK codebook.

According to another implementation, there is no fixed corresponding relationship between an HARQ-ACK codebook and a PDSCH group. When scheduling the PDSCH, the base station indicates the PDSCH group and the HARQ-ACK codebook respectively.

According to one implementation, when the base station triggers HARQ-ACK transmission, it can only trigger HARQ-ACKs for one or more PDSCH groups of the same HARQ-ACK codebook to be fed back together, and cannot trigger HARQ-ACKs for PDSCH groups of different HARQ-ACK codebooks to be fed back together.

Similarly, a PDCCH triggering HARQ-ACK feedback may be a PDCCH scheduling PDSCH, or a PDCCH scheduling PUSCH, or a PDCCH dedicated to triggering HARQ-ACK feedback. As the PDCCH triggering HARQ-ACK feedback varies, the method of determining HARQ-ACK parameters used in feeding back HARQ-ACKs may vary. The specific method of determining HARQ-ACK parameters used in feeding back HARQ-ACKs has been described in detail above, and will not be repeatedly described here.

If a PDSCH is scheduled by a PDCCH triggering HARQ-ACK feedback, this PDCCH can only trigger HARQ-ACK feedback for one or more PDSCH groups belonging to a same HARQ-ACK codebook as that of this PDSCH.

If a PUSCH is scheduled by a PDCCH triggering HARQ-ACK feedback, this PDCCH can only trigger HARQ-ACK feedback for one or more PDSCH groups of a HARQ-ACK codebook belonging to a same priority as that of this PUSCH.

According to another implementation, the base station may trigger HARQ-ACKs for PDSCH groups of different HARQ-ACK codebooks to be fed back together. An indication triggering HARQ-ACK feedback, for example, the PDCCH triggering HARQ-ACK feedback, may include the index of the HARQ-ACK codebook triggered to feedback HARQ-ACK and index information of PDSCH groups of the triggered HARQ-ACK codebook. For example, 2 bits correspond to PDSCH group 1 and/or PDSCH group 2 of codebook 1 and/or codebook 2, respectively, or correspond to PDSCH groups (the PDSCH groups and HARQ-ACK codebooks of the PDSCH scheduled by this PDCCH) of the scheduled HARQ-ACK codebook, two PDSCH groups of the scheduled HARQ-ACK codebook (an HARQ-ACK codebook to which the PDSCH scheduled by this PDCCH belongs), one PDSCH group of the other HARQ-ACK codebook, and two PDSCH groups of the other HARQ-ACK codebook respectively. Or, the base station indicates to trigger HARQ-ACK codebook information, and according to predefined rules, determines PDSCH group information of the triggered ARQ-ACK codebook. For example, 1 bit corresponds to the scheduled HARQ-ACK codebook, or two HARQ-ACK codebooks, and the other 1 bit indicates 2 PDSCH groups in the HARQ-ACK codebook triggered to feedback or 1 PDSCH group in the HARQ-ACK codebook triggered to feedback. This PDSCH group is determined according to the scheduled PDSCH group.

In addition, an indication triggering HARQ-ACK feedback, for example, a PDCCH triggering HARQ-ACK feedback, may include respective HARQ-ACK size information of respective HARQ-ACK codebook, and/or respective NFI (New feedback Indicator) information of respective HARQ-ACK codebook. For example, the base station configures two HARQ-ACK codebooks, i.e., HARQ-ACK codebook 1 and HARQ-ACK codebook 2 corresponding to low priority and high priority. For each HARQ-ACK codebook, a maximum of 2 PDSCH groups can be included. In the PDCCH, 4 T-DAI bit fields and 4 NFI bit fields may be included, corresponding to 2 PDSCH groups of 2 HARQ-ACK codebooks respectively.

The bit fields described above are configurable.

FIG. 20 illustrates a flowchart of an example in which the UE determines HARQ-ACK feedback bits of the PDSCH according to an embodiment of the present application.

In step 2010, the UE determines a PDSCH transmission type of the serving cell. In step 2020, the UE determines the HARQ-ACK feedback bits of the PDSCH based on the PDSCH transmission type of the serving cell.

For different scenarios, the optimal choice of whether PDSCH scheduling and HARQ-ACK feedback are based on TB or CBG is different. For example, when the transport block size (TBS) is large, HARQ-ACK feedback and scheduling based on CBG which is a granularity smaller than TB is gainful. For another example, when partial transmission of one TB may be affected, for example, partial resources are occupied by other transmissions, HARQ-ACK feedback and scheduling based on CBG which is a granularity smaller than TB is also beneficial. When TBS is small, TB-based feedback and scheduling are more beneficial because DCI overhead for scheduling and overhead for HARQ-ACK feedback are both lower. CBG-based HARQ-ACK feedback needs to feedback N bits need for one TB, where N is the maximum configured number of CBGs. For TB-based HARQ-ACK feedback, only one bit needs to be fed back for one TB. The base station can configure TB-based or CBG-based scheduling and HARQ-ACK feedback for each serving cell and/or each HARQ-ACK codebook according to requirements. For the convenience of description, TB-based or CBG-based scheduling and HARQ-ACK feedback are generally referred to as TB-based or CBG-based transmission. When a serving cell and/or HARQ-ACK codebook is configured with CBG-based transmission, an HARQ-ACK codebook can be further subdivided into two subcodebooks, one of which is a CBG codebook, where N bits are fed back for each TB, and the other is a TB codebook, where 1 bit is fed back for each TB. When a serving cell and/or HARQ-ACK codebook is configured with TB-based transmission, one HARQ-ACK codebook includes only one subcodebook, that is, the TB codebook. Or, when a serving cell and/or HARQ-ACK codebook is configured with CBG-based transmission, one HARQ-ACK codebook includes only one subcodebook, which is the CBG codebook. When a serving cell and/or HARQ-ACK codebook is configured with TB-based transmission, one HARQ-ACK codebook includes only one subcodebook, that is, the TB codebook.

For each serving cell of the UE, TB-based PDSCH transmission or CBG-based PDSCH transmission is configured respectively. When the UE is configured with multiple HARQ-ACK codebooks, each HARQ-ACK codebook is configured respectively to be transmitted in a TB-based or CBG-based manner.

If a serving cell is configured with TB-based PDSCH transmission, no matter which HARQ-ACK codebook the HARQ-ACK for the PDSCH of this serving cell belongs to, the HARQ-ACK feedback bits of this PDSCH are determined according to the transmission of TBs.

If a serving cell is configured with CBG-based PDSCH transmission, the HARQ-ACK feedback bits of the PDSCH of this serving cell are determined according to the attributes (CBG-based or TB-based) configured for the HARQ-ACK codebook to which the PDSCH belongs.

For example, HARQ-ACK codebook 1 is configured with TB-based transmission and HARQ-ACK codebook 2 is configured with CBG-based transmission. Assuming that serving cell 1 is configured with TB-based transmission and serving cell 2 is configured with CBG-based transmission. The PDSCH of the serving cell 1 or 2 may dynamically belong to HARQ-ACK codebook 1 or HARQ-ACK codebook 2. When the PDSCH of serving cell 1 is indicated as HARQ-ACK codebook 2, this PDSCH belongs to a TB-based subcodebook in HARQ-ACK codebook 2, and this PDSCH generates a 1-bit HARQ-ACK per TB. When the PDSCH of serving cell 1 is indicated as HARQ-ACK codebook 1, this PDSCH belongs to HARQ-ACK codebook 1, which includes only TB-based subcodebooks, and this PDSCH generates a 1-bit HARQ-ACK per TB. When the PDSCH of serving cell 2 is indicated as HARQ-ACK codebook 2, and the PDCCH scheduling this PDSCH supports transmission of CBGs, for example, a common PDCCH DCI format 1_1, then the HARQ-ACKs for this PDSCH belong to a CBG-based subcodebook in HARQ-ACK codebook 2, this PDSCH generates an N-bit HARQ-ACK, where N is the maximum configured number of CBGs. When the PDSCH of serving cell 2 is indicated as HARQ-ACK codebook 2, and the PDCCH scheduling this PDSCH supports transmission of TBs, for example, the backhaul PDCCH DCI format 1_0, then the HARQ-ACKs for this PDSCH belong to a TB-based subcodebook in HARQ-ACK codebook 2, this PDSCH generates a 1-bit HARQ-ACK per TB. When the PDSCH of serving cell 1 is indicated as HARQ-ACK codebook 1, this PDSCH belongs to HARQ-ACK codebook 1 which includes only TB-based subcodebooks, and this PDSCH generates a 1-bit HARQ-ACK per TB.

If the UE is triggered to perform HARQ-process-based HARQ-ACK feedback, for example, triggered to feedback of HARQ-ACKs for all HARQ processes, and the UE needs to feedback HARQ-ACKs for all HARQ processes, for a serving cell configured with TB-based PDSCH transmission, each HARQ-process generates a 1-bit HARQ-ACK per TB. For a serving cell configured with CBG-based PDSCH transmission, if at least one of the HARQ-ACK codebooks configured for the UE is configured with CBG-based transmission, N bits are generated for each HARQ process. Wherein, N is the maximum configured number of CBGs.

For example, HARQ-ACK codebook 1 is configured with TB-based transmission and HARQ-ACK codebook 2 is configured with CBG-based transmission. It is assumed that serving cell 1 is configured with TB-based PDSCH transmission and serving cell 2 is configured with CBG-based PDSCH transmission. There are 16 HARQ processes in each cell. Then, when the UE simultaneously feeds back HARQ-ACKs for all HARQ processes, serving cell 1 corresponds to a 16-bit HARQ-ACK (assuming that the maximum number of TBs configured by the base station is 1), and serving cell 2 corresponds to a 16*N-bit HARQ-ACK.

FIG. 21 illustrates a flowchart of another example in which the UE determines HARQ-ACK feedback bits of the PDSCH according to an embodiment of the present application.

In step 2110, the UE determines the transmission type of HARQ-ACK codebooks of the serving cell. In step 2120, the UE determines HARQ-ACK feedback bits of the PDSCH based on the transmission type of HARQ-ACK codebooks of the serving cell.

According to another aspect of the present invention, each serving cell is configured with HARQ-ACK codebook information respectively, which includes TB-based or CBG-based transmission.

In one implementation, for a same HARQ-ACK codebook index, different serving cells may have different TB-based or CBG-based transmission configurations.

In another implementation, the HARQ-ACK codebooks configured for each serving cell may be different, but for a same HARQ-ACK codebook index, the TB-based or CBG-based transmission configuration of different serving cells must be the same. For example, serving cell 1 is configured with HARQ-ACK codebook 1 only, or is not configured with any HARQ-ACK codebook (using the default HARQ-ACK codebook index), and serving cell 2 is configured with HARQ-ACK codebook 1 and HARQ-ACK codebook 2. The configurations of HARQ-ACK codebook 1 of serving cell 1 and serving cell 2 must be the same.

If the UE is triggered to feedback HARQ-process-based HARQ-ACKs, for example, triggered to feedback HARQ-ACKs for all HARQ processes, and the UE needs to feedback HARQ-ACKs for all HARQ processes, for a serving cell which is configured with multiple codebooks and in which the TB-based or CBG-based transmissions corresponding to the multiple codebooks are different, the number of HARQ-ACK bits for each HARQ process of this serving cell is determined according to the maximum number of HARQ-ACK bits corresponding to these codebook configurations. For a serving cell configured with one codebook, or a serving cell which is configured with multiple codebooks and in which the TB-based or CBG-based transmission configurations corresponding to these codebooks are the same, the number of HARQ-ACK bits for each HARQ process is determined according to the configured TB-based or CBG-based transmission.

For example, HARQ-ACK codebook 1 is configured with TB-based transmission and HARQ-ACK codebook 2 is configured with CBG-based transmission. It is assumed that serving cell 1 is configured with HARQ-ACK codebook 1 and serving cell 2 is configured with HARQ-ACK codebook 1 and HARQ-ACK codebook 2. There are 16 HARQ processes in each cell. Then, when the UE simultaneously feeds back HARQ-ACKs for all HARQ processes, serving cell 1 corresponds to a 16-bit HARQ-ACK (assuming that the maximum number of TBs configured by the base station is 1), and serving cell 2 corresponds to a 16*N-bit HARQ-ACK.

FIG. 22 illustrates a flowchart of an HARQ-ACK for periodic semi-persistent transmission by a UE according to an embodiment of the present application.

In 2210, the UE periodically receives signals from the base station on semi-persistently configured resources. In 2220, the UE determines that an HARQ-ACK codebook includes HARQ-ACKs for SPS PDSCHs. In 2230, the UE determines HARQ-ACK feedback for the SPS PDSCHs according to the received SPS PDSCHs.

According to one implementation, in step 2220, if the UE determines that the HARQ-ACK codebook includes only the HARQ-ACKs for the SPS PDSCHs, and in 2230, if the UE does not receive any of these SPS PDSCHs, the UE may not transmit HARQ-ACKs. In 2230, if the UE receives at least one of these SPS PDSCHs, the UE needs to transmit HARQ-ACKs for all these SPS PDSCHs.

In order to save signaling overhead, semi-persistent transmission (such as SPS PDSCH or CG PUSCH) can be configured for service types with certain periodic characteristics, that is, no PDCCH scheduling is required before each PDSCH/PUSCH transmission, while periodic transmission/reception is performed on semi-persistently configured resources. For the convenience of description, each PDSCH/PUSCH transmission is referred to as a PDSCH/PUSCH transmission occasion.

In some scenarios, there may be no corresponding PDSCH/PUSCH transmission in some PDSCH/PUSCH transmission occasions. For example, in an unlicensed band, the SPS PDSCH cannot be transmitted because the base station has not successfully completed LBT. In this case, if the UE still transmits the HARQ-ACK for this PDSCH, the UE needs to perform LBT, and transmit NACK after channel occupation is successful. This transmission is useless to the base station and wastes UE power and occupies channel resources. To solve this problem, when the HARQ-ACK codebook includes only the HARQ-ACKs for the SPS PDSCHs, if the UE does not receive any of these SPS PDSCHs, the UE may not transmit the HARQ-ACKs. If the UE receives at least one of these SPS PDSCHs, the UE needs to determine the size of the HARQ-ACK codebook according to all these SPS PDSCHs. The UE may feedback valid HARQ-ACK values according to the decoding results of the received SPS PDSCHs, and the HARQ-ACKs for other unreceived SPS PDSCH are the default values.

If HARQ-ACKs for multiple SPS PDSCHs are included in the same HARQ-ACK codebook, and the UE only receives few SPS PDSCHs, the UE still needs to feedback HARQ-ACKs for all the SPS PDSCHs, and the transmission efficiency is low. According to another implementation, a small amount of downlink control information is simultaneously transmitted in the SPS PDSCHs to assist the UE in determining the number and sequence of SPS PDSCHs actually transmitted by the base station. In addition, the downlink control information can also assist in the HARQ-ACK retransmission of the SPS PDSCHs. The downlink control information and the PDSCHs are independently encoded separately. In the PDSCH resources, the downlink control information is mapped, and the PDSCH is mapped such that resources occupied by the downlink control information are avoided.

The downlink control information in the SPS PDSCHs includes DAI information. The UE determines the number and order of the HARQ-ACK bits to be fed back, based on the received DAI information. For example, according to the SPS PDSCH resources activated or configured by the base station and the HARQ-ACK timing, it is determined that one HARQ-ACK feedback includes HARQ-ACKs for 4 SPS PDSCHs, i.e., SPS PDSCHs 1, 2, 3, 4, respectively. If the base station fails to transmit SPS PDSCH 1, and successfully transmits SPS PDSCH 2, 3, 4, then the base station sets DCI of the downlink control information in these three SPS PDSCHs to 1, 2, 3, respectively. Assuming that the UE receives SPS PDSCH 2, 4 and receives DAI=1, 3, then the UE feeds back a 3-bit HARQ-ACK, where the HARQ-ACKs for the SPS PDSCHs with DAI=1, 3 are determined according to the decoding results, and the UE generates a 1-bit NACK to be arranged at the location of DAI=2. DAI may be counted only for SPS PDSCHs, or DAI may be jointly counted for SPS PDSCHs and dynamic PDSCHs.

The downlink control information in the SPS PDSCHs may include PDSCH group information. In addition to determining the HARQ-ACK feedback according to the HARQ-ACK timing information in the configuration information or activating DCI, the UE can also determine the resources for the HARQ-ACK feedback according to whether there are other DCIs triggering the PDSCH group information. If the downlink control information does not include the PDSCH group information, the PDSCH group information is determined according to predefined rules, or the configuration information of the SPS PDSCHs, or the DCIs that activates the SPS PDSCHs.

The PDSCH group to which the SPS PDSCHs belong may be the same as the SPS PDSCH group of the dynamically scheduled PDSCHs. Or, the SPS PDSCH group to which the SPS PDSCHs belong is a separate PDSCH group.

According to the HARQ-ACK timing information in the configuration information or activating DCI, it is determined that the respective SPS PDSCHs feeding back HARQ-ACKs in the same HARQ-ACK codebook belong to the same SPS PDSCH group. According to the HARQ-ACK timing information in the configuration information or activating DCI, it is determined that the respective SPS PDSCHs feeding back HARQ-ACKs in different HARQ-ACK codebooks may belong to the same SPS PDSCH group or may belong to different SPS PDSCH groups.

When HARQ-ACK feedback is triggered, it is possible only to trigger the SPS PDSCH group to which the SPS PDSCHs belong. Alternatively, when HARQ-ACK feedback is triggered, it is possible only to trigger HARQ-ACKs for all SPS PDSCHs.

If the HARQ-ACK triggering signaling is within a period of SPS PDSCH configuration, the UE feeds back the HARQ-ACK for the SPS PDSCHs located at a location at least a length of time Td before the triggering signaling within this period.

FIG. 23 illustrates an example in which the UE feeds back HARQ-ACKs according to an embodiment of the present application.

As shown in FIG. 23, the base station configures 2 SPS PDSCH configurations for the UE. SPS PDSCH ⅓ in FIG. 23 belongs to SPS PDSCH configuration 1, and SPS PDSCH0/2/4 in FIG. 23 belongs to SPS PDSCH configuration 2. Assuming that the UE receives PDCCH 1 to trigger HARQ-ACK feedback for all SPS PDSCHs, assuming that the time difference between SPS PDSCH 2 and PDCCH 1 is smaller than Td, but the time difference between SPS PDSCH 1 and PDCCH 1 is greater than or equal to Td, then the UE feeds back the HARQ-ACK for SPS PDSCH 1. If the time difference between SPS PDSCH 2 and PDCCH 1 is also greater than or equal to Td, then the UE feeds back the HARQ-ACKs for SPS PDSCH 1 and 2.

Or, the UE feeds back the HARQ-ACKs for the SPS PDSCHs in this period. If the SPS PDSCH is located at least Td before the triggering signaling, then valid HARQ-ACKs are fed back, otherwise the default values are fed back. Then, in FIG. 23, the UE feeds back the HARQ-ACKs for SPS PDSCH 1 and SPS PDSCH 2, but the HARQ-ACK for SPS PDSCH 2 is NACK.

Or if the SPS PDSCHs in the same period are not located at least Td before the triggering signaling, the HARQ-ACKs for the SPS PDSCHs in the previous period are fed back. Then, in FIG. 23, the UE feeds back the HARQ-ACKs for SPS PDSCH 1 and SPS PDSCH0.

Preferably, Td is configured by the base station or determined according to a processing delay.

Generally, the valid time of HARQ-ACK is fixed. After this valid time lapses, the HARQ-ACK received by the base station has little help in scheduling. Assuming that the period of a SPS PDSCH is Ts, and the number of HARQ processes of the SPS PDSCH is Ns, if SPS PDSCH 1 is within the time window W1, the start point of which is the start point of SPS PDSCH 1, and the length of which is Ts*Ns, then the UE no longer feeds back the HARQ-ACK for this SPS PDSCH after Tw after W1 window. Generally, after the W1 window, the SPS PDSCH of the same HARQ process is a new TB.

FIGS. 24 and 25 illustrate further examples in which the UE feeds back HARQ-ACKs according to an embodiment of the present application.

Preferably, Tw is configured by the base station, or Tw is a time delay from SPS PDSCH to HARQ-ACK feedback, as shown in FIG. 24. Or it is determined according to the processing delay of preparing the PDSCH, as shown in FIG. 25. The value of Tw is negative or positive.

The downlink control information in the SPS PDSCH may include NFI indication information. The UE determines whether to retransmit the HARQ-ACKs for the previous SPS PDSCHs according to the NFI information. For example, if the received NFI state is flipped, the HARQ-ACKs for the SPS PDSCHs previously fed back of the same PDSCH group are no longer transmitted.

In some scenarios, the UE determines a time unit of HARQ-ACK feedback according to the time resources of the PDSCH and HARQ-ACK feedback timing. For example, if a PDCCH schedules PDSCH reception, according to the time unit where the end symbol of the PDSCH is located (for example, the end symbol of the PDSCH is located in the uplink slot n) and the HARQ-ACK feedback timing k, the time unit for feeding back the HARQ-ACK is determined, for example, the uplink slot n+k. In other scenarios, the UE determines the time unit of HARQ-ACK feedback according to the time resources of the PDCCH and the HARQ-ACK feedback timing. For example, if a PDCCH only triggers HARQ-ACK feedback and does not schedule any PDSCH or PUSCH, the time unit of HARQ-ACK feedback may be determined according to the time unit where the end symbol of the PDCCH is located and the HARQ-ACK feedback timing. For example, the PDCCH triggers HARQ-ACK feedback for all HARQ processes, the end symbol of the PDCCH is located in the uplink slot n1, then HARQ-ACKs for all HARQ processes are transmitted in the uplink slot n1+k. Alternatively, it may be determined according to the reference time resources indicated by the PDCCH. For example, although the PDCCH does not schedule the PDSCH, the time resource indication bit field TDRA in the PDCCH may indicate that the slot n where the end symbol of the time resources referenced in order to determine the HARQ-ACK time unit of the PDCCH is located is determined. Assuming that TDRA indicates the start point of the time resource, symbol 2, and a length of 6, then the end symbol of the referenced time resources is symbol 7, which is located in the uplink slot n2, and the time unit of HARQ-ACK feedback is n2+k.

When the UE transmits HARQ-ACKs, it is also necessary to determine the power of the PUCCH used for transmitting the HARQ-ACKS. In order to determine the power of PUCCH, it is necessary to determine number of HARQ-ACK information bits nHARQ-ACK which counts the power of the PUCCH. For example, when the bits of the uplink control information (UCI) carried by the PUCCH≤11, the nHARQ-ACK is determined only according to the HARQ-ACKs that meet predefined conditions in order to calculate the power of the PUCCH, which can improve transmission efficiency.

The predefined conditions are at least one of the following conditions:

Condition 1: for a transport block (TB) t for an HARQ process h of one carrier c, if the UE has fed back an ACK previously, or if the UE has fed back the ACK previously and the UE has not received the PDSCH of this TB t since the feedback, then a number of HARQ-ACK bits of HARQ process h is not counted in nHARQ-ACK;

For the transport block (TB) t for the HARQ process h of one carrier c, if the UE has fed back the ACK previously, then the UE sets the HARQ-ACK for this HARQ process h as the default value, for example, NACK. Or, if the UE has fed back the ACK previously, and the UE has not received the PDSCH of this TB t since the feedback, then the UE sets the HARQ-ACK for this HARQ process h as the default value, such as NACK. Such HARQ-ACK feedback is called invalid HARQ-ACK, and a number of HARQ-ACK bits of this HARQ process is not counted in nHARQ-ACK.

Condition 2: For the transport block (TB) t for the HARQ process h of one carrier c, if the UE has not fed back the ACK previously, then the number of HARQ-ACK bits for this HARQ process is counted in nHARQ-ACK. Or, if the UE receives other PDSCHs (carrying transport block (TB) t) of this HARQ process h after the last HARQ-ACK feedback, then the HARQ-ACK bits for this HARQ process is counted in nHARQ-ACK.

For the transport block (TB) t for the HARQ process h of one carrier c, if the UE has not fed back the ACK before, the UE generates a valid HARQ-ACK according to the decoding results of transport block (TB) t received recently. Then, the number of HARQ-ACK bits for this HARQ process is counted in nHARQ-ACK. Or, if the UE receives the other PDSCHs (carrying transport block (TB) t) of this HARQ process h after the last HARQ-ACK feedback, the UE generates a valid HARQ-ACK according to the decoding results of the transport block (TB) t recently received. Then, the number of HARQ-ACK bits for this HARQ process is counted in nHARQ-ACK.

FIG. 26 illustrates a further example in which the UE feeds back HARQ-ACKs according to an embodiment of the present application. In the schematic example illustrated in FIG. 26, assuming a total of 4 HARQ processes, the UE correctly receives PDSCHs 1-3, and the UE feeds back HARQ-ACKs for HARQ process 1-3 in PUCCH 1, all of which are ACKs. The UE is triggered to feedback HARQ-ACKs for all HARQ processes in PUCCH 2. For the HARQ-ACKs fed back in PUCCH 2, the UE generates HARQ-ACK bits for HARQ processes 4, 1, 2, respectively according to the decoding results of PDSCHs 4, 5, 6, and the HARQ-ACK bits for these three processes are valid HARQ-ACK bits. For HARQ process 3, since the UE has feedback an ACK in PUCCH 1, and the UE has not received the PDSCH for HARQ process 3 after PUCCH 1, in the HARQ-ACKs fed back in PUCCH 2, the UE generates the default value NACK for HARQ process 3, wherein this HARQ-ACK bit is an invalid HARQ-ACK bits. Then, in PUCCH 2, the UE feeds back a 4-bit HARQ-ACK, and nHARQ-ACK used to calculate power of PUCCH 2 is 3 bits.

Condition 3: for the HARQ process h of one carrier c, if the UE has not received any transport block (TB) t, then the number of HARQ-ACK bits of this HARQ process is not counted in nHARQ-ACK.

For the HARQ process h of one carrier c, if the UE has not received any transport block (TB) t, the UE feeds back the NACK, and the HARQ-ACK bits for this HARQ process are invalid HARQ-ACK bits. The number of HARQ-ACK bits for this HARQ process is not counted in nHARQ-ACK.

Condition 4: For the HARQ process h of one carrier c, if the UE has not received any transport block (TB) t, the number of HARQ-ACK bits for this HARQ process is counted in nHARQ-ACK.

For the HARQ process h of one carrier c, if the UE has not received any transport block (TB) t, the UE feeds back the NACK, and the HARQ-ACK bits of this HARQ process are valid HARQ-ACK bits. The number of HARQ-ACK bits for this HARQ process is counted in nHARQ-ACK.

Condition 5: For the transport block (TB) t for the HARQ process h of one carrier c, if the UE has fed back the NACK, and has not received the PDSCH for this process since the feedback, then the number of HARQ-ACK bits for this HARQ process is not counted in nHARQ-ACK.

For the transport block (TB) t for the HARQ process h of one carrier c, if the UE has fed back the NACK, and the UE has not received the PDSCH for this process since the feedback, the UE feeds back the NACK, and the HARQ-ACK bits for this HARQ process are invalid HARQ-ACK bits. The number of HARQ-ACK bits for this HARQ process is not counted in nHARQ-ACK.

Condition 6: For the transport block (TB) t for the HARQ process h of one carrier c, if the UE has fed back the NACK, and has not received the PDSCH for this process since the feedback, the number of HARQ-ACK bits for this HARQ process is counted in nHARQ-ACK.

For the transport block (TB) t for the HARQ process h of one carrier c, if the UE has fed back the NACK, and has not received the PDSCH for this process since the feedback, the UE feeds back the NACK, and the HARQ-ACK bits for this HARQ process are valid HARQ-ACK bits. The number of HARQ-ACK bits for this HARQ process is counted in nHARQ-ACK.

Condition 7: For the HARQ process h of one carrier c, if the base station can schedule a maximum of $M_0$ transport blocks, $M_0 > 1$, and the UE receives the PDSCHs of $M_1$ transport blocks of the HARQ process h, $M_1 \leq M_0$, then the number of HARQ-ACK bits and NDI bits of the $M_0$ PDSCHs is counted in nHARQ-ACK, and the number of HARQ-ACK bits and NDI bits of $(M_0 - M_1)$ PDSCHs is not counted in nHARQ-ACK.

For the transport block (TB) t for the HARQ process h of one carrier c, if the UE has never received any transport block (TB) t, the number of HARQ-ACK bits and the number of NDI bits of the transport block (TB) t for the HARQ process are not counted in the number of HARQ-ACK information bits for determining the power of the PUCCH.

For example, the base station configures that the UE needs to feedback the HARQ-ACKs and NDIs for respective HARQ process from among the HARQ-ACKs fed back based on HARQ process. And the base station configures that one DCI can schedule up to 2 transport blocks (TBs). Assuming a total of 2 HARQ processes, for each HARQ process UE needs to feedback 4 bits, that is, a 1-bit HARQ-ACK and a 1-bit NDI for each TB, so the UE needs to feedback 8 bits in total. Assuming that the UE receives 2 TBs of HARQ process 1 and 1 TB of HARQ process 2. Then, the UE feed s back a 4-bit HARQ-ACK and a 4-bit NDI, and nHARQ-ACK used to calculate the power of the PUCCH is 6 bits (4 bits for HARQ process 1 and 2 bits for HARQ process 2).

Optionally, for the HARQ process h, regardless of whether the UE has fed back the HARQ-ACK before, the UE determines whether the number of HARQ-ACK bits and the number of NDI bits for each transport block for the HARQ process h are counted in nHARQ-ACK, according to the last received PDSCH.

Optionally, for the HARQ process h, the UE has fed back the HARQ-ACK previously, and has not received the PDSCH for this process since the feedback, the number of HARQ-ACK bits and the number of NDI bits for this HARQ process are not counted in nHARQ-ACK.

Optionally, the above conditions can be used in combination. For example, according to the combination of conditions 1, 2, 3, and 5, the method for determining the number of HARQ-ACK bits used to calculate the power of the PUCCH is: for the HARQ process h of one carrier c, if the UE has fed back the HARQ-ACK for the HARQ process h previously, and then receives the PDSCH for this process again, then the UE feeds back the HARQ-ACK according to the received PDSCH, and the HARQ-ACK bits for this HARQ process are valid HARQ-ACK bits, and the number of HARQ-ACK bits for this HARQ process is counted in nHARQ-ACK. For the HARQ process h of one carrier c, if the UE has fed back the HARQ-ACK for the HARQ process h previously, and then has not received the PDSCH for this process again, then the UE feeds back the NACK, and the HARQ-ACK bits for this HARQ process are invalid HARQ-ACK bits, and the number of HARQ-ACK bits for this HARQ process is not counted in nHARQ-ACK. For the HARQ process h of one carrier c, if the UE has never fed back HARQ-ACK for the HARQ process previously, and has not received the PDSCH for this process, then the UE feeds back the NACK, and the HARQ-ACK bits for this HARQ process are invalid HARQ-ACK bits, and the number of HARQ-ACK bits for this HARQ process is not counted in nHARQ-ACK.

In a variation of the example of FIG. 26, for example, assuming that the UE correctly receives PDSCHs 1, 2 and the UE receives PDSCH 3 but does not demodulate it correctly, then the UE feeds back HARQ-ACKs for HARQ processes 1-3 in PUCCH 1, i.e., ACK, ACK, NACK respectively. The UE is triggered to feedback HARQ-ACKs for all HARQ processes in PUCCH 2. For the HARQ-ACKs fed back in PUCCH 2, the UE generates HARQ-ACK bits for HARQ processes 4, 1, 2, respectively according to the decoding results of PDSCHs 4, 5, 6, and the HARQ-ACK bits for these three processes are valid HARQ-ACK bits. For HARQ process 3, since the UE has not received the PDSCH for this process after PUCCH 1 feedback, for the HARQ-ACKs fed back in PUCCH 2, the UE generates an NACK for HARQ process 3, and this HARQ-ACK bit is an invalid HARQ-ACK bit. Then, in PUCCH 2, the UE feeds back a 4-bit HARQ-ACK, and $n_{HARQ}$-ACK used to calculate the power of PUCCH 2 power is 3 bits.

FIG. 27 illustrates a further example in which the UE feeds back HARQ-ACKs according to an embodiment of the present application. In the example of FIG. 27, it is assumed that there are a total of 4 HARQ processes, the UE correctly receives PDSCH 1,2, and the UE feeds back HARQ-ACKs for HARQ processes 1-2 in PUCCH 1, all of which are ACKs. The UE is triggered to feedback HARQ-ACKs for all HARQ processes in PUCCH 2. For the HARQ-ACKs fed back in PUCCH 2, the UE generates HARQ-ACK bits for HARQ processes 4, 1, 2, respectively according to the decoding results of PDSCHs 4, 5, 6, and the HARQ-ACK bits for these three processes are valid HARQ-ACK bits. For HARQ process 3, since the UE has never received the PDSCH for this HARQ process, for the HARQ-ACKs fed back in PUCCH 2, the UE generates an NACK for HARQ process 3, and this HARQ-ACK bit is an invalid HARQ-ACK bit. Then, in PUCCH 2, the UE feeds back a 4-bit HARQ-ACK, and the nHARQ-ACK used to calculate the power of PUCCH 2 is 3 bits.

FIG. 28 illustrates a further example in which the UE feeds back HARQ-ACKs according to an embodiment of the present application. In the example of FIG. 28, it is assumed that there are a total of 4 HARQ processes, the UE receives PDSCH 1, but does not demodulate it correctly, correctly receives PDSCH 2, and does not receive PDSCH 3, the UE feeds back HARQ-ACKs for HARQ processes 1-2 in PUCCH 1, i.e., NACK and ACK respectively. Subsequently, the UE receives PDSCH 4 and PDSCH 6, but does not receive PDSCH 5, and the UE is triggered to feedback HARQ-ACKs for all HARQ processes in PUCCH 2. For the HARQ-ACKs fed back in PUCCH 2, the UE generates HARQ-ACK bits for HARQ processes 4, 2 according to the decoding results of PDSCHs 4, 6 respectively. The HARQ-ACK bits for these two processes are valid HARQ-ACK bits. For HARQ process 3, since the UE has never received the PDSCH for this HARQ process, for the HARQ-ACKs fed back in PUCCH 2, the UE generates an NACK for HARQ process 3, and this HARQ-ACK bit is an invalid HARQ-ACK bit, for HARQ process 1, since the UE has not received the PDSCH for this HARQ process after PUCCH 1, the UE generates an NACK for HARQ process 1, and this HARQ-ACK bit is an invalid HARQ-ACK bit. Then, in PUCCH 2, the UE feeds back a 4-bit HARQ-ACK, and nHARQ-ACK used to calculate the power of PUCCH 2 is 2 bits.

FIG. 29 illustrates a further example in which UE feeds back HARQ-ACKs according to an embodiment of the present application. In the example of FIG. 29, it is assumed that there are a total of 4 HARQ processes, the UE receives PDSCH 1, but does not demodulate it correctly, correctly receives PDSCH 2, and does not receive PDSCH 3, the UE feeds back HARQ-ACKs for HARQ processes 1-2 in PUCCH 1, i.e., NACK and ACK respectively. Subsequently, the UE receives PDSCH 6, but does not receive PDSCH 5 and PDSCH 4, and the UE is triggered to feedback HARQ-ACKs for all HARQ processes in PUCCH 2. For the HARQ-ACKs fed back in PUCCH 2, the UE generates HARQ-ACK bits for HARQ process 4 according to the decoding results of PDSCH 6, and the HARQ-ACK bits for this process are valid HARQ-ACK bits. For HARQ process 3, since the UE has never received the PDSCH for this HARQ process, for the HARQ-ACKs fed back in PUCCH 2, the UE generates an NACK for HARQ process 3, and this HARQ-ACK bit is an invalid HARQ-ACK bit; for HARQ process 1, since the UE has not received the PDSCH for this HARQ process after PUCCH1, the UE generates an NACK for HARQ process 1, and this HARQ-ACK bit is an invalid HARQ-ACK bit; for HARQ process 2, since the UE has not received the PDSCH for this HARQ process after PUCCH 1, the UE generates an NACK for HARQ process 2. Then, in PUCCH 2, the UE feeds back a 4-bit HARQ-ACK, and nHARQ-ACK used to calculate the power of PUCCH 2 is 1 bit.

For another example, according to the combination of conditions 1, 2, 4, and 6, the method for determining the number of HARQ-ACK bits for calculating the power of the PUCCH is: for the HARQ process h of one carrier c, if the UE has fed back ACK previously, and has not received the PDSCH of this TB t since the feedback, then the HARQ-ACK bits for this HARQ process are invalid HARQ-ACK bits and are not counted in nHARQ-ACK, otherwise, the HARQ-ACK bits for this HARQ process are valid HARQ-ACK bits and are counted in nHARQ-ACK.

In a variation of the example of FIG. 27, for example, assuming a total of 4 HARQ processes, the UE correctly receives PDSCH1,2, and the UE feeds back HARQ-ACKs for HARQ processes 1-2 in PUCCH 1, all of which are ACKs. The UE is triggered to feedback HARQ-ACKs for all HARQ processes in PUCCH 2. For the HARQ-ACKs fed back in PUCCH 2, the UE generates HARQ-ACK bits for HARQ processes 4, 1, 2, respectively according to the decoding results of PDSCHs 4, 5, 6, and the HARQ-ACK bits for these three processes are valid HARQ-ACK bits. For HARQ process 3, since the UE has never received the PDSCH for this HARQ process, for the HARQ-ACK fed back in PUCCH 2, the UE generates an NACK for HARQ process 3, but this HARQ-ACK bit is still a valid HARQ-ACK bit. Then, in PUCCH 2, the UE feeds back a 4-bit HARQ-ACK, and nHARQ-ACK used to calculate the power of PUCCH 2 is 4 bits.

The above example is described with generating a 1-bit HARQ-ACK by one HARQ process, but it is also applicable to generating a multi-bit HARQ-ACK by one HARQ process. For example, HARQ-ACK bits for one HARQ process are HARQ-ACK bits for multiple CBGs, HARQ-ACK bits for one HARQ process are HARQ-ACK bits for multiple TBs.

Optionally, if there is additional information that can be used to assist the UE in determining the missed PDSCHs or PDCCHs, the UE may also determine that HARQ-ACK bits for the missed PDSCHs or PDCCHs are included in nHARQ-ACK according to the additional information.

For example, if the UE is configured with dynamic-codebook-based HARQ-ACK feedback and HARQ-process-based HARQ-ACK feedback, the UE can determine the number of missed PDSCHs or PDCCHs to be M based on the DAIs (C-DAIs and/or T-DAIs) of the received PDSCHs, and the HARQ-ACK bits for the M PDSCHs or PDCCHs are counted in nHARQ-ACK. For example, assuming feeding back HARQ-ACKs based on TB for each HARQ process, then the number of bits used to calculate the power of HARQ-ACK determined according to DAI is determined according to $V_{DAI,m_{int}}$ and $U_{DAI,c}$, Where $V_{DIA,m_{int}}$ is a DAI in a DCI received by a PDSCH or PDCCH that is the last one receiving the DCI scheduling the PDSCH or PDCCH among the respective PDSCHs and PDCCHs for a same PUCCH. $U_{DAI,c}$ is the number of DCIs corresponding to the same PUCCH serving cell c received by the UE. Then, according to the difference between $V_{DAI,m_{int}}$ and the sum of $U_{DAI,c}$ of all the cells, the number of HARQ-ACK bits for calculating power is obtained.

This condition can be used in any combination with the conditions described above. For example, the method for determining the number of HARQ-ACK bits used to calculate the power of the PUCCH is: for the HARQ process h of one carrier c, if the UE receives the PDSCH for this process again after the last HARQ-ACK feedback, the UE feeds back an HARQ-ACK according to the received PDSCH, and the HARQ-ACK bits for this HARQ process are valid HARQ-ACK bits, and the number of HARQ-ACK bits for this HARQ process is counted in $n_{HARQ-ACK}$. In addition, according to the number of PDSCHs or PDCCHs missed by the UE determined by the DAI, the number of HARQ-ACK bits for these PDSCHs or PDCCHs is also included in $n_{HARQ-ACK}$.

FIG. 30 illustrates a further example in which the UE feeds back HARQ-ACKs according to an embodiment of the present application. In the example of FIG. 30, it is assumed that there are a total of 4 HARQ processes, the UE correctly receives PDSCH 1~PDSCH 3, and the UE feeds back the HARQ-ACKs for the 3 HARQ processes in PUCCH 1, all of which are ACKs. Subsequently, the UE receives PDSCH 4, DAI=1, and PDSCH 6, DAI=3, but does not receive PDSCH 5, and the UE is triggered to feedback HARQ-ACKs for all HARQ processes in PUCCH 2. For the HARQ-ACK fed back in PUCCH 2, the UE generates HARQ-ACK bits for HARQ processes 4, 2 respectively according to the decoding results of PDSCHs 4, 6. The HARQ-ACK bits for these two processes are valid HARQ-ACK bits. For HARQ process 1, since the UE has not received the PDSCH after PUCCH 1, the UE generates an NACK for HARQ process 1. However, the UE can determine that a PDSCH has been missed by the received DAI=1 and DAI=3, so the $n_{HARQ-ACK}$ used to calculate the power of PUCCH 2 is 2+1=3 bits, where 2 bits are the HARQ-ACKs for HARQ processes 4, 2, and the 1 bit is the HARQ-ACK bit for the missed PDSCH determined by the DAI. Although the UE cannot determine whether the one missed PDSCH belongs to HARQ process 1 or 3, the UE can determine the number of missed PDSCHs to determine the number of bits used to calculate power.

Alternatively, if CBG-based transmission is configured, determining the number $n_{HARQ-ACK}$ of HARQ-ACK bits for calculating the power of the PUCCH may also be performed by utilizing the same method as described above, for example, by replacing the TB t described above with the CB Gg of TB t.

According to another implementation, if the UE feeds back HARQ-ACKs based on HARQ processes, regardless of the number of uplink control information (UCI) bits, for example, regardless of whether the number of uplink control information (UCI) bits is greater than 11 bits, the number $n_{HARQ-ACK}$ of HARQ-ACK bits used to calculate the power of the PUCCH is determined according to the number of transmitted HARQ-ACK bits. In this way, the implementation is relatively simple, and the influence caused by the inconsistent understanding of the valid HARQ-ACKs actually transmitted between the UE and the base station can be avoided.

Optionally, if the UE is configured to feedback based on HARQ processes, to feedback not only the HARQ-ACKs but also assist information, such as NDI (new data indicator) or NFI (new feedback indicator) information, regardless of the number of uplink control information (UCI) bits, for example, regardless of whether the bits of the uplink control information (UCI) are greater than 11 bits, the number $n_{HARQ-ACK}$ of HARQ-ACK bits used to calculate the power of the PUCCH is determined according to the number of transmitted HARQ-ACK bits and the number of transmitted NDI bits.

Optionally, if the UE is configured to feedback based on HARQ processes and to only feedback HARQ-ACKs, when the number of bits of the uplink control information (UCI) carried by the PUCCH≤11, the $n_{HARQ-ACK}$ is determined according to only HARQ-ACKs meeting predefined conditions, in order to calculate the power of the PUCCH. If the number of bits of the uplink control information UCI is greater than 11, $n_{HARQ-ACK}$ is determined according to HARQ-ACKs actually transmitted, in order to calculate the power of the PUCCH. Optionally, for an HARQ-ACK feedback mode with and without NDI feedback, predefined conditions used to determine $n_{HARQ-ACK}$ are different. For example, when NDI is fed back, $n_{HARQ-ACK}$ is determined according to condition 7. When NDI is not fed back, $n_{HARQ-ACK}$ is determined according to conditions 1, 2, 3, and 5.

Optionally, a valid HARQ-ACK described above assumes that there is a sufficient time difference between the PDSCH or PDCCH corresponding to the HARQ-ACK and the PUCCH carrying the HARQ-ACK, so that the UE can generate a valid HARQ-ACK according to the decoding results of the PDSCH or PDCCH. If the time difference is smaller than the minimum processing delay for generating the valid HARQ-ACK according to the decoding results of the PDSCH or PDCCH, the HARQ-ACK for this HARQ process is considered invalid and is not counted in $n_{HARQ-ACK}$. For example, if a PDSCH for a HARQ process h is located after the DCI triggering all-HARQ-process-based HARQ-ACK feedback, then the HARQ-ACK for the HARQ process h is invalid.

FIG. 31 illustrates a block diagram of a user equipment (UE) according to an embodiment of the present application.

Referring to FIG. 31, the UE 3100 may include a controller 3101 and a transceiver 3106. According to an embodiment of the present application, the controller 3101 may be defined as a circuit-specific integrated circuit or at least one processor.

The controller 3101 can control the overall operation of the UE, and control the UE to implement the methods proposed in the present invention.

The transceiver 3106 may transmit/receive signals to/from another network entity. For example, the transceiver 3106 may transmit signals to and receive signals from the base station.

This application further relates to wireless communication technology, and in particular, to a method and device for transmitting uplink data.

With the rapid development of the information industry, especially the increasing demand from the mobile Internet and the Internet of Things (IoT for short), unprecedented challenges has been brought to future mobile communication technologies. In order to cope with these unprecedented challenges, the communication industry and academia have conducted 2020-oriented extensive research on fifth-generation (5G) mobile communication technology. According to the work plan organized by 3GPP (Third Generation Partnership Project), the work on Rel-16 of 5G has been basically completed, and the second phase of work is in progress.

In the second phase of work, how to support efficient operation of a 5G system on unlicensed frequency bands is a very important research direction.

According to an aspect of the present application, there is provided a method performed by a user equipment (UE) in a communication system, the method comprising: receiving first control information related to uplink transmission from a base station; and transmitting an uplink signal based on the received first control information.

Optionally, the first control information comprises frequency resources, time resources, space resources and/or listen-before-talk (LBT) information scheduled by the base station for the UE to perform uplink data transmission; the method further comprises: determining by the UE, the number of resources available for data transmission, extending on the time resources if the number of resources available for data transmission is smaller than the number of resources configured and scheduled by the base station, in order to reach the number of resources expected by the base station.

Optionally, the first control information comprises frequency resources and/or time resources and/or space resources scheduled by the base station for the UE to perform uplink transmission; wherein, if the number of time/frequency/space resources available for data transmission is smaller than the number of time/frequency/space resources configured and scheduled by the base station, then extension is performed on the time resources, so that the number of time/frequency/space resources actually used for data transmission reaches the number of time/frequency/space resources expected by the base station.

Optionally, the frequency resources comprise serving cells, a listen-before-talk (LBT) sub-bands, and/or a bandwidth parts (BWPs); wherein, the space resources comprise a transmission reception point (TRP).

Optionally, the method may further comprise: receiving second control information from the base station to determine a time window, wherein the extended time resources cannot exceed the time window.

Optionally, the time window is a time window available for transmission of a configuration-based physical uplink shared channel (CG PUSCH) within one period; or the time window is a maximum time delay for repeated transmissions of one transport block (TB).

Optionally, the first control information comprises channel occupancy time (COT) information; wherein, the transmitting by the UE, uplink data based on the received first control information comprises: segmenting the PUSCH based on the COT information; and transmitting the segmented PUSCHs based on the COT information.

Optionally, the first control information comprises channel occupancy time (COT) information; wherein, the transmitting by the UE, uplink data based on the received first control information comprises: transmitting the PUSCH based on the COT information.

Optionally, the method may further comprise: segmenting the PUSCH based on the COT information; and transmitting the segmented PUSCHs based on the COT information.

Optionally, segmenting the PUSCH based on the COT information comprises: segmenting by the UE, the PUSCH according to an end position of a COT initiated by the base station.

Optionally, the transmitting the PUSCH based on the COT information comprises: transmitting by the UE, the PUSCH according to the end position of the COT initiated by the base station; or re-determining by the UE, a COT initiated by the UE, and transmitting by the UE, the PUSCH based on the end position of the re-determined COT; or the transmitting the segmented PUSCHs based on the COT information comprises: transmitting by the UE, the segmented PUSCHs according to the end position of the COT initiated by the base station; or re-determining by the UE, the COT, and transmitting by the UE, the segmented PUSCHs based on the end position of the re-determined COT.

Optionally, the transmitting the PUSCH based on the end position of the COT comprises: if there is a segmented transmission outside the end position of the COT among the segmented transmissions, abandoning by the UE, transmitting segmented transmission outside the end position of the COT; or if the end position of the COT is inside the segmented transmission among the segmented transmissions, abandoning by the UE, transmitting the segmented transmissions; if the end position of the COT is inside one repeated transmission, abandoning by the UE, transmitting a signal outside the COT.

Optionally, transmitting the PUSCH based on the end position of the COT comprises: if there is a segmented transmission outside the end position of the COT among the segmented transmissions, postponing by the UE, transmitting the segmented transmission outside the end position of the COT; or if the end position of the COT is inside a segmented transmission among the segmented transmissions, postponing by the UE, transmitting the segmented transmissions; if the end position of the COT is inside one repeated transmission, postponing by the UE, transmitting the COT signal.

Optionally, the method may further comprise: determining by the UE, available transmission resources after the COT ends and transmitting the postponed PUSCH, wherein the UE determines the available transmission resources by performing LBT after the COT ends.

Optionally, the UE reports to the base station whether to segment the PUSCH according to a COT shared by the base station.

Optionally, the method may further comprise: if the segmented PUSCHs overlaps with symbols invalid for PUSCH indicated by the channel occupancy time (COT), postponing by the UE, transmitting the segmented PUSCHs.

Optionally, the method may further comprise: the postponed PUSCHs being able to be transmitted only within the time window.

According to another aspect of the present application, there is provided a user equipment including a transceiver and a controller, the user equipment being configured to perform the above methods.

Downlink transmission refers to transmitting signals from a base station to a user equipment (UE). Downlink signals include data signals, control signals and reference signals (pilots). Here, the base station transmits downlink data in physical downlink shared channels (PDSCHs), or transmits downlink control information a downlink control channels. Uplink transmission refers to transmitting signals from the user equipment to the base station. Uplink signals also include data signals, control signals and reference signals. Here, the UE transmits uplink data in physical uplink shared channels (PUSCHs) or transmits uplink control information in physical uplink control channels (PUCCHs). The base station can dynamically schedule PDSCH transmissions and PUSCH transmissions of the UE through physical downlink control channels (PDCCHs). The uplink control information carried on the PUCCH can be segmented into various types, including hybrid automatic repeat request (HARQ) acknowledgement information (HARQ-ACK), channel state indication information (CSI), and scheduling requests (SRs).

In a 5G system, a slot can be segmented into up to three parts, i.e., a downlink (DL) part, a flexible (Flexible) part, and an uplink (UL) part, hereinafter referred to as a slot pattern. The DL part may include ND OFDM symbols for downlink transmission, ND being greater than or equal to 0; the UL part may include NU OFDM symbols for uplink transmission, NU being greater than or equal to 0; the Flexible part may include NK OFDM symbols, which represents a flexible part wherein it is uncertain whether uplink transmission and downlink transmission is performed in the flexible part, NK being greater than or equal to 0. In order to determine a slot pattern, one or more of the following four levels of indication methods can be used.

The first level: semi-statically configured slot patterns, which can be a pattern common to a cell or a group of UEs. For example, a pattern of each slot in one period is configured with Np slots as a period.

The second level: semi-statically configured slot patterns, which can be patterns configured individually for each UE. For example, a pattern of each slot in one period is configured with Np slots as a period.

The third level: dynamically indicated slot patterns, which can be a pattern common to a cell or a group of UEs, for example, using a common PDCCH. For example, a pattern of each slot in one period is configured with Np slots as a period; or, in one period, only patterns of one or more of the Np slots are configured, while patterns of the slots that are not dynamically configured can be determined according to other information, for example, semi-statically configured slot patterns.

The fourth level: dynamically indicated slot patterns, which can be patterns determined according to the PDCCH scheduling the uplink transmission and downlink transmission of the UE. For example, OFDM symbols that is dynamically scheduled as part of downlink transmission belong to the DL part, and OFDM symbols that is dynamically scheduled as part of uplink transmission belong to the UL part.

FIG. 32 illustrates a flowchart of a method for transmitting uplink transmission performed by a UE according to an embodiment of the present application.

In step 3210, the UE receives control information related to uplink transmission from a base station. In step 3220, the UE transmits an uplink signal based on the received control information.

Uplink transmission may include uplink data transmission PUSCH, uplink control information transmission PUCCH, uplink random access signal transmission PRACH, or uplink reference signal (such as SRS) transmission.

To ensure reliability, a same transport block (TB) or a same set of uplink control information, or a same uplink random access signal/reference signal may be repeatedly transmitted multiple times. Assuming that a coding rate that can be reached in one transmission is r, then N transmissions can approximately reach a coding rate of r/N. A lower coding rate can ensure a greater probability of correct reception, thereby improving reliability.

The N repeated transmissions may be in the time dimension, and/or frequency domain dimension, and/or space dimension. For example, as an example in which the transmission with two repetitions are performed in the time dimension, a start point of one PUSCH transmission is the third symbol of slot n (S=3), the length L=12, and the number of repetitions is 2, and the PUSCH with same transport block (TB) can occupy the $3^{rd}$ to $14^{th}$ symbols of slot n and the $1^{st}$ to $12^{th}$ symbols of slot n+1. As another example, as an example in which the transmission with two repetitions are performed in the frequency dimension, each of two carriers is scheduled for one PUSCH respectively, and the two PUSCHs are associated with a same TB.

In some cases, if the scheduled resources are not fully available, and if the UE only transmits on the available resources among the scheduled resources, then the actual coding rate increases, resulting in a decrease in the probability of correct reception. In order to keep an expected coding rate as much as possible, a new method is needed to enable the number of resources actually transmitted by the UE to be basically the same as the number of resources scheduled by the base station, or to enable a coding rate of actual transmission by the UE to be basically the same as a coding rate expected by the base station.

FIG. 33 illustrates a flowchart of determining resources for uplink transmission by a UE according to an embodiment of the present application.

In step 3310, the UE receives control information related to uplink transmission from the base station. In step 3320, the UE determines the number of resources available for uplink transmission. In step 3330, if the number of resources available for transmission is smaller than the number of resources configured and/or scheduled by the base station, then the UE extends on the time resources, so that the number of resources actually used for uplink transmission is consistent with the number of resources configured by the base station.

According to one embodiment, the control information includes frequency resources, time resources, and/or space resources scheduled by the base station for UE to perform uplink transmission. According to one embodiment, the frequency resources may include serving cells, LBT subbands, and/or a bandwidth parts (BWP). According to one embodiment, the space resources may include transmission reception points (TRPs).

The followings are described by taking uplink data transmission PUSCH as an example, but it is also applicable to other uplink transmissions. According to one implementation, the control information received by the UE from the base station in step 3310 schedules one TB of the UE to be transmitted on N serving cells, with the transmission being repeated M times in the time dimension. That is, the total number of occupied time/frequency resources is N*M times. When the UE determines the number of resources available for data transmission in step 3320, it determines that the number of serving cells on which the transmission is actually available is N1. In step 3330, if the UE determines that the number N1 of serving cells on which the transmission is actually available is smaller than a number N of serving cells scheduled by the base station, the UE extends in the time dimension to determine a number M1 of repetitions in the time dimension, so that M1*N1 is consistent or basically consistent with N*M. Optionally, M1*N1≥N*M. Or, M1*N1≤N*M.

FIG. 34 illustrates a flowchart of determining frequency resources and time resources for data transmission by a UE according to an embodiment of the present application. In the embodiment of FIG. 34, the frequency resources are serving cells.

For example, in an unlicensed band, before transmitting on a serving cell, the UE needs to perform LBT to determine the resources available for transmission. The UE only transmits signals on serving cells that have successfully completed LBT. For example, the base station schedules the uplink transmission of the UE, with one TB being repeatedly transmitted on two serving cells (one PUSCH per serving cell) and the transmission being repeated twice in the time dimension. The UE successfully completes LBT on carrier 1 only, and does not successfully complete LBT on carrier 2, so that the UE only transmits PUSCH on carrier 1. Since the number of frequency domain resources actually available for one repeated transmission in the time dimension (one PUSCH) is halved, in order to reach the number of frequency domain resources/coding rate expected by the base station when it performs scheduling, the UE can automatically add 2 PUSCH repetitions in the time domain.

According to another implementation, the control information received by the UE from the base station in step 3310 schedules one TB of the UE to be mapped to N LBT sub-bands for transmission, with the transmission being repeated M times in the time dimension, so that the total number of occupied time/frequency resources is N*M. When the UE determines the number of resources available for data transmission in step 3320, it determines a number N1 of LBT sub-bands on which the transmission is actually available. In step 3330, if the UE determines that the number N1 of LBT sub-bands on which the transmission is actually available is smaller than a number N of LBT sub-bands scheduled by the base station, then the UE determines a number M1 of repetitions in the time dimension so that M1*N1 is consistent or basically consistent with N*M Optionally, M1*N1≥N*M. Or, M1*N1≤N*M.

FIG. 35 illustrates a flowchart of determining frequency resources and time resources for data transmission by a UE according to another embodiment of the present application. In the embodiment of FIG. 35, the frequency resources are LBT sub-bands.

In an unlicensed frequency band, the frequency domain resources occupied by one transmission may correspond to multiple LBT sub-bands. Before transmitting on these LBT sub-bands, the UE needs to perform LBT to determine the resources available for transmission. The UE only transmits signals on LBT sub-bands that have successfully completed LBT. For example, the base station schedules the uplink transmission of the UE, with one TB being mapped to 4 LBT sub-bands and the transmission being repeated twice in the time dimension. If the UE does not successfully complete LBT on LBT sub-bands 1 & 2, and successfully completes LBT on LBT sub-bands 3 & 4, then the UE only transmits PUSCH on LBT sub-bands. It is not difficult to see that the number of frequency domain resources actually available for one repeated transmission in the time dimension (one PUSCH) is halved. In order to reach a coding rate expected by the base station when it performs scheduling, the UE can automatically add 2 PUSCH repetitions in the time domain.

Although this application, by taking FIG. 34 and FIG. 35 as examples respectively, exemplarily describe extending in the time dimension in case that frequency resources are serving cells and LBT sub-bands, so that the number of time/frequency resources actually used for transmission is consistent/basically consistent with the number of scheduled time/frequency resources, or so that a coding rate actually used for transmission is consistent/basically consistent with an expected coding rate, this application is not limited to thereto. For example, the frequency resources may also be bandwidth parts (BWPs). In addition, the present application is also applicable to the case where the base station configures space resources and time resources, or the base station configures frequency resources, space resources and time resources, and extends in the time dimension so that the number of resources actually used for transmission of the UE is consistent with the number of resources scheduled by the base station. The space resources may be, for example, TRPs.

According to another aspect of this application, the base station may configure a time window to control the time resources occupied by the UE.

Optionally, the time window is a time window available for CG PUSCH transmission within one period. The M1 repetitions in the time dimension cannot exceed this time window. For example, the base station configures the period P, a time offset f, and a start symbol S of the CG PUSCH, to determine a start symbol and a start slot of CG PUSCH resources within each period. In addition, the base station configures a number W of slots, which means that starting from the start slot of the CG PUSCH resources, corresponding resources in consecutive W slots are all resources available for the CG PUSCH. Then, M1 repetitions in the time dimension cannot exceed an end position of these W slots. Optionally, if there is an additional extension window on the basis of the W slot, for example, W+M slots determined according to the number W of repetitions, then the M1 repetitions in the time dimension cannot exceed an end position of these W+M slots.

FIG. 36 illustrates a time window available for CG PUSCH transmission according to an embodiment of the present application.

As shown in FIG. 36, it is assumed that the length of the CG PUSCH time window is 5 slots. The base station schedules the UE on 4 carriers with a repetition of twice in the time dimension, that is, 8 PUSCHs. On the left side of the figure, in the first time the UE successfully completes LBT on carriers 2, 4, and transmits PUSCH 4 times on carriers 2, 4 respectively within the time window. In the second time, the UE successfully completes LBT on carrier 4, so that it needs to transmit PUSCH 8 times on carrier 4. However, due to the limitation of the time window, the UE can only transmit the PUSCH 5 times on carrier 4.

Optionally, a predefined time window is a maximum time delay for repeated transmissions of one TB. The M1 repetitions in the time dimension cannot exceed this time window. For example, taking the start time of the first transmission of one TB as the start point of the time window, then M1 repeated transmissions cannot exceed this time window. Optionally, each CG PUSCH configuration is configured with this time window separately, or each priority of CG PUSCH configuration(s) is configured with this time window.

Alternatively, the base station may dynamically indicate the length of the time window.

If the M1 transmissions have not completed at the end of the time window, the remaining repetition are dropped.

Optionally, a transmitting node reports the value of M1 to a receiving end. Optionally, the transmitting node reports information of N to the receiving end.

As described above, in order to obtain minimum delay and maximum reliability, a same transport block (TB) may be repeatedly transmitted on consecutive resources. In the following, resource allocation manner when transmitting transport blocks (TBs) is exemplarily illustrated by taking repeatedly transmitting a same transport block (TB) twice as an example. The repeatedly transmitting the transport block (TB) twice means that the transport block (TB) is transmitted twice in total, and the first transmission and the second transmission are both called repetitions.

If the number of consecutive uplink symbols is smaller than the number L of symbols occupied by one repetition allocated to the UE, then the uplink transmission or downlink transmission that should have be mapped to the symbols can be postponed, segmented, or dropped. When the length L of one repetition (transmission) actually crosses the slot boundary, and/or the corresponding L consecutive symbols contain symbols invalid for transmission, then one nominal repetition (transmission) can be segmented into multiple actual repetitions (transmissions).

FIG. 37 illustrates an example in which a UE processes repeated transmissions of a transport block (TB).

If the resources of one repetition are not postponed according to symbols invalid for transmission, then the total number of symbols of resources of multiple repeated transmissions segmented from one repetition is smaller than or equal to L. As shown in FIG. 36, the start point of a PUSCH transmission S=3, the length L=12, and the number of repetitions is 2. The OFDM symbols corresponding to the first repetition are symbol 3 of slot n to symbol 0 of slot n+1, and the OFDM symbols corresponding to the second repetition are symbol 1 of slot n+1 to symbol 12 of slot n+1. Among them, symbol 7 of slot n, symbol 0 and symbol 7 of slot n+1 are downlink symbols, and cannot be used for PUSCH transmission. Therefore, the first repetition is segmented into 2 blocks (a first repetition after segmentation occupies symbols 3~6 of slot n, and a second repetition after segmentation occupies symbols 8~13 of slot n). Similarly, the second repetition is also segmented into 2 blocks (a third repetition after segmentation occupies symbols 1-6 of slot n+1, and a fourth repetition after segmentation occupies symbols 8~12 of slot n+1).

FIG. 38 illustrates another example in which the UE processes repeated transmissions of a transport block (TB).

If the resources of one repetition are postponed according to symbols invalid for transmission, then a total number of symbols of resources of multiple repetitions (transmission) segmented from one repetition (transmission) is equal to L. As shown in FIG. 37, the start point of a PUSCH transmission S=3, the length L=12, and the number of repetitions is 2. Symbol 7 of slot n, symbol 0 and symbol 7 of slot n+1, and symbol 0 of slot n+2 are all downlink symbols and cannot be used for PUSCH transmission. Therefore, the first transmission is segmented into 3 blocks (a first repetition after segmentation occupies symbols 3~6 of slot n, a second repetition after segmentation occupies symbols 8~13 of slot n, and a third repetition after segmentation occupies symbols 1-2 of slot n+1). In the same way, the second transmission is also segmented into 3 blocks (a fourth repetition after segmentation occupies symbols 3~6 of slot n+1, a fifth repetition after segmentation occupies symbols 8~13 of slot n+1, and a sixth repetition after segmentation occupies symbols 1-2 of slot n+2). The first to third repetition after segmentation occupy L=12 symbols, and the fourth to sixth repetition after segmentation occupy L=12 symbols.

On an unlicensed band, symbols invalid for transmission can be determined not only according to semi-static uplink and downlink configurations, and/or dynamically indicated uplink and downlink configurations, and/or dynamic scheduling information, but also according to the channel occupancy time (COT), and/or semi-persistently configured invalid symbols, and/or dynamically configured invalid symbols.

An aspect of the present application provides a method and apparatus for a UE to determine symbols invalid for transmission based on channel occupancy time (COT) information. Another aspect of the present application provides a method and apparatus for the UE to segment PUSCH based on the channel occupancy time (COT) information. Another aspect of the present application provides a method and apparatus for the UE to transmit PUSCH based on the channel occupancy time (COT) information.

In some scenarios, the base station can continue to occupy the channel for a period of time after LBT of a specific type A succeeds. This period of time is COT (channel occupancy time). The COT does not exceed a predefined maximum time. Generally, when the base station starts transmission in the COT after successfully occupying the channel, it will inform the UE of the COT information, for example, by indicating a start position of the COT and an end position of the COT through the GC PDCCH. In the COT, the base station can transmit downlink signals, such as PDCCH/PDSCH or downlink reference signals. Alternatively, the base station can share this period of time with the UE, so that the UE can start transmitting uplink signals in the COT after LBT of a specific type B succeeds. If the UE wants to transmit signals outside this COT, then the UE needs to perform LBT of the specific type A. Generally, LBT of the specific type A is more conservative than LBT of the specific type B. For example, LBT of the specific type A is LBE (Load based equipment)-based LBT, and it is necessary to determine a contention window size (CWS) according to the service type, determine the random backoff parameter n according to the CWS, detect that the channel is idle within n consecutive time units before transmitting signals, for example, Type-1 channel access defined in TS 37.213. LBT of the specific type B is a fixed-length LBT, such as 25 us LBT, or 16 us LBT, or 0 us LBT, for example, Type-2 channel access defined in TS 37.213. A more conservative LBT type means a smaller chance to transmit, that is, it is more difficult for the transmitting node to complete LBT and transmit signals in time.

When a part of resources of PUSCH scheduled for repetitions are located inside the COT shared by the base station, while the other part are outside the COT shared by the base station, a new method is required to process the PUSCH to ensure a higher transmission probability and alleviate transmission time delay increase or reliability decrease due to LBT failure.

According to one implementation, uplink transmission segments the PUSCH at least according to the end position of COT. In this way, the available uplink resources in the COT can be fully utilized, and the PUSCH can be transmitted as much as possible. Optionally, for each segmentation, a same transport block (TB) is rate-matched according to actually available resources.

FIG. 39 illustrates a flowchart of transmitting uplink data by a UE based on channel occupancy time (COT) information according to an embodiment of the present application.

In operation 3910, the UE receives control information from the base station. The control information includes channel occupancy time (COT) information. In operation 3920, the UE segments the PUSCH according to the COT information. In one embodiment, the UE segments the PUSCH according to the end position of the COT. In operation 3930, the UE transmits the segmented PUSCH transmissions based on the COT information. In one embodiment, the UE transmits the segmented PUSCH transmissions based on the end position of the COT. In one embodiment, if, among the segmented transmissions, there is a segmented transmission outside the end position of the COT, then the UE abandons transmitting the segmented transmission outside the end position of the COT. In one embodiment, if the end position of the COT is located inside one repetition, then the UE drops signals outside the COT. In one embodiment, if the end position of the COT is located inside one repetition after segmentation, then the UE abandons transmitting this repetition.

The above embodiments will be further described below with reference to FIGS. 9-11.

FIG. 40 illustrates an example in which a UE transmits uplink data based on channel occupancy time (COT) information according to an embodiment of the present application.

As shown in FIG. 40, F and D marked in FIG. 40 are flexible symbols and downlink symbols determined according to the semi-static uplink and downlink configurations. It is assumed that the control information received by the UE from the base station in step 3910 includes: occupying a channel in symbol 0 of slot n, and indicating that the length of the COT is from symbol 0 of slot n to symbol 13 of slot n+1. The start point of a configuration-based PUSCH (CG PUSCH) is S=10, L=12, K=2, and the resources of the PUSCH are not postponed according to the invalid symbols. The start point of this PUSCH is located inside the COT, and the UE can start transmitting from symbol 10 after successfully completing the 25 us or 16 us LBT, or without performing LBT. In operation 3920, the UE segments the PUSCH according to the COT information. A first repetition after segmentation occupies symbols 1013 of slot n, a second repetition after segmentation occupies symbols 2~7 of slot n+1, a third repetition after segmentation occupies symbols 8~13 of slot n+1, and a fourth repetition after segmentation occupies symbols 0~5 of slot n+2. In operation 3930, for example, based on the end position of the COT, the UE transmits only 3 repetitions after segmentation within the COT, and abandons transmitting the fourth repetition outside the COT.

FIG. 41 illustrates another example in which a UE transmits uplink data based on the channel occupancy time (COT) information according to an embodiment of the present application. Hereinafter, embodiments of the present application will be further described with reference to FIGS. 7 and 10.

FIG. 41 illustrates transmitting the remaining part after LBT succeeds in a first repeated transmission after the COT, in order not to affect the reliability of reception. As shown in FIG. 41, F and D marked in FIG. 41 are flexible symbols and downlink symbols determined according to the semi-persistent uplink and downlink configurations. It is assumed that the control information received by the UE from the base station in step 3910 includes: occupying a channel in symbol 0 of slot n, and indicating that the length of the COT is from symbol 0 of slot n to symbol 13 of slot n+1. The start point of a configuration-based PUSCH (CG PUSCH) is S=10, L=12, K=2, and the resources of the PUSCH are not postponed according to the invalid symbols. The start point of this PUSCH is located inside the COT, and the UE can start transmitting from symbol 10 after successfully completing the 25 us or 16 us LBT, or without performing LBT. In operation 3920, the UE segments the PUSCH according to the COT information. A first repetition after segmentation occupies symbols 1013 of slot n, a second repetition after segmentation occupies symbols 2~7 of slot n+1, a third repetition after segmentation occupies symbols 8~13 of slot n+1, and a fourth repetition after segmentation occupies symbols 0~5 of slot n+2. In operation 3930, the UE transmits, for example, based on the end position of the COT, 3 repetitions after segmentation within the COT, and transmits the fourth repetition after the COT ends. The UE needs to perform LBT again after the end of the COT. Therefore, in this example, the UE needs to reserve the $1^{st}$ to $X^{th}$ symbols in the fourth repetition for LBT. After LBT succeeds, the UE starts to transmit the remaining part of the fourth repetition. The UE transmits DMRS in a first actually transmitted symbol, which can help the base station to determine the start point of the actual transmission. According to another implementation, X symbols after the end of the COT are configured not for uplink transmission, and the UE can perform LBT in the X symbols. When LBT succeeds, transmission of the fourth repetition starts at the $(X+1)^{th}$ symbol.

FIG. 42 illustrates another example in which a UE transmits uplink data based on the channel occupancy time (COT) information according to an embodiment of the present application.

FIG. 42 illustrates that if the end position of the COT is located inside one repetition, the UE abandons transmitting signals outside the COT. As shown in FIG. 42, since the end position of the COT is located inside the second repetition, only the repetitions within the COT are transmitted, and the repetitions outside the COT are abandoned. In one embodiment, the UE may abandon transmitting the repetitions outside the COT by way of puncturing.

FIG. 43 illustrates another example in which a UE transmits uplink data based on the channel occupancy time (COT) information according to an embodiment of the present application.

FIG. 43 illustrates that if the end position of the COT is located inside one repetition, the UE abandons transmitting this repetition. As shown in FIG. 43, since the end position of the COT is located inside the third repetition after segmentation, the UE abandons transmitting the third repetition.

FIG. 44 illustrates another example in which a UE transmits uplink data based on the channel occupancy time (COT) information according to an embodiment of the present application.

FIG. 44 illustrates transmitting the remaining part after LBT succeeds in a first repetition after the COT, in order not to affect the reliability of reception. As shown in FIG. 44, F and D marked in FIG. 44 are flexible symbols and downlink symbols determined according to the semi-static uplink and downlink configurations. It is assumed that the control information received by the UE from the base station in step 3910 includes: occupying a channel in symbol 0 of slot n, and indicating that the length of the COT is from symbol 0 of slot n to symbol 13 of slot n+1. The start point of a configuration-based PUSCH (CG PUSCH) is S=10, L=12, K=2, and the resources of the PUSCH are not postponed according to the invalid symbols. The start point of this PUSCH is located inside the COT, and the UE can start transmitting from symbol 10 after successfully completing the 25 us or 16 us LBT, or without performing LBT. In operation 3920, the UE segments the PUSCH according to the COT information. A first repetition after segmentation occupies symbols 10~13 of slot n, a second repetition after segmentation occupies symbols 2-7 of slot n+1, a third repetition after segmentation occupies symbols 8~13 of slot n+1, and a fourth repetition after segmentation occupies symbols 0~5 of slot n+2. In operation 3930, the UE transmits, for example, based on the end position of the COT, 3 repetitions after segmentation within the COT, and transmits the fourth repetition after the COT ends. The UE needs to perform LBT again after the end of the COT. Therefore, in this example, the UE needs to reserve the $1^{st}$ to $X^{th}$ symbols in the fourth repetition for LBT. After LBT succeeds, the UE starts to transmit the remaining part of the fourth repetition. The UE transmits DMRS in a first actually transmitted symbol, which can help the base station to determine the start point of the actual transmission. According to another implementation, X symbols after the end of the COT are configured not for uplink transmission, and the UE can perform LBT in the X symbols. When LBT succeeds, transmission of the fourth repetition starts at the (X+1)th symbol.

FIG. 45 illustrates another example in which a UE transmits uplink databased on channel occupancy time (COT) information according to an embodiment of the present application.

FIG. 45 illustrates that if the end position of the COT is located inside one repetition, then the UE abandons transmitting this repetition. And the UE transmits this abandoned repetition from the next valid symbol. As shown in FIG. 45, since the end position of the COT is located inside the third repetition after segmentation, the UE abandons transmitting the third repetition, and starts to transmit the third repetition from symbol 6 of slot n+2.

According to another implementation, in order to avoid interruption of repetitions for one PUSCH, the UE may adopt LBT of the specific type A, even within the COT determined based on the control information received from the base station. If LBT succeeds, the UE transmits repetitions of the PUSCH based on the new COT initiated by the UE, without additional processing on the PUSCH according to the COT provided by the base station. The UE can consecutively transmit all repeated transmissions of this PUSCH.

FIG. 46 illustrates an example in which a UE re-determines the COT to transmit uplink data according to an embodiment of the present application.

As shown in FIG. 46, based on the COT information provided by the base station in operation 3920, the UE successfully completes LBT of the specific type A before the start of symbol 10 of slot n in the COT provided by the base station, so that the UE re-determines and start a new COT and all repeated transmissions are located inside this COT re-determined by the UE. Therefore, after transmitting the second repetition after segmentation, the UE can consecutively transmit the third repetition after segmentation without additional processing on the PUSCH according to the COT boundary shared by the base station.

In some scenarios, it is beneficial to process the PUSCH based on the COT shared by the base station, for example, in a scenario that is sensitive to time delay. In other scenarios, it is beneficial for the UE to restart a new COT to process the PUSCH, for example, in a scenario that is sensitive to reliability. The base station can configure which processing method to use, for example, which processing method to use for each CG PUSCH. Alternatively, the base station dynamically indicates which processing method to use through the COT. Alternatively, the UE can choose which processing method to use by itself. Optionally, the UE indicates in UCI which transmission method to use. For example, the UE indicates in the UCI that the PUSCH is correspondingly operated according to the COT shared by the base station, or the PUSCH is not correspondingly operated according to the COT shared by the base station.

There is a one-to-one correspondence between whether the PUSCH is operated according to the COT shared by the base station and the LBT type adopted by the UE. Therefore, the UE may also inform the base station of which operation is used for the PUSCH by reporting to the base station which type of LBT is used. For example, if the LBT type reported by the UE is LBT of the specific type B, then the PUSCH is processed according to the COT shared by the base station, and if the LBT type reported by the UE is LBT of the specific type A, then the PUSCH is not processed according to the COT shared by the base station.

FIG. 47 illustrates an example in which a UE transmits uplink data based on channel occupancy time (COT) information.

If one uplink transmission overlaps with symbols available for uplink transmission indicated by the channel occupancy time (COT), then the UE abandons transmitting this uplink transmission. For example, in FIG. 45, if the base station indicates in the GC-PDCCH that transmission of CG PUSCH is not allowed in the COT, then the UE cannot transmit PUSCH segmentations that are partially or entirely located inside the COT.

FIG. 48 illustrates an example in which a UE transmits uplink data based on channel occupancy time (COT) information according to an embodiment of the present application. If one uplink transmission after segmentation overlaps with the symbol invalid for uplink transmission indicated according to the channel occupancy time (COT), then the UE postpones transmitting this uplink transmission. For example, in FIG. 48, the base station indicates in the GC-PDCCH that CG PUSCH transmission is not allowed in the COT, then the UE cannot transmit PUSCH segmentations that are partially or entirely located inside the COT. The UE may transmit the postponed third repetition on the next available resource, for example, UE may attempt to transmit the postponed third repetition on the CG PUSCH resources after end time of the COT.

Optionally, for the case of postponed transmission, the postponed repetitions can only be transmitted within the time window. For example, taking the start point of the first transmission of the PUSCH as the start point of the time window, N repetitions can only be transmitted before the end of the time window, and if there are still repetitions having yet to be transmitted beyond the time window, the corresponding transmission is abandoned. For another example, the end position of the time window is the end symbol position of the CG PUSCH resources in one period, or the end position of a time offset window of the CG PUSCH. Assuming that a period of resources of the CG PUSCH is 40 ms, and the 1~5 ms within every 40 ms are a time window in which the CG-PUSCH can be transmitted, then N repeated transmissions can only be transmitted before the end of this time window.

In the above method, CG PUSCH transmission can only be located inside the configured CG PUSCH resources. If operations such as segmentation are required, they need to be performed based on the configured CG PUSCH resources.

The above method is also applicable to the case where the number of repetitions is 1. For example, in a case where one PUSCH is transmitted only once, with a part of the symbols of this PUS CH being inside the COT and the other part of the symbols being outside the COT, the PUSCH transmission method can also be determined according to the above method.

According to an implementation of the present invention, in step 3210, the UE receives control information related to uplink transmission from the base station.

The control information related to uplink transmission may be used to determine transmission of at least two or more types of uplink signals. For example, the base station schedules the transmission of PUSCH and SRS through a same DCI. Alternatively, the base station schedules the transmission of PUCCH and SRS through a same DCI. The DCI contains control information related to uplink transmission.

The control information related to uplink transmission may respectively indicate CP extension information and/or LBT information of the at least two or more types of uplink signals. For example, the base station indicates CP extension information and/or LBT information for SRS and PUCCH, or SRS and PUSCH respectively.

The control information related to uplink transmission may only indicate CP extension information and/or LBT information for a first type of uplink signal, and CP extension information and/or LBT information for a second type of uplink signal is determined according to predefined rules.

The first type of uplink signal is determined according to at least one of the following methods:
 The first type of uplink signal is a first uplink signal which precedes other uplink signals in time domain scheduled by the same DCI from the base station.
 The first type of uplink signal is PUSCH.
 The first type of uplink signal is PUCCH.

The CP extension information and/or LBT information for the second type of uplink signal is determined according to predefined rules, and the rule includes at least one of the following:
 If the second type of uplink signal and the first type of uplink signal are consecutive in time dimension without intervals, then CP extension is not performed on the second type of uplink signal.
 If the second type of uplink signal and the first type of uplink signal are consecutive in time dimension without intervals, and the first type of uplink signal is successfully transmitted, then LBT is not performed on the second type of uplink signal.
 If the second type of uplink signal and the first type of uplink signal are consecutive in time dimension without intervals, and the first type of uplink signal is not successfully transmitted, then LBT is performed on the second type of uplink signal according to a predefined rule 1.
 If the second type of uplink signal and the first type of uplink signal are discontinuous in time dimension, that is, there is gap in time dimension, then CP extension for the second type of uplink signal is determined according to a pre-defined rule 2.
 The predefined rule 2 for determining CP extension includes at least one of the followings:
  No CP extension.
  If the second type of uplink signal and the first type of uplink signal are discontinuous in time dimension, that is, there is gap in time dimension, then CP extension as same as that for the first type of uplink signal is utilized for the second type of uplink signal.
  Predefined CP extension is utilized for the second type of uplink signal. The predefined CP extension is defined by the standards or semi-statically configured by the base station.
  If the second type of uplink signal and the first type of uplink signal are discontinuous in time dimension, that is, there is gap in time dimension, and the gap meets certain conditions, then CP extension as same as that for the first type of uplink signal is utilized for the second type of uplink signal, otherwise CP extension is not performed on the second type of uplink signal.
  If the second type of uplink signal and the first type of uplink signal discontinuous in time dimension, that is, there is gap in time dimension, and the gap meets certain conditions, then CP extension as same as that for the first type of uplink signal is utilized for the second type of uplink signal, otherwise the second type of uplink signal adopts the predefined CP extension.
 The certain conditions are at least one of the following:
 The gap is greater than X symbols;
 The gap is fewer than X symbols;
 The gap is greater than Y time slots;
 The gap is fewer than Y time slots;
 The gap is greater than Z microseconds, such as Z=16 or 25 us;
 The gap is fewer than Z microseconds, such as Z=16 or 25 us;
 The gap makes the first type of uplink signal and the second type of uplink signal belong to the same COT;
 This gap makes the first type of uplink signal and the second type of uplink signal not belong to the same COT.
 If the second type of uplink signal and the first type of uplink signal are discontinuous in time dimension, that is, there is a gap, or the gap meets certain conditions, then LBT is performed on the second type of uplink signal according to the predefined rule 1.
 The predefined rule 1 for performing LBT includes at least one of the followings:
  LBT performed on the second type of uplink signal is of a same type as that of the first type of uplink signal.
  If the second type of uplink signal is located inside the COT, then type-2 LBT is performed. The type-2 LBT is LBT with 25 us, or LBT with 16 us, or there is no need to perform LBT. If the second type of uplink signal is located outside the COT, then type-1 LBT, for example, Cat-4 LBT based on random fallback, is performed.
 CP extension is not performed on the second type of uplink signal.
 CP extension as same as that for the first type of uplink signal is utilized for the second type of uplink signal.
 Predefined CP extension is utilized for the second type of uplink signal. The pre-defined CP extension is defined by the standards or semi-statically configured by the base station. For example, when the base station configures resources for SRS, it configures the CP extension for the resources for SRS. When SRS is the second type of uplink signal, configured CP extension is utilized.
 LBT is performed on the second type of uplink signal according to the predefined rule 1.
 Optionally, if the UE has transmitted other uplink signals before a start point of the second type of uplink signal, and the other uplink signals and the second type of uplink signal are continuous in time dimension, then LBT is not required.
 LBT utilized by the second type of uplink signal is of a same type as that of the first type of uplink signal.
 Optionally, if the UE has transmitted other uplink signals before the start point of the second type of uplink signal, and the other uplink signals and the second type of uplink signal are continuous in time dimension, then LBT is not required.
 LBT information further includes channel access priority type (CAPC) information. Optionally, if the second type of uplink signal is PUSCH, then a service type of PUSCH is determined according to the channel access priority type (CAPC) in the control information related to uplink transmission. Optionally, if the second type of uplink signal is PUSCH, and the PUSCH is located outside the COT, then the UE determines the service characteristics of the PUSCH by itself, and determines the CAPC according to types of services carried on the PUSCH, and determines the parameters of the LBT (such as a contention window size, and the length of the COT) according to the CAPC. Optionally, if the second type of uplink signal is PUSCH, and the PUSCH is located outside the COT, then the UE determines the types of services carried on the PUSCH according to the predefined CAPC, for example, the predefined CAPC priority=4.

According to a case of the present invention, when a signal that precedes in time is SRS, a signal that falls behind in time is PUSCH, and the SRS and the PUSCH are discontinuous in time, then LBT information (such as LBT type, and CAPC information) indicated in the DCI is applicable to the PUSCH. The LBT type of the SRS is determined according to whether the SRS is located inside the COT. For example, if the SRS is located outside the COT, then the LBT type is the first type of LBT, and CAPC=1, and if the SRS is located inside the COT, then the LBT type is the second type of LBT, for example, 25 us LBT.

According to a case of the present invention, when a signal that precedes in time is SRS, a signal that falls behind in time is PUSCH, and the SRS and the PUSCH are discontinuous in time, then CAPC information indicated in the DCI is applicable to the PUSCH. The LBT type indicated in the DCI is applicable to the SRS. The LBT type of the PUSCH is determined according to whether the PUSCH is located inside the COT. For example, if the PUSCH is located outside the COT, then the LBT type is the first type of LBT, and if the PUSCH is located inside the COT, then the LBT type is the second type of LBT, for example, 25 us LBT.

According to a case of the present invention, when a first type of uplink signal is SRS, a second type of uplink signal is PUSCH, and the LBT type indicated in the DCI by the base station is the first type of LBT, then the scheduling of the base station has to ensure that the SRS and the PUSCH are inside a same uplink COT, or the scheduling of the base station has to ensure that the SRS and the PUSCH are consecutive in terms of time resources.

Some examples are shown below to schematically illustrate the above rules and methods. It should be understood that the following examples are only exemplary and are not intended to limit the above rules and methods, and the scenarios in which the above rules and methods are used are not limited to the following examples.

Example 1: The base station schedules the UE to transmit PUSCH and SRS through DCI. Where, SRS and PUSCH are consecutive in time, and SRS precedes PUSCH. The first type of uplink signal is an uplink signal that precedes in time, that is, SRS, and CP extension and LBT type information indicated by DCI are applicable to the first type of uplink signal, namely, CP extension and LBT type information indicated by DCI are applicable to SRS. No CP extension is performed on the second type of uplink signal, that is, there's no CP extension for PUCCH.

If the UE successfully completes LBT and transmits SRS, then the UE directly transmits PUSCH without LBT, and the service type of PUSCH is determined according to CAPC indicated by the DCI. If the UE does not transmit SRS, the UE performs LBT to try to transmit PUSCH. If the LBT type indicated by DCI is LBT of 16 us, then the UE needs to execute LBT of 25 us, otherwise, the UE performs LBT according to the LBT type indicated by DCI.

Example 2: The base station schedules the UE to transmit PUCCH and SRS through DCI. Where, SRS and PUCCH are consecutive in time, and PUCCH precedes SRS. The first type of uplink signal is an uplink signal that precedes in time, that is, PUCCH, and CP extension and LBT information indicated by DCI are applicable to the first type of uplink signal, that is, PUCCH. No CP extension is performed on the second type of uplink signal, that is, there's no CP extension for SRS.

If the UE successfully completes LBT and transmits PUCCH, the UE directly transmits SRS without LBT. If the UE does not successfully transmit the PUCCH, then the UE determines to perform the first type or the second type of LBT according to whether the SRS is located inside the COT.

Example 3: The base station schedules the UE to transmit PUCCH and SRS through DCI. Where, SRS and PUCCH are consecutive in time, and PUCCH follows SRS. The first type of uplink signal is PUCCH, CP extension and LBT information indicated by DCI are applicable to PUCCH. No CP extension is performed on the second type of uplink signal SRS. The UE determines to perform the first type or the second type of LBT according to whether the SRS is located inside the COT. If the UE successfully completes LBT and transmits SRS, the UE directly transmits PUCCH without LBT. If the UE does not successfully transmit the SRS, the UE performs LBT according to the LBT type indicated by the DCI.

Example 4: The base station schedules the UE to transmit PUCCH and SRS through DCI. Where, SRS and PUCCH are discontinuous in time. Assuming that the first type and the second type of uplink signals utilize the same LBT type and CP extension, then the CP extension and LBT type information indicated by DCI are applicable to PUCCH and SRS, that is, these two types of uplink signals utilize the same LBT type and CP extension.

Example 5: The base station schedules the UE to transmit PUSCH and SRS through DCI. Where, SRS and PUSCH are discontinuous in time. Assuming that the first type and the second type of uplink signals utilize the same LBT type and CP extension, then the CP extension and LBT type information indicated by DCI are applicable to PUSCH and SRS, that is, these two types of uplink signals utilize the same LBT type and CP extension. The CAPC information indicated by DCI is applicable to PUSCH.

Example 6: The base station schedules the UE to transmit PUCCH and SRS through DCI. Where, SRS and PUCCH are discontinuous in time, and PUCCH precedes in time. The first type of uplink signal is an uplink signal that precedes in time, namely PUCCH, and the LBT type information and CP extension indicated by DCI are applicable to the first type of uplink signal, namely PUCCH, and no CP extension is performed on the second type of uplink signal, i.e., SRS, and the UE determines whether to perform the first type or the second type of LBT based on whether the SRS is located inside the COT.

Example 7: The base station schedules the UE to transmit PUCCH and SRS through DCI. Where, the SRS and the PUCCH are discontinuous in time, and the PUCCH precedes in time, the PUCCH is located inside the COT, and the SRS is located outside the COT. It is assumed that, CP extension is not performed on the second type of uplink signal, when the gap between the first and second type of uplink signals result in that these two types of signals do not belong to a same COT. CP extension and LBT type information indicated by the DCI are applicable only to the PUCCH, and no CP extension is performed on the SRS.

Example 8: The base station schedules the UE to transmit PUSCH and SRS through DCI. Where, the SRS and the PUSCH are discontinuous in time domain, and the SRS precedes in time. The base station indicates that the LBT type is the first type of LBT. It is assumed that the PUSCH and the SRS belong to two different UL COTs. Therefore, CP extension and LBT type indicated by the DCI are applicable only to the SRS. CP extension is not performed on the PUSCH. Since the PUSCH and the SRS belong to two different COTs, the LBT type of the PUSCH is the first type of LBT, UE determines the service characteristics of the PUSCH by itself, and determines CAPC according to the types of services carried on the PUSCH.

According to an implementation of the present invention, in step 3210, the UE receives control information related to uplink transmission from the base station. In step 3220, the UE transmits PRACH and/or Msg A PRACH and PUSCH based on the received control information.

The control information related to uplink transmission can be used to determine resource information for RACH. RACH may include PRACH, and/or Msg A PUSCH. The resource information for RACH at least includes frequency domain resource information for RACH, for example, a number N1 (e.g., msg1-FDM or msgA-RO-FDM) for determining PRACH transmission occasions (RO) that can be frequency-division multiplexed within a time resource, that is, the number of ROs in frequency domain dimension within a time resource, and for another example, start point information F1 (e.g., msg1-Frequency Start or msgA-RO-Frequency Start) of frequency domain resources for a first RO in the frequency domain dimension within a time resource. The resource information for PRACH may also include sequence length information for PRACH. A number of frequency domain resources occupied by one RO in the frequency domain, such as a number P1 of occupied PRBs, can be determined by the sequence length information. For example, if the configured sequence length of PRACH is 1152, it can be determined that one RO occupies 96 PRBs.

According to the start point information F1 of frequency domain resources for the first RO, and the number P1 of PRBs occupied by one RO in the frequency domain, the frequency domain resources for the first RO are determined, and a second RO starts immediately after the end of the frequency domain resources for the first RO, and the number of occupied PRBs is P1. By analogy, the frequency domain resources for N1 ROs can be determined. In the unlicensed frequency band, according to the requirements of laws and regulations in some regions, the transmitted signals need to occupy frequency domain resources of at least X % of the bandwidth for transmission. For example, channel occupancy bandwidth has to be at least X % of the system bandwidth. For example, within a 20 MHz bandwidth, at least 85% of the bandwidth needs to be occupied to transmit signals. Taking a subcarrier interval of 15 KHz as an example, the 20 MHz bandwidth means 106 PRBs. It is assumed that a BWP is configured as 80 MHz, including 4 bandwidths of 20 MHz (LBT sub-bands), and one RO occupies 96 PRBs, with the assumption that 4 ROs are configured. If the first PRB (PRB index 0) of this BWP is the start point of the first RO, then the first RO is the PRBs 0~95 in the first LBT sub-band, and the second RO is the PRBs 96~105 in the first LBT sub-band and PRBs 0~85 in the second LBT sub-band, the third RO is the PRBs 86~105 in the second LBT sub-band and the PRBs 0~75 in the third LBT sub-band, the fourth RO is the PRB 76~105s in the third LBT sub-band and the PRBs 0~65 in the third LBT sub-band. It is not difficult to see that none of the second, third, and fourth ROs meets the requirements of OCB in their respective LBT sub-bands. In addition, since one RO spans two LBT sub-bands, the UE needs to successfully perform LBT in both of these two LBT sub-bands to transmit PRACH, which significantly reduces the transmission probability.

According to an implementation of the present invention, one RO cannot span 2 LBT sub-bands, that is, one RO can only be confined within one LBT sub-band.

According to one implementation, if an RO spans two LBT sub-bands, then the RO is considered invalid. According to another implementation, if one RO spans 2 LBT sub-bands, then the UE cannot choose to transmit PRACH on this RO.

Optionally, if the frequency domain resources for an RO includes resources for guard intervals, then the RO is considered to be an invalid RO. Alternatively, if the frequency domain resources for an RO include resources for guard intervals, then the UE cannot choose to transmit PRACH on this RO.

According to an implementation, the start point in frequency domain of the first RO in an LBT sub-band is determined within the LBT sub-band. For example, the start point in frequency domain of the first RO ($RO_1$) in the BWP is determined by an indicated offset for the start point of the PRB for RO1 with respect to the start point of the BWP. The LBT sub-band where $RO_1$ is located is a first LBT sub-band. According to continuous frequency domain resource mapping, if a $RO_j$ spans two LBT sub-bands, the start point of the $RO_j$ is moved to the next LBT sub-band. In the next LBT sub-band, the frequency domain offset of the start point in frequency domain of the $RO_j$ relative to the start point of the sub-band is as same as the frequency domain offset of the start point in frequency domain of the $RO_1$ relative to the start of the first LBT sub-band. Optionally, the indicated offset of the start point of the PRB configured by the base station causes the $RO_1$ to be always located inside the first LBT sub-band of the BWP, or the offset of the start point of the PRB configured by the base station causes the $RO_1$ to be able to be located inside the i-th LBT sub-band ($i \geq 1$).

For another example, the start point in frequency domain of the first $RO_1$ in the BWP is determined by an indicated offset for the start point of the PRB for $RO_1$ with respect to the start point of the LBT sub-band where the RO1 is located (the first PRB with the lowest PRB index in the LBT sub-band). The LBT sub-band where $RO_1$ is located is a first LBT sub-band. According to continuous frequency domain resource mapping, if a $RO_j$ spans two LBT sub-bands, then the start point of the $RO_j$ is moved to the next LBT sub-band. In the next LBT sub-band, the frequency domain offset of the start point in frequency domain of the $RO_j$ relative to the start point of the sub-band is as same as the frequency domain offset of the start point in frequency domain of the $RO_1$ relative to the start point of the first LBT sub-band.

For example, it is assumed that a BWP is configured as 80 MHz and contains 4 bandwidths of 20 MHz (each 20 MHz contains 106 PRBs), one RO occupies 96 PRBs, and 2 ROs are configured (msg1-FDM=4), the start point in frequency domain of the first RO is offset by 2 PRBs relative to the first PRB in the first LBT sub-band (msg1-FrequencyStart=2). Then, the two ROs are located inside the first LBT sub-band and the second LBT sub-band respectively, and the start points of the two ROs are offset by two PRBs relative to the first PRB of the LBT sub-band where each of the two ROs is located.

According to an implementation of the present invention, the frequency domain resources for the ROs may be determined according to at least one method, for example, the above-described mapping of each RO confined within an LBT sub-band or continuous mapping of the ROs within the BWP, and the base station indicates the mapping method of the frequency domain resources for the ROs. For example, the base station indicates the mapping method of the frequency domain resources for the ROs through a dedicated signaling. Alternatively, the base station indicates the mapping method of the frequency domain resources for the ROs through other signaling. For example, if the base station configures Prach-RootSequenceIndex-r16, then the frequency domain resources for the ROs are determined according to method 1 (for example, the above-described method of mapping each RO confined within the LBT sub-band), if the base station does not configure Prach-RootSequenceIndex-r16, then the frequency domain resources for the ROs are determined according to method 2 (for example, continuously mapping the ROs within the BWP). For example, if the base station configures useInterlacePUCCH-PUSCH-r16 to be in a state of "enable", then the frequency domain resources for the ROs are determined according to mode 1, otherwise the frequency domain resources for the ROs are determined according to mode 2.

Optionally, for different types of random access procedures, the restrictions for RO configuration are different. For example, for a random access procedure in which only PRACH is transmitted, for example, a 4-step RACH access procedure, the base station configures the RO resource set to be within one or more LBT sub-bands; for a random access procedure in which both PRACH and PUSCH are transmitted, for example, a 2-step RACH access procedure, the base station configures the RO resource set to be within only one LBT sub-band.

Optionally, if the N2 configured by the base station is a number of frequency division multiplexed ROs within one LBT sub-band within one time resource, then throughout the whole frequency domain resources, a number of frequency division multiplexed ROs within one time resource is N2*X2, where X2 is a number of LBT sub-bands containing ROs. Alternatively, if the N2 configured by the base station is a number of frequency division multiplexed ROs within all the LBT sub-bands containing ROs within one time resource, then a number of frequency-division multiplexed ROs within each LBT sub-band is ceil (N2/X2) or floor (N2/X2), where X2 is a number of LBT sub-bands containing ROs.

According to an implementation of the present invention, if the UE needs to transmit both Msg A PRACH and Msg A PUSCH, then the base station needs to configure MsgA PUSCH transmission occasions (POs) in addition to ROs for the UE. The base station configures time resources, frequency domain resources and code resources for POs for the UE. The frequency domain resources include an interlace index Ii or a PRB index $P_1$ of a start point of frequency domain resources of a first Msg A PO in frequency domain dimension within one time resource, a number $N_{int}$ of interlaces or a number $N_p$ of PRBs contained in each PO, a number N2 of FDMed POs within one time resource, and LBT sub-band indexes of POs within one time resource.

Optionally, the PUSCH resource of one Msg A is confined within only one LBT sub-band.

Optionally, if the N2 configured by the base station is a number of frequency division multiplexed POs within one LBT sub-band within one time resource, then throughout the whole frequency domain resources, a number of frequency division multiplexed POs within one time resource is N2*X2, where X2 is a number of LBT sub-bands containing ROs. For example, if both of LBT sub-bands 1 and 2 contain POs, then a number of frequency division multiplexed POs contained within each LBT sub-band is N2, and a number of frequency division multiplexed POs contained in the whole frequency band resources is N2*2. Alternatively, if the N2 configured by the base station is a total number of frequency division multiplexed POs within all the LBT sub-bands containing POs within one time resource, then a number of frequency-division multiplexed POs within each LBT sub-band is ceil (N2/X2) or floor (N2/X2), where X2 is a number of LBT sub-bands containing POs.

Optionally, if the N2 configured by the base station is a total number of frequency division multiplexed POs within all the LBT sub-bands containing POs within one time resource, then the LBT sub-bands containing POs are determined according to the LBT sub-band of the first PO, a start point of the interlaces of the first PO, a number of interlaces of the first PO and N2. POs are arranged consecutively within LBT sub-band. If N2 is greater than a number of POs consecutively arranged within one LBT sub-band, then the POs are arranged continuously on the next LBT sub-band, until the N2 POs are completely arranged. For example, the LBT sub-band of the first PO is as same as the LBT sub-band of the first RO, and it is assumed that the LBT subband is LBT subband 1. A start point of interlaces of the first PO is interlace 1, a number of interlaces of the first PO is 2. Resources for one Msg A PUSCH are within only one LBT subband, and one LBT subband contains 10 interlaces. Assuming that N2=8, then the $1^{st}$~$5^{th}$ POs are within LBT subband 1, and the $6^{th}$-$8^{th}$ POs are within LBT subband 2.

The index of the LBT sub-band where the Msg A PUSCH is located is determined according to at least one of the following ways:

(1) The base station configures the LBT sub-band where the Msg A PUSCH is located.

The base station may configure one or more LBT sub-band indexes. For example, the one or more LBT sub-bands where the Msg A PUSCH resource set is located can be indicated by way of Bitmap.

For example, the base station configures an interlace index and a LBT sub-band index of the Msg A PUSCH. The LBT sub-band index is determined according to the position of the LBT sub-band in the serving cell, or the LBT sub-band index is determined according to the position of the LBT sub-band in the BWP. Assuming that the base station configures LBT sub-band={1, 4}, then a number of FDMed POs within one LBT subband is 2. Accordingly, Msg A PO 1 and Msg A PO 2 are within subband 1, and Msg A PO 3 and Msg A PO 4 are within subband 4.

Optionally, the Msg A PUSCH resource set is restricted within only one LBT subband.

(2) The LBT sub-band where the Msg A PUSCH is located is determined according to the Msg A PRACH.

Optionally, the LBT subband(s) where the Msg A PUSCH resource set is located is as same as the LBT subband(s) where Msg A PRACH resource set is located.

Optionally, the Msg A PUSCH resource set is within only one LBT subband, and the LBT subband where a PO set is located is determined according to the RO set according to pre-defined rules. For example, the LBT subband where the Msg A PUSCH resource set is located is the LBT subband where the lowest PRACH resource in frequency domain is located. For example, in an activated BWP or in a carrier of a serving cell, the base station configures multiple PRACH resources to be located at multiple frequency domain resource locations. The LBT subband where the Msg A PUSCH is located is determined by the LBT subband where a PRACH resource with a lowest PRB index is located, for example, the LBT subband is where the PRB determined according to msgA-RO-FrequencyStart is located.

Optionally, the Msg A PUSCH resource set and the Msg A PRACH resource set are both within only one LBT sub-band, and the LBT subband for the Msg A PUSCH resource set and the Msg A PRACH resource set are the same. Therefore, the resource of one Msg A PUSCH and its associated Msg A PRACH are both within a same LBT sub-band.

Optionally, one Msg A PUSCH and the PRACH associated with the Msg A PUSCH are in the same LBT sub-band. The specific method for determining the association between one Msg A PUSCH and one Msg A PRACH can be found by referring to the description of other parts of this application.

(3) The sub-band where the Msg A PUSCH is located is determined according to a number of Msg A PUSCHs in a time resource and the LBT sub-bands included in the BWPs where the Msg A PUSCHs are located.

For example, one Msg A PUSCH is located inside only one LBT sub-band. Assuming that the number of frequency division multiplexed Msg A PUSCHs in a time resource is N2, and the number of LBT sub-bands included in an activated BWP is X2, then it is tried to spread the N2 Msg A PUSCHs into the X2 LBT sub-bands as evenly as possible. For example, if N2=4 and X2=2, then there are 2 frequency domain multiplexed Msg A PUSCH resources in each LBT sub-band. Alternatively, the N2 Msg A PUSCHs are consecutively arranged in one LBT sub-band first. If N2 is greater than a number of POs consecutively arranged within one LBT sub-band, then the POs are arranged continuously on the next LBT sub-band, until the N2 POs are completely arranged Optionally, the interlace index of the first Msg A PUSCH in each LBT sub-band is the same. Optionally, the interlace index of the first Msg A PUSCH in each LBT sub-band is the same or different.

If the frequency resource set of Msg A PUSCHs includes more than one LBT sub-bands, denoting the sub-band index for $1^{st}$ LBT sub-band as $n_o$, the interlace index for first Msg A PUSCH PO in the sub-band as $l_0$, the PRB index for first PRB of the sub-band as $N_{start\_RB, n0}$, the interlace index for the first PRB in the sub-band as $l_{0'}$. According to the method that interlace index of the first Msg A PUSCH in each LBT sub-band is the same as described above, the interlace index for first Msg A PUSCH PO in each sub-band is $l_0$, which is configured by base station. According to the method that interlace index of the first Msg A PUSCH in each LBT sub-band is the same or different as described above, for each sub-band, the frequency domain offset of the start interlace of first Msg A PUSCH in the sub-band relative to the interlace of the first PRB of the sub-band is the same. That is, for each sub-band, delta $L=l_0-l_{0'}$ is the same. For the first LBT sub-band, $l_0$ is configured by base station, for example, configured by the parameter interlaceIndex-FirstP0-MsgA-PUSCH-r16, and $l_0$ for other sub-band is derived by $l_{0'}$ of the other sub-band and delta L. In some scenarios, $l_{0'}$ in each sub-band may be different, for example, different guardband between the sub-band can lead to different $l_{0'}$ in different sub-band. Therefore, the start interlace index for first Msg APUSCH $l_0=l_{0'}+$delta L in different sub-band can be different. According to the proposed method, the frequency offset between start PRB of first Msg A PUSCH and start PRB of the sub-band is the same for each sub-band, which enables more uniform resource allocation of Msg A PUSCH in each sub-band.

In a system, the total number of interlace is fixed, denoting as No. The interlace index $l_0$ should be determined after mod operation of No to ensure the interlace index is no larger than the total number of interlaces.

In some scenarios, UEs in adjacent PRBs may suffer inter-UE interference, if the UEs are not synchronized. To reduce the interference, the guardband between POs can be configured. If Msg A PUSCH is based on interlace, the frequency gap between the start interlace index of adjacent POs is $X_{num}+X_{guard}$, wherein $X_{num}$ is the number of interlaces per PO, for example, $X_{num}$ is configured by nrofInterlacesPerMsgA-PO-r16, and $X_{guard}$ is frequency gap between POs, for example, $X_{guard}$ is configured by guardBandMsgA-PUSCH-r16.

Optionally, if a Msg A PUSCH consists of multiple adjacent PRBs rather than interlace which including multiple non-adjacent PRBs, the frequency offset between start PRB of first Msg A PUSCH and start PRB of the sub-band is the same for each sub-band. Optionally, the start point in frequency domain of the first $PO_1$ in the BWP is determined by an indicated offset for the start point of the PRB for PO1 with respect to the start point of the LBT sub-band where the RO1 is located, for example, the indicated offset is configured by frequencyStartMsgA-PUSCH-r16. In other sub-band, the frequency domain offset of the start point in frequency domain of $PO_1$ in the sub-band relative to the start point of the sub-band is as same as the frequency domain offset of the start point in frequency domain of the $PO_1$ in the first LBT sub-band relative to the start point of the first LBT sub-band.

If the UE needs to transmit both the Msg A PUSCH and the Msg A PRACH, for example, in the 2-step random access procedure (2 step RACH), then the UE transmits PRACH and associated PUSCH. The association between one Msg A PUSCH and one Msg A PRACH is determined according to pre-defined rules. One PRACH resource is determined by one RO resource and preamble resources in the one RO resource jointly. In one PRACH slot, all preamble indexes in one RO of a RO set in the slot are ranked in ascending order, then all frequency division multiplexed ROs in one RO time resource in the slot are ranked in ascending order of frequency resource indexes, then all time division multiplexed ROs in the slot are ranked in ascending order of time indexes, thereby the order of each PRACH resource is determined. One Msg A PUSCH resource is determined by one PO resource and DMRS resources in the one PO resource jointly. In one Msg A PUSCH slot, all frequency division multiplexed POs in one PO time resource of a PO set in the slot are ranked in ascending order of frequency resource indexes, then DMRS resource indexes in the one PO are ranked in ascending order, then all time division multiplexed POs in the slot are ranked in ascending order of time indexes. Then, POs of each Msg A PUSCH slot are ranked in ascending order, thereby the order of each Msg A PUSCH resource is determined. One Msg A PUSCH resource is associated/mapped to one PRACH resource by order.

According to one implementation, the aforementioned operations are performed in each LBT sub-band respectively so that a PO and a RO that is associated are located inside a same sub-band. For example, the base station configures ROs on LBT sub-bands 1 and 2, the base station configures POs on LBT sub-bands 1 and 2 (the base station may configure a sub-band for POs through explicit signaling, alternatively, the base station does not need to configure a sub-band for POs, and the UE assumes that a sub-band set for POs is as same as a sub-band set where ROs are located), the association between PRACH resources in sub-band 1 and Msg A PUSCHs in sub-band 1 is determined in sub-band 1 according to the aforementioned method, and the association between PRACH resources in sub-band 2 and Msg A PUSCHs in sub-band 2 is determined in sub-band 2 according to the aforementioned method. A PRACH and its associated PUSCH are restricted within one LBT sub-band, and in some scenarios, LBT overhead can be reduced, for example, efficiency of random access procedure is enhanced since PRACHs and PUSCHs are adjacent to each other in terms of time resources. Optionally, mapping between respective SSB and RO is also performed within each LBT sub-band.

Hereinafter, for convenience of description of the association between respective PRACH resource and PUSCH resource, the PRACH resources and the PUSCH resources are additionally numbered. However, it should be understood that, the numbering is only illustrative rather than restrictive. That is, in actual practice, the UE does not have to number the PRACH resources and PUSCH resources before association.

FIG. 50 illustrates an example of association between PRACH resources and PUSCH resources according to an embodiment of the present invention.

As illustrated in FIG. 50, the base station configures ROs on LBT sub-bands 1 and 2, and one PRACH slot contains two time division multiplexed RO resources, one time division multiplexed RO resource contains one frequency division multiplexed RO resource, and one frequency division multiplexed RO resource contains 4 preambles. Each LBT sub-band has 8 PRACH resources, which correspond respectively to the $1^{st}$ preamble of the Pt time division multiplexed RO resource in this LBT sub-band, the $2^{nd}$ preamble of the $1^{st}$ time division multiplexed RO resource in this LBT sub-band, the $3^{rd}$ preamble of the $1^{st}$ time division multiplexed RO resource in this LBT sub-band, the $4^{th}$ preamble of the $1^{st}$ time division multiplexed RO resource in this LBT sub-band, the $1^{st}$ preamble of the $2^{nd}$ time division multiplexed RO resource in this LBT sub-band, . . . , and the $4^{th}$ preamble of the $2^{nd}$ time division multiplexed RO resource in this LBT sub-band. The base station configures POs on LBT sub-bands 1 and 2, one Msg A PUSCH contains two time division multiplexed PO resources, one time division multiplexed PO resource contains two frequency division multiplexed PO resources, and one frequency division multiplexed PO resource contains two DMRS resources. Then, each LBT sub-band in one Msg A PUSCH slot contains 4 POs, and each PO contains 2 DMRS resources, therefore 8 Msg A PUSCH resources in total, which correspond respectively to the $1^{st}$ DMRS resource of the $1^{st}$ frequency division multiplexed PO in the $1^{st}$ time division multiplexed PO in this LBT sub-band, the $1^{st}$ DMRS resource of the $2^{nd}$ frequency division multiplexed PO in the $1^{st}$ time division multiplexed PO in this LBT sub-band, the $2^{nd}$ DMRS resource of the $1^{st}$ frequency division multiplexed PO in the $1^{st}$ time division multiplexed PO in this LBT sub-band, the $2^{nd}$ DMRS resource of the $2^{nd}$ frequency division multiplexed PO in the $1^{st}$ time division multiplexed PO in this LBT sub-band, the $1^{st}$ DMRS resource of the $1^{st}$ frequency division multiplexed PO in the $2^{nd}$ time division multiplexed PO in this LBT sub-band, . . . , the $2^{nd}$ DMRS resource of the $2^{nd}$ frequency division multiplexed PO in the $2^{nd}$ time division multiplexed PO in this LBT sub-band. In LBT sub-band 1, PRACH resource 1 is correlated to PUSCH resource 1, PRACH resource 2 is correlated to PUSCH resource 2 . . . and PRACH resource 8 is correlated to PUSCH resource 8. In LBT sub-band 2, PRACH resource 9 is correlated to PUSCH resource 9, PRACH resource 10 is correlated to PUSCH resource 10 . . . and PRACH resource 16 is correlated to PUSCH resource 16.

According to another implementation, the association between PRACHs and PUSCHs is determined successively in the whole frequency domain resources where PO and RO resources are located.

FIG. 51 illustrates another example of association between PRACH resources and PUSCH resources according to an embodiment of the present invention. As illustrated in FIG. 51, PRACH resources 3 and 4 located inside LBT sub-band 1 correspond to PUSCH resources 3 and 4 located inside LBT sub-band 2.

An advantage in determining association between PRACHs and PUSCHs in the whole frequency domain resources is that the base station may configure resources for PUSCHs and PRACHs more flexibly, for example, the base station may configure resources for PRACHs in LBT sub-bands 1 and 2 in the whole frequency domain resources, and may configure resources for PUSCHs in other LBT sub-bands (e.g., LBT sub-bands 3 and 4) in the whole frequency domain resources.

According to another implementation, the resource set for Msg A PUSCH is restricted within only one LBT sub-band, and association between PRACHs and PUSCHs is determined successively in the whole frequency domain resources where PO and RO resources are located FIG. 52 illustrates another example of association between PRACH resources and PUSCH resources according to an embodiment of the present invention.

As illustrated in FIG. 52, PRACH resources 1-16 are located inside LBT sub-bands 1 and 2, while PUSCH resources 1-16 are restricted within only LBT sub-band 1.

The base station configures a LTB sub-band where a resource set of Msg A PUSCHs is located, alternatively, the base station may fix the LTB sub-band where a resource set of Msg A PUSCHs is located to be a LBT sub-band where lowest PRACH resource in frequency domain is located.

For example, in an activated BWP or in a carrier of a serving cell, the base station configures multiple PRACH resources to be located at different frequency domain resource locations. According to a PRACH resource with a lowest PRB index, for example, according the LBT subband where the msgA-RO-FrequencyStart is located, the LBT subband where the Msg A PUSCH is located is determined. Alternatively, if resource sets of Msg A PUSCHs and Msg A PRACHs are restricted within only one LBT sub-band, then the LBT subband for the Msg A PUSCH resource set and the LBT sub-band for Msg A PRACH resource set are the same.

FIG. 49 illustrates a block diagram of a user equipment according to an embodiment of the present application.

Referring to FIG. 49, a user equipment 4900 may include a controller 4901 and a transceiver 4906. According to an embodiment of the present application, the controller 4901 may be defined as a circuit-specific integrated circuit or at least one processor. The controller 4901 can control an overall operation of the user equipment 4900, and control the user equipment 4900 to implement the method proposed in the present invention.

The transceiver 4906 may transmit/receive signals to/from another network entity. For example, the transceiver 4906 may transmit signals to and receive signals from the base station.

Those skilled in the art will understand that the various illustrative logical blocks, modules, circuits, and steps described in this application may be implemented as hardware, software, or a combination thereof. To clearly illustrate this interchangeability of hardware and software, various illustrative components, blocks, modules, circuits, and steps are generally described above in the form of their function sets. Whether such a function set is implemented as hardware or software depends on the specific application and design constraints imposed on the overall system. The skilled in the art can implement the described function sets in different ways for each specific application, but such design decisions should not be interpreted as causing a departure from the scope of this application.

The various illustrative logic blocks, modules, and circuits described in this application can be implemented or performed by general-purpose processors, digital signal processors (DSPs), application specific integrated circuits (ASICs), field programmable gate arrays (FPGAs) or other programmable logic devices, discrete gates or transistor logics, discrete hardware components, or any combination thereof designed to perform any combination of the functions described herein. A general-purpose processor may be a microprocessor, but in the alternative, the processor may be any conventional processor, controller, microcontroller, or state machine. The processor may also be implemented as a combination of computing devices, such as a combination of a DSP and a microprocessor, multiple microprocessors, one or more microprocessors that cooperate with a DSP core, or any other such configuration.

The steps of the method or algorithm described in this application may be directly embodied in hardware, in a software module executed by a processor, or in a combination thereof. The software module may reside in a RAM memory, flash memory, ROM memory, EPROM memory, EEPROM memory, register, hard disk, removable disk, or any other form of storage medium known in the art. An exemplary storage medium is coupled to the processor so that the processor can read and write information from/to the storage medium. In an alternative, the storage medium may be integrated into the processor. The processor and the storage medium may reside in ASIC. The ASIC may reside in the user terminal. In an alternative, the processor and the storage medium may reside a user terminal as discrete components.

In one or more exemplary designs, the functions may be implemented in hardware, software, firmware, or any combination thereof. If implemented in software, each function may be stored on or transmitted by a computer-readable medium as one or more instructions or codes. Computer-readable medium includes both computer storage media and communication media, the latter including any medium that facilitates transfer of a computer program from one place to another. Storage media may be any available media that can be accessed by a general purpose or special purpose computer.

The methods and devices of the present disclosure may be implemented in many ways. For example, the methods and devices of the present disclosure may be implemented by software, hardware, firmware, or any combination of software, hardware, and firmware. The above-mentioned order used for the steps of the above method is merely for the purpose of illustration, and the steps of the method of the present disclosure are not limited to the order specifically described above, unless specifically stated otherwise. In addition, in some embodiments, the present disclosure may also be implemented as programs recorded in a recording medium, and these programs comprise machine-readable instructions for implementing the method according to the present disclosure. Thus, the present disclosure also covers a recording medium for storing programs for implementing the method according to the present disclosure.

The above description is only an explanation of the preferred embodiments of the present disclosure and the technical principles used. It should be appreciated by those skilled in the art that the scope of protection of the present disclosure is not limited to the technical solutions formed by the particular combinations of the above-described technical features, but should also cover other technical solutions formed by any combinations of the above-described technical features or equivalent features thereof without departing from the technical concept. Technical schemes formed by the above-described features, which are interchanged with but not limited to technical features with similar functions disclosed in the present disclosure, are just exemplary.

The invention claimed is:

1. A terminal operating in a shared spectrum channel in a communication system, the terminal comprising:
    a transceiver; and
    a controller configured to:
        receive, from a base station, configuration information for a physical random access channel (PRACH);
        in case that the configuration information for the PRACH includes a first parameter, transmit, to the base station, a PRACH based on a first sequence length of the PRACH, a frequency offset of a first PRACH transmission occasion in frequency domain with respect to a physical resource block with index 0 of an uplink bandwidth part (BWP), a start of a first set of resource blocks (RBs) associated with the first PRACH transmission occasion, and a start of a second set of RBs associated with a second PRACH transmission occasion; and
        in case that the configuration information for the PRACH does not include the first parameter, transmit, to the base station, the PRACH based on a second sequence length of the PRACH, the frequency offset of the first PRACH transmission occasion in frequency domain with respect to the physical resource block with index 0 of the uplink BWP, and a number of RBs occupied.

2. The terminal of claim 1, wherein a frequency domain offset of the second PRACH transmission occasion in frequency domain with respect to the start of the second set of RBs is same as the frequency domain offset of the first PRACH transmission occasion in frequency domain with respect to the start of the first set of RBs.

3. The terminal of claim 1, wherein the frequency offset of the first PRACH transmission occasion in frequency domain with respect to the physical resource block with index 0 of the uplink BWP is configured such that the first PRACH transmission occasion is fully contained within the first set of RBs.

4. A method performed by a terminal operating in a shared spectrum channel in a communication system, the method comprising:
    receiving, from a base station, configuration information for a physical random access channel (PRACH);
    in case that the configuration information for the PRACH includes a first parameter, transmitting, to the base station, a PRACH based on a first sequence length of the PRACH, a frequency offset of a first PRACH transmission occasion in frequency domain with respect to a physical resource block with index 0 of an uplink bandwidth part (BWP), a start of a first set of resource blocks (RBs) associated with the first PRACH transmission occasion, and a start of a second set of RBs associated with a second PRACH transmission occasion; and in case that the configuration information for the PRACH does not include the first parameter, transmitting, to the base station, the PRACH based on a second sequence length of the PRACH, the frequency offset of the first PRACH transmission occasion in frequency domain with respect to the physical resource block with index 0 of the uplink BWP, and a number of RBs occupied.

5. The method of claim 4, wherein a frequency domain offset of the second PRACH transmission occasion in frequency domain with respect to the start of the second set of RBs is same as the frequency domain offset of the first PRACH transmission occasion in frequency domain with respect to the start of the first set of RBs.

6. The method of claim 4, wherein the frequency offset of the first PRACH transmission occasion in frequency domain with respect to the physical resource block with index 0 of the uplink BWP is configured such that the first PRACH transmission occasion is fully contained within the first set of RBs.

7. A base station operating in a shared spectrum channel in a communication system, the base station comprising:
a transceiver; and
a controller configured to:
transmit, to a terminal, configuration information for a physical random access channel (PRACH);
in case that the configuration information for the PRACH includes a first parameter, receive, from the terminal, a PRACH based on a first sequence length of the PRACH, a frequency offset of a first PRACH transmission occasion in frequency domain with respect to a physical resource block with index 0 of an uplink bandwidth part (BWP), a start of a first set of resource blocks (RBs) associated with the first PRACH transmission occasion, and a start of a second set of RBs associated with a second PRACH transmission occasion; and
in case that the configuration information for the PRACH does not include the first parameter, receive, from the terminal, the PRACH based on a second sequence length of the PRACH, the frequency offset of the first PRACH transmission occasion in frequency domain with respect to the physical resource block with index 0 of the uplink BWP, and a number of RBs occupied.

8. The base station of claim 7, wherein a frequency domain offset of the second PRACH transmission occasion in frequency domain with respect to the start of the second set of RBs is same as the frequency domain offset of the first PRACH transmission occasion in frequency domain with respect to the start of the first set of RBs.

9. The base station of claim 7, wherein the frequency offset of the first PRACH transmission occasion in frequency domain with respect to the physical resource block with index 0 of the uplink BWP is configured such that the first PRACH transmission occasion is fully contained within the first set of RBs.

10. A method performed by a base station operating in a shared spectrum channel in a communication system, the method comprising:
transmitting, to a terminal, configuration information for a physical random access channel (PRACH);
in case that the configuration information for the PRACH includes a first parameter, receiving, from the terminal, a PRACH based on a first sequence length of the PRACH, a frequency offset of a first PRACH transmission occasion in frequency domain with respect to a physical resource block with index 0 of an uplink bandwidth part (BWP), a start of a first set of resource blocks (RBs) associated with the first PRACH transmission occasion, and a start of a second set of RBs associated with a second PRACH transmission occasion; and
in case that the configuration information for the PRACH does not include the first parameter, receiving, from the terminal, the PRACH based on a second sequence length of the PRACH, the frequency offset of the first PRACH transmission occasion in frequency domain with respect to the physical resource block with index 0 of the uplink BWP, and a number of RBs occupied.

11. The method of claim 10, wherein a frequency domain offset of the second PRACH transmission occasion in frequency domain with respect to the start of the second set of RBs is same as the frequency domain offset of the first PRACH transmission occasion in frequency domain with respect to the start of the first set of RBs.

12. The method of claim 10, wherein the frequency offset of the first PRACH transmission occasion in frequency domain with respect to the physical resource block with index 0 of the uplink BWP is configured such that the first PRACH transmission occasion is fully contained within the first set of RBs.

* * * * *

UNITED STATES PATENT AND TRADEMARK OFFICE
CERTIFICATE OF CORRECTION

| | | |
|---|---|---|
| PATENT NO. | : 12,302,410 B2 | |
| APPLICATION NO. | : 17/764964 | |
| DATED | : May 13, 2025 | |
| INVENTOR(S) | : Wang et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 496 days.

Signed and Sealed this
Twenty-second Day of July, 2025

Coke Morgan Stewart
*Acting Director of the United States Patent and Trademark Office*